United States Patent
Zaslavsky et al.

(10) Patent No.: US 6,647,717 B2
(45) Date of Patent: *Nov. 18, 2003

(54) RENEWABLE RESOURCE HYDRO/AERO-POWER GENERATION PLANT AND METHOD OF GENERATING HYDRO/AERO-POWER

(75) Inventors: Dan Zaslavsky, Technion (IL); Rami Guetta, Haifa (IL); Rony Hitron, Nesher (IL); Grigory Krivchenko, Haifa (IL); Michael Burt, Paris (FR); Michael Poreh, Haifa (IL)

(73) Assignee: Sharav Sluices, Ltd., Technion (IL)

( * ) Notice: Subject to any disclaimer, the term of this patent is extended or adjusted under 35 U.S.C. 154(b) by 59 days.

This patent is subject to a terminal disclaimer.

(21) Appl. No.: 10/082,330

(22) Filed: Feb. 26, 2002

(65) Prior Publication Data

US 2002/0148222 A1 Oct. 17, 2002

Related U.S. Application Data

(63) Continuation of application No. 08/854,085, filed on May 9, 1997, now Pat. No. 6,510,687
(60) Provisional application No. 60/020,278, filed on Jun. 14, 1996, provisional application No. 60/027,926, filed on Oct. 9, 1996, and provisional application No. 60/043,928, filed on Apr. 18, 1997.

(51) Int. Cl.$^7$ ................................................. F16D 31/02
(52) U.S. Cl. ......................................................... 60/398
(58) Field of Search ........................... 60/398–456, 516

(56) References Cited

U.S. PATENT DOCUMENTS

| | | |
|---|---|---|
| 1,014,054 A | 1/1912 | Forchheimer |
| 1,045,459 A | 11/1912 | Todd et al. |
| 1,344,608 A | 6/1920 | Alston |
| 2,697,326 A | 12/1954 | Featonby |
| 3,151,250 A | 9/1964 | Carlson |
| 3,566,916 A | 3/1971 | Root |

(List continued on next page.)

FOREIGN PATENT DOCUMENTS

| | | |
|---|---|---|
| EP | 0 704 985 | 4/1996 |
| IL | 61605 | 11/1980 |
| IL | 76240 | 8/1985 |
| WO | 94/28640 | 12/1994 |

OTHER PUBLICATIONS

Evaluating Atomizers for the 'Energy Towers' Project, Final Paper Submitted in Partial Fulfillment of the Requirements for the Degree of Master of Science in Quality Assurance and Reliability, Cathie Wajsberg–Chiche, Mar., 1995.

(List continued on next page.)

(List continued on next page.)

*Primary Examiner*—Edward K. Look
*Assistant Examiner*—Igor Kershteyn
(74) *Attorney, Agent, or Firm*—Lowe Hauptman; Gilman & Berner LLP

(57) ABSTRACT

A power plant and method for the generation of power from flowing air utilizes a generally vertically extending duct having an inlet open to atmosphere at an elevation above an outlet. A spray system is mounted adjacent the inlet for spraying droplets of a predetermined amount of water into the air causing the air and droplet mixture to become cooler and denser than the outside air to create a down draft of fluid within the duct. A power system mounted adjacent the outlet recovers energy from the downdraft of fluid passing through it. The predetermined amount of water sprayed is greater than the amount of water that would theoretically and potentially evaporate in the air throughout the entire elevation over an unlimited time period using fresh water droplets. The power plant can also be synergistically combined with desalination systems and aquaculture.

62 Claims, 33 Drawing Sheets

U.S. PATENT DOCUMENTS

| | | | |
|---|---|---|---|
| 3,894,393 A | | 7/1975 | Carlson |
| 3,936,652 A | * | 2/1976 | Levine .................. 60/643 |
| 4,106,295 A | | 8/1978 | Wood |
| 4,182,124 A | | 1/1980 | Kraus et al. |
| 4,213,302 A | | 7/1980 | Woinsky |
| 4,370,859 A | | 2/1983 | Assaf |
| 4,373,339 A | | 2/1983 | Sorenson |
| 4,382,365 A | * | 5/1983 | Kira et al. ................ 60/675 |
| 4,391,099 A | | 7/1983 | Sorenson |
| 4,475,342 A | | 10/1984 | Assaf |
| 4,481,774 A | | 11/1984 | Snook |
| 4,497,177 A | | 2/1985 | Anderson |
| 4,742,682 A | | 5/1988 | Assaf et al. |
| 4,801,811 A | | 1/1989 | Assaf et al. |
| 4,878,349 A | | 11/1989 | Czaja |
| 5,284,628 A | | 2/1994 | Prueitt |
| 5,349,606 A | | 9/1994 | Lovell et al. |
| 5,395,598 A | | 3/1995 | Prueitt |
| 5,477,684 A | | 12/1995 | Prueitt |
| 5,483,798 A | | 1/1996 | Prueitt |
| 5,527,494 A | * | 6/1996 | Weinberg et al. .......... 261/36.1 |
| 5,648,983 A | | 7/1997 | Kostic et al. |
| 5,675,616 A | | 10/1997 | Hulbert et al. |
| 5,692,006 A | | 11/1997 | Ross |
| 5,764,688 A | | 6/1998 | Hulbert et al. |

OTHER PUBLICATIONS

Energy Towers Technology, "A Major Source of Low Cost Electric Power and Desalinated Water Utilizing hot desert air and sea water as clean sources of energy", A Summary, Revision 4, Prof. Dan Zaslavsky, Sep., 1995.

Dynamics Technology, Inc. "Technical Assessment of an Aeroelectric Solar Power Concept", E.C. James et al., Feb., 1981.

"Effect of Winds on the Flow at the Entrance to a Vertical Tube", Research Thesis Submitted in Partial Fulfillment of the Requirements for the Degree of Master of Science in Agricultural Engineering, Vadim Mezhibovski, Jan. 1993.

"Aeroelectric Solar Power, A Project to Extract Solar Energy from the Atmosphere", Agbabian Associates, El Segundo, CA.

Sozialpolitik Und Okologieprobleme der Zukunft (Solar Energy Without a Collector for Electricity and Water in the $21^{st}$ Century), Dan Zaslavsky, May, 1997.

"Aeroelectric Solar Power—A description of its Configuration, Performance Characteristics, Construction Methods, Economic Factors, Environmental Impacts, and Resistance to Natural Phenomena", Agbabian Associates, Jun., 1980, Revision 1, Jul., 1980.

"Solution Concentration by Spraying", Research Thesis Submitted in Partial Fulfillment of the Requirements for the Degree of Doctor of Science, Rony Hitron, Oct., 1993.

"A Theoretical Analysis of Natural Convection Towers for Solar Energy Conversion", David D. Lasier et al.; May 1983.

"Solar Energy Without A Collector for Electricity and Water in tHe $21^{st}$ Century", Prof. Dan Zaslavsky, Revision 1, Jul. 1997.

Snap Technology "A Major Source of Low Cost Electric Power and Desalinated Water", Prof. Dan Zaslavsky, Revision 3, Jun. , 1995.

"Energy from Humid Air", T.K. Oliver et al., South Dakota School of Mines, Jun., 1982.

"Energy Towers" Project—Reviewers List (Updated), Jul., 1997.

"Energy from Dry Air or Aeroelectric Power Stations (A.P.S.), vol. 1, Executive Summary and Project Review", Prof. Dan Zaslavsky.

"Energy from Dry Air—A Model of Air Flow and Droplets Evaporation in the Chimney", Reseach Thesis Submitted in Partial Fulfillment of the Requirements for the Degree of Doctor of Science, Rami Guetta, Mar. 1993.

"Theoretical Analysis of Solar–Driven Natural Convection Energy Conversion Systems"; Solar Energy Research Inst., Golden, Co., Jan., 1984.

* cited by examiner

| Slowing factor $n$ | Loss factor $1/\sqrt{F}$ Assuming $f = 0.65$ $F = f + \left(\dfrac{AC}{AD}\right)^2$ | Net deliverable power in % | Ratio of partitions to duct cross section $\sim \dfrac{n-1}{\tan\alpha + \tan\beta}$ assuming $\alpha \sim 6°$ $\beta \sim 6°$ |
|---|---|---|---|
| 1 | 0.778 | 67.9 | 0 |
| 1.5 | 0.956 | 83.4 | 2.38 |
| 2 | 1.054 | 91.9 | 4.76 |
| 2.5 | 1.117 | 96.9 | 7.14 |
| 3 | 1.146 | 100 | 9.52 |
| 4 | 1.185 | 103.4 | 14.28 |

FIG. 21

RENEWABLE RESOURCE HYDRO/AERO-POWER GENERATION PLANT AND METHOD OF GENERATING HYDRO/AERO-POWER

This application is a continuation of application Ser. No. 08/854,085, filed May 9, 1997 now U.S. Pat. No. 6,510,687, which claims benefit of Application No. 60/020,278 filed 06/14/1996, and claims benefit of Application No. 60/027,926 filed Oct. 9, 1996, and claims benefit of Application No. 60/043,928 filed Apr. 18, 1997.

TECHNICAL FIELD

The present invention relates to a hydro/aero-power generation plant and method for generating hydro/aero-power, and more particularly, to a tower for generating power by spraying water into the top of the tower to produce a downdraft of air that turns a turbine arrangement within the bottom of the tower to generate power.

BACKGROUND OF THE INVENTION

The demand for power is increasing dramatically with expanding industrialization and the escalating use of high technology. The available natural resources, however, are continually being consumed and will eventually be used up. Other sources of power, such as nuclear plants, are in disfavor because of environmental concerns over the disposal of the resulting waste and possible accidents and wrong doings. Fossil fuel which is burned in thermal power stations involves air pollution, in general, and $CO_2$ which causes warming of the atmosphere, in particular. There is a danger that the environment will be destroyed long before the fossil fuel will be used up. The effect of warming up the atmosphere is already a measurable phenomenon causing an increasing concern. On the other hand, estimates of the benefit of using clean renewable energy vary between 2 and 9 U.S. cents per kWh. Thus, there is a demand for a source of energy utilizing a renewable natural resource without the environmental damages.

The most common sources of energy employing renewable natural resources are hydroelectric plants, windmills and the burning of biomass. Hydroelectric plants plus the burning of biomass account for about 20% of the power produced in the world. It is unlikely, however, that the use of hydroelectric plants will significantly increase since the remaining sources are not readily exploitable and are not large in extent compared to those which have already been exploited. similarly, energy produced by windmills is rather insubstantial on a world scale and has limited application. Several other renewable energy sources, such as Ocean Thermal Energy Conversion (OTEC), will not provide the necessary capacity or a low enough cost. The above mentioned renewable energy sources are not only limited in their capacity, but they are localized in certain small regions of the globe. Therefore, the need for an energy source using a renewable natural resource has largely gone unanswered.

One such source of energy utilizing a renewable resource exists in the geothermal, meteorological cycles of the earth. On a simplified global scale, the main cycle involves the sun heating the land, warming the air above and causing the air to rise. As the less dense warm air rises, a low pressure area is created which is filled by cooler, denser air from over the oceans. Thus, a natural convection occurs by the air flowing from the ocean to the land, rising above the land after being heated, and then falling over the ocean after being cooled. One of the most important geothermal cycles is the Hadley Cell named after its discoverer in 1735. Hot and humid air rises around the equator, then it expands and cools down. As a result of this action, rain is shed. The air then flows north and south around the globe. The air then descends mostly between 15° and 35° latitude, and turns back to the equator, while it collects moisture from the oceans, to replace the rising air. The descending air compresses adiabatically and warms up without regaining moisture, thus becoming hot and dry.

It is this descending air that produces the two belts of deserts around the globe. Clearly, hydro-electric power, wind energy and waves are also the result of the global geothermal cycles, however, the focus of the following is on utilizing another component of this cycle. The hot and dry air when cooled by a water spray will descend at an enhanced speed. This phenomenon occurs occasionally in nature and has been observed and recorded for a long time. In recent decades, it has been extensively studied because of its danger to aviation. It is sometimes called wind shear.

Some inventors have attempted to harness the geothermal energy in the atmosphere based on this simple and well-known principle that air can be cooled by spraying water into the air. Cool, moist air has a greater density than warm, dry air, and thus tends to fall toward the ground. For centuries, man has witnessed this phenomenon as a cloud burst on a hot summer day produces high winds and cools the area near the shower.

U.S. Pat. No. 3,894,393 to Carlson (the Carlson patent) suggested harnessing this power by initiating a downdraft of air within a duct by spraying water at a high elevation into the duct and extracting energy from the downdraft with a turbine near the outlet. There are several shortcomings in the Carlson patent, however, that appear to render the teachings impractical.

For example, the Carlson patent explains the physics and calculates the amount of water needed to be sprayed into the air at the top or at various elevations within the duct. According to the Carlson patent, the amount of water required is exactly equal to the amount that is evaporated to cool the air by $\Delta T$ (column 5, lines 35–40), where it appears $\Delta T$ is the average potential temperature difference, or cooling, between the inside and outside air (as it becomes clear from the equation on line 65). The average potential cooling, however, is less than the maximum cooling over the full height of the duct which occurs at the bottom of the duct. If only the suggested amount of water is used, optimal power output will never be reached. Also, spraying the suggested mass using sea water would appear to cause huge amounts of salt precipitation that will be difficult to handle.

The present invention, unlike Carlson, teaches that the maximum cooling depends on the amount of water spray and the droplet sizes, so that a maximum net power will be obtained. For a simplified explanation, the air outside the duct is assumed to follow the dry adiabatic process where the air is warmed due to compression about 1° C. for every 100 meter drop in elevation. On the other hand, the air inside the duct theoretically can be immediately cooled by saturation. And then, upon being lowered and continuously wetted to saturation, the inside air is warmed about 0.5° C. for every 100 meter drop in elevation following the wet adiabatic process. As uniquely shown by this invention, the air, as it falls inside the duct, can be further cooled by evaporation of more water keeping the air temperature as close as possible to the wet adiabat. Thus, an amount of water sufficient only for the average potential cooling as defined by the Carlson patent reduces the effective cooling or the effective height of the duct thereby providing only a fraction of the maximum potential cooling taught by the present invention.

Additionally, the Carlson patent does not appear to realize that the cooling within the duct takes place gradually rather than immediately, thereby further reducing the effective cooling or effective height of the duct. Thus, the average actual cooling mentioned by Carlson as the yardstick to determine the necessary amount of water spray is less than the average potential cooling and, therefore, the amount of water to be sprayed as suggested by Carlson is significantly less than the amount needed to achieve maximum potential cooling.

Further, the Carlson patent does not appear to recognize that a mass of water larger than theoretically will evaporate must be sprayed, as taught by the present invention disclosed herein. As the water droplets diminish by evaporation, the concentration of solutes increases, which decreases the vapor pressure at the surface of the droplet. The evaporation rate then decreases due to the decrease in the difference between the vapor pressure at the surface of a droplet and the vapor pressure of the air. Thus, unlike Carlson, the present invention teaches that a substantial amount of excess water must be sprayed into the duct to ensure the proper vapor pressure drive and rate of vapor and heat transfer to evaporate water within the duct and thereby achieve the maximum potential cooling.

Another shortcoming in the Carlson patent is the suggestion to make the droplet diameter very small to promote reaching maximum air density inside the duct as quickly as possible (column 6, lines 35–48). There are at least two negative consequences to this approach. First, reducing the diameter of the sprayed droplets dramatically increases the energy required to spray the water. Depending on the size of the droplets, the energy expended may outweigh the energy produced within the duct. Second, use of smaller droplets increases the costs of preventing the drift of the water and air mixture that exits the outlet. These costs may be high, as the water/air mixture exiting the duct typically contains solutes, like salt, that have negative environmental impact.

Besides these negative consequences, the Carlson patent does not appear to realize that, according to the present invention, increasing the amount of water sprayed, is in some ways just as effective in increasing the net power as the spraying of smaller droplets. Both ways, increasing the overall water spray and reducing the droplet size, require higher energy investment that may render the benefits of the energy tower economically non-feasible.

Still another problem is that the formula for the calculation of power, as disclosed in the Carlson patent, does not appear to properly take into account the vertical distribution of temperature, density, degree of evaporation and air velocity. Further, the Carlson patent does not appear to take into account the energy loss coefficient that is required to compute the net power output.

Yet another deficiency of the Carlson patent is that the recommended amount of sprayed water can be easily evaporated, leading to the precipitation of solutes. In using both sea water and fresh water, assuming the fresh water is not distilled, the evaporation of the water will cause the solution to reach a concentration that will cause poorly soluble solutes as well as common salt to precipitate. This will pose a tremendous problem for the equipment and in trying to dispose of the precipitated solutes.

A final problem with the Carlson patent, unlike the present invention, is that it does not appear to appreciate the full energy that can be generated by spraying excess water based on the hydro-drag effect. That is, water that does not evaporate transmits its momentum as well as its gravitational energy to the air within the duct. By locating the duct at an angle on the side of a hill, the Carlson patent does not appear to take advantage of this energy source.

Another system for generating electricity in an arid environment is disclosed in U.S. Pat. No. 4,801,811 to Assaf et al. (the '811 patent). The '811 patent, however, also has a number of drawbacks. By asserting that the maximum velocity within a duct is unrelated to the exit area (see e.g., column 2, lines 14–18 and column 1, lines 40–41), the '811 patent appears to contradict both the laws of conservation of mass as well as the conservation of energy. Further, in equation 1 of the '811 patent the pressure drop over the turbines is assumed to fully utilize the air head as if in a static state with no flow, no kinetic energy component and no energy losses. In equation 2, on the other hand, the velocity head used assumes the whole head of the air turns into a velocity head or kinetic pressure, as if there is no pressure drop over the turbines and no energy loss of any kind. The power is then calculated by multiplying the two: the velocity as if the whole head is turned into kinetic energy by the pressure drop as if the same head is turned fully to a pressure difference. This use of the same energy twice, with the addition of other mistakes, leads to an unattainably high power calculation.

Similar to the Carlson patent, the '811 patent also does not appear to take into account the need for, or advantage of, spraying excess water. The '811 patent states that the amount of water sprayed should equal the amount of water needed to saturate the air (e.g., column 5, lines 53–57). From the example given (e.g., column 5 line 60 to column 6, line 2), the intent appears to be that the saturation is to bring the air to the wet bulb temperature at the top inlet. As stated above, this results in numerous deficiencies that are even worse than those in the Carlson patent.

The recommendation of increasing the amount of water sprayed by 20% when using sea water (column 6, lines 33–51) does not cure these deficiencies. This increase still only provides about 70% of the optimal amount of spray water, resulting in a significant loss of power.

Also similar to the Carlson patent, the '811 patent does not appear to take into account the full energy that can be generated by spraying excess water based on the hydro-drag effect. Besides strictly asserting that only the amount of water needed to saturate the air should be sprayed, this reference discloses systems in canyons and on the slopes of mountains that would prohibit utilizing the hydro-drag effect.

Further, the '811 patent discloses that the size of the sprayed droplets should be less than about 100 microns in diameter (e.g., column 9, lines 32–38; column 8, lines 39–43; and column 6, lines 10–16). As mentioned above, producing water droplets of such a small diameter requires a significant energy investment. Since this reference suggests that the droplets should not exceed about 100 microns diameter, the average droplet diameter will be much less and thus the required energy will be even higher. The anticipated water head for spraying will be in the order of 1000 m (100 bars) or more, depending to a great extent on the droplet diameter distribution of the atomizer. Thus, the whole installation will be energetically useless or very marginal at best.

The '811 patent also does not appear to fully appreciate the manner in which friction losses affect the output. In evaluating some calculations in the Carlson patent, the '811 patent states that the friction losses would be so great that no useful work would result (e.g., column 1, lines 56–57). This evaluation appears to be incorrect because, regardless of the size of the friction coefficient, there will be some useful energy left if the installation is properly structured as discussed below. This is because the losses associated with such high Reynolds numbers under which the installation works increase very nearly in proportion to the velocity head, and if the coefficient is higher, the air velocity will be lower, but never zero. As long as there is a positive net energy, net energy being the gross mechanical energy minus the pumping energy, the system can be designed such that there will always be a net deliverable energy regardless of the energy loss coefficient. The only case where there will be no net deliverable energy is if the pumping and spraying energy exceeds the produced power. If there is a net mechanical energy after subtracting the pumping power, there will be a net deliverable power regardless of the friction coefficient. The net mechanical energy has to be divided into energy losses and energy directed to the turbines for useful deliverable work over and above pumping. This division can be optimized in order to get the maximum rate of deliverable energy production from the system. Carlson discusses the possibility of dividing the net mechanical energy in such a way, but does not appear to recognize and prove the optimum and how it can be used to compute the whole system and determine its embodiment. In summary, the '811 patent does not contain any useful additions to Carlson's work.

U.S. Pat. No. 4,742,682 ('682 patent) by Assaf et al., in addition to the '811 patents discloses a heat exchanger which sprays warm brine into a tower to induce a downdraft that results in the cooling of the water and the production of energy. The '8111 patent, the '682 reference also incorrectly utilizes the full head for the pressure difference across the turbines and, again, the same head for the velocity head.

Further, the '682 patent appears to misjudge the required spraying head for producing droplets of a radius of 1 mm, stating the required head is 3 cm (e.g., column 5, lines 38–41). The '682 reference, in column 5, lines 42–45, states that "as long as the droplet radius exceeds 0.1 mm, the surface energy and thus the energy required to create the droplets is quite small". In reality, the energy required to produce droplets of this diameter using real atomizers with practical flow rates is hundreds of times greater than stated.

The feasibility of the design disclosed in the '682 patent is questionable since the suggested tower height is merely 10 meters. The stated purpose of the invention is to recover some of the energy in pumping condenser water to a cooling tower that is 10 meters high. Yet, by suggesting spraying droplets of such small diameter, the pumping head will be increased to about 1000 meters or more, and the spraying energy cannot possibly be recovered when the whole tower is only 10 meters high.

Also, as discussed above, this reference results in problems in collecting the air/water mixture that exits from the cooling tower because of the small droplet size. The disclosed collection plates (e.g. column 6, lines 40–45) would appear to be ineffective since water droplets of such small diameter will tend to follow the air streamlines and flow around the plates.

A further deficiency in the '682 reference is that it appears to be limited to high mixing ratios of water to air. In two examples, the reference discloses spraying 1 kg water per 1 kg of air and also 0.6 kg of water per 1 kg of air, whereas the preferred upper limit of water sprayed by the present invention is in the range not exceeding about 50 grams of water per kilogram of air.

Finally, the '682 patent deals with water that is heated up in a heat exchanger before being sprayed. Notably, such preliminary warming significantly reduces the net energy which is produced by the down-flowing air. In the present invention, the heat quantity added in the sprayed water does not exceed 6,000 Joules/kg air, even when the main effect is the hydro-drag effect.

The '682 patent appears to describe an inefficient cooling tower, certainly not an energy saving installation. For example, with a water/air ratio in the range of 0.5 kg/1 kg to 1 kg/1 kg and a water temperature just 100° C. greater than the air temperature, the heat added to the air is 21,000 to 42,000 Joules/kg of air. The dry air, which typically can potentially evaporate 5 grams of water per kg of air (cooling the air by about 12.5° C., characteristic of desert air) contains only about 12,000 Joules/kg cooling capacity. Thus, the cooling capacity of the air is much less than the heat which is intended to be extracted from the water spray.

U.S. Pate. No. 5,284,628 to Pruiett (the Pruiett patent) discloses a convection tower for cleaning pollution from large quantities of air by spraying water into the air at the top of a tower, where the spray precipitates out the pollutants and the evaporation of the water creates a wind that can be used to turn turbines and generate electricity. This reference, however, does not appear to disclose a device that can fulfill the two goals of air cleaning and energy production because, for example, if the tower is low enough to capture dirty air then it is not high enough to feasibly generate energy.

Polluted air is usually an inversion layer which has been humidified and cooled and is thus heavier than the air above it. In order to produce a significant pressure difference across the turbines at the bottom of the tower to generate electricity, there must be a significant pressure differential between the air inside the tower and the air outside the tower which calls for further humidification and cooling and a significant height of a cooling duct. If the tower disclosed in the Pruiett patent is drawing polluted air, then there is not much ability to further cool and saturate the already cool and humid air in the duct. Thus, the Pruiett tower appears to be ineffective at generating energy if it must fulfill its cleaning task.

Further, if the Pruiett tower is made high enough to make the generation of energy practical, then it will no longer function as an air cleaning device since the top of the tower will be above the polluted inversion layer. Thus, the two stated objects of this invention are entirely conflicting goals.

Even if the aims of the Pruiett patent would not have been conflicting in the sense that tall towers will capture no dirty air and low towers will not produce energy, they would be conflicting in another sense. High efficiency in cleaning large volumes of air would call for maximum air flow and maximum air velocity. On the other hand, a maximum power output would require a highly moderated air flow and a compromise between the pressure drop across the turbines and the energy losses due to high kinetic energy. In effect, the optimal rate of air cleaning is obtained at negative net deliverable power, where even the pumping energy is not compensated.

The optimal air velocity is explained in the following. In any case, one aim almost excludes a practical application of the other. Other than the combination with air cleaning, the Pruiett '628 patent adds nothing of practical or feasible value. It is suggested that in addition to air cleaning and power production, there will be a connected duct in which the humidified air will rise and the condensed water droplets will be collected as desalinated water. There are several grave deficiencies in this suggestion. The net power left for power production and air cleaning would become very small and possibly vanish completely, depending on the elevation difference between the down-flowing duct and the up-flowing duct. The amount of theoretically condensable water equals the moisture added due to the adiabatically warmed air on the way down. It is about 0.5° C. for 100 m and accordingly less than one quarter gram water/kg air/100 m. If, for example, the primary shaft is 1,000 m high and 400 m in diameter, and the second shaft is 700 m and the average cooling is about 10 centigrade, then the maximum rate of air flow is about 12.5 m/sec. Even assuming 100% collection of condensed water (which is absolutely impossible to attain, even closely), the rate of the distilled water production is 3.2 grams/m$^2$ cross section/sec. For a 400 m diameter duct, this amounts to a nearly 0.4 m$^3$/sec for the whole cross-section.

This example would result in zero deliverable power and no air cleaning and would produce, at the maximum, not more than 400 liters water/sec. The pumping power alone would be of the order of at least 130 MW. This means an energy investment of about 90 kWh/m$^3$ desalinated water. In comparison, sea water can be desalinated by reverse osmosis using a mere 4–5 kWh per cubic meter of desalinated water. Thus, to construct a 1,000 m×400 m main shaft and a twin tower of 700 m would require an investment which is at least an order of magnitude larger than the investment necessary for a conventional desalination plant of the same capacity and 20 times the energy outlay.

It is an object of the present invention to maximize the net deliverable power available through evaporative cooling.

A further object is to fully utilize momentum and the gravitational energy of unevaporated water droplets to produce energy.

Another object of the invention is to combine the effects of evaporative cooling and momentum and gravitational energy of unevaporated water droplets to optimize the net energy production.

Another object of this invention is to provide for a built-in energy pumped storage.

Yet another object is to desalinate water in a way which is more cost effective than present methods.

A further object is to intercept and reduce the volume of saline water that needs to be disposed, and to prevent salinization of fresh water sources.

Another object of the present invention is to enhance aquaculture.

Another object of the present invention is to enable the cooling of inland thermal power stations and utilize the waste heat of such stations.

SUMMARY OF THE INVENTION

A renewable resource power generation plant according to the present invention comprises a generally vertically extending duct having a side wall of a predetermined diameter, an inlet at a predetermined height and an outlet at an elevation lower than the inlet. A spray system is mounted adjacent the inlet for spraying droplets of a predetermined amount of water into the air, wherein a partial evaporation of the droplets causes the air to become cooler and denser than air outside the duct, creating a downdraft of air within the duct. A power system proximate the outlet recovers the energy from the downdraft of air.

One unique feature of the present invention is that the predetermined amount of water is greater than a calculable maximum amount of water that would theoretically evaporate in the air throughout substantially the entire predetermined height. Preferably, the ratio of the calculable maximum amount of water that would theoretically evaporate to the predetermined amount of sprayed water is in the range of about 0, when there is no cooling, to about no more than 0.9, if the main effect is the aero-cooling effect.

An advantageous result of adding liquid water to the downdraft is that the optimal net energy is produced because adding more water than can evaporate optimizes evaporative cooling and additionally generates energy in the power system through the recovered spray momentum and gravitational energy of the unevaporated water droplets. When there is an elevated water source, then gravitational energy is a primary source and a real addition to the net energy output. When the excess water needs to be pumped up to the spray system, the gravitational energy transmitted to the power system results in the recovery of most of this pumping energy.

Evaporative cooling is referred to as the aero-cooling effect wherein the water added to the air lowers the air temperature and increases the air density, thus creating a downdraft. The gravitational potential energy from the unevaporated droplets, and also some initial momentum of the sprayed droplets which is transmitted to the air in the duct, is referred to as the hydro-drag effect.

Adding liquid water to the air in the duct combines these effects to produce the maximum net deliverable power. Even when the air at the top inlet is saturated with vapor, there will still be some aero-cooling effect due to the adiabatic warming as the air descends and due to the presence of excess water.

The hydro-drag effect contribute to the primary energy when it uses an elevated water source. The hydro-drag effect can also be used as the main source of deliverable energy when the water must first be pumped up, as in the case of pumped storage. In the case where the hydro-drag effect is the main source of deliverable energy, the preferred rate of spray that would utilize fully the installed capacity of the plant is found to be up about 5 times the rate of spray used when the aero-cooling effect is the main effect to obtain the same power.

Preferably, the total heat mass added to the air in the duct by the droplets of sprayed water is less than about 7,500 Joules per kg of air.

The predetermined height of the duct is generally greater than about 100 meters, and preferably greater than about 500 meters.

Also, the ratio of the predetermined height to the predetermined diameter is an advantageous feature in optimizing the performance of the power plant. For a power generation plant designed to have a fixed installed output, the predetermined height is preferably in the range of about 3 to 5.5 times greater than the predetermined diameter. For a power generation plant designed to have a fixed height, the predetermined height is preferably in the range of about 2 to 2.5 times greater than the predetermined diameter.

Another preferred feature of the present invention is that the inlet comprises a substantially horizontal flared portion curving radially out from the top of the side wall. The radius of curvature of the flared portion is preferably about 0.2 times the predetermined diameter. Alternatively, the second derivative of the flared portion is approximately continuous.

In a presently preferred embodiment of the tower construction the side wall includes an inner cylinder concentric with and structurally linked to an outer cylinder for structural stability enhancement. Further, the side wall may include at least one room defined by plumbing, electricity, and a ceiling and a floor disposed between the inner cylinder and the outer cylinder. This inner room can be utilized for needed services to the tower and for other functions, such as residential, commercial, hotel floor space, etc.

To promote the most efficient air flow, the inner surface of the inner cylinder in the preferred embodiment has a roughness less than about a few units in a million in relation to the predetermined diameter. The shape of the inner surface of the inner cylinder is also important in providing efficient air flow and in eliminating protrusions that will cause the falling droplets to become attached to the inner surface. The shape of the inner cylinder may be a cross-section of a circle, a polygon, a circle having circular sections bulging out and the intersection of two circular sections forming a sharp internal edge, a circle having circular sections alternating from bulging in to bulging out forming an undulating surface, and a circle having vertical radial ribs.

An advantageous feature of the present invention is the shape of the outer cylinder, which helps to reduce the structural load placed on the duct. The outer cylinder may be in the shape of stacked vertical discs having outer circular edges greater in diameter than inner circular edges, wherein said outer vertical edges are tied vertically and diagonally by tension elements. Alternatively, the outer cylinder may include an outer surface in the shape of a spiralling vertical serration having outer circular edges greater in diameter than inner circular edges, wherein said outer vertical edges are tied vertically and diagonally by tension elements.

The outlet of the duct also uniquely contributes to the efficiency of the power plant. The outlet comprises a flared portion curving radially out from the bottom of the side wall to form a diffuser region having a radially outward increasing vertical cross-sectional area which reduces the velocity of the outflowing air, wherein the is ratio of the vertical cross-sectional area at the outermost point of the diffuser region to the cross-sectional area of the duct of a predetermined diameter is in the range of about 1:1 to 3:1. Preferably, the ratio is in the range of about 1.25:1 to 2.25:1 Also, the radial length of the turbine and diffuser region preferably extends the overall radius of the tower base by about ½ the predetermined diameter of the duct.

In accordance with another advantageous feature of the present invention, the water is preferably supplied from an elevated water source. This source can be a natural source of water or a plurality of elevated operational reservoirs capable of storing a volume of water that will allow a water spray distribution with time over a whole week not in conformity with the time distribution of pumping the reservoirs operating only in part of the hours over the week, preferably, when the return or delivered energy is low. A plurality of operational reservoirs may be advantageously mounted within the tower side wall and provide a supply of water lasting in the range of about minutes to fractions of an hour. This is in order to divide the pumping into serial elements and parallel elements, as well as providing other advantages.

The sprayed droplets may have an average diameter greater than about 100 microns, preferably in the range of about 150 to greater than 500 microns. The spray system provides a substantially uniform ratio of droplets to air across the entire cross-section of the duct. Local deviations in the droplet to air ratio are preferably less than about 10%.

The spray system can spray a volume of water ranging from about zero to the predetermined amount of water with an accuracy within about ⅟30 of the predetermined maximum amount of water. Further, the spray system has a substantially redundant capacity, preferably greater than about 50%. The water atomizers should preferably be installed in a way that a large proportion of the spraying energy can be recovered. This is, in part, by directing the spray in such a way that the water velocity vector will be substantially parallel to the local air flow velocity vector.

The spray system may advantageously spray droplets having an electrical charge, wherein areas of the electrically charged droplets of one sign alternate with areas of electrically charged droplets of the opposite sign. Alternatively, areas of the electrically charged droplets may alternate with areas of droplets having no charge, the preferably electrical charge sign being positive. The power system may be adapted to attract the electrically charged droplets. The spray system may further include a secondary spraying system mounted at the perimeter of the duct, at any elevation but preferably near its bottom, for spraying droplets greater in diameter than the droplets from the spray system mounted adjacent the inlet. The secondary spray system droplets are preferably greater than about 300 microns in diameter. Further arrangements include main spray water near the inlet charged electrostatically by one sign and the secondary spraying system mounted at the perimeters of the duct charged electrostatically by the opposite sign. Another location of a secondary spraying system can be in the diffuser region, radially outward from the power system where more than one spray may be utilized having different charge signs and possibly using low salinity water.

The power system may further comprise a plurality of shrouded turbines for recovering the energy from the downdraft of air. The turbine blades form a close fit with the shroud so that air cannot circumvent the turbines. A unique feature of the present invention is that the amount of recovered energy is substantially maintained when a predetermined number of the plurality of turbines are closed to prevent airflow therethrough. Also, a select number of the plurality of turbines may directly power the supply of water to the spray system avoiding the need to produce electricity by the turbines and then use this electricity to motivate a motor that in turn moves the pump. To further maximize the efficiency of the power plant, the blades and/or guide vanes of the plurality of turbines may have adjustable pitch and the turbines may preferably be designed to work at least two fixed rotational speeds in accordance with the turbine head in order to achieve high efficiency.

The power generation plant may further comprise a collection area around the duct having ground preparations for inhibiting the absorption of unevaporated water droplets, carried in the downdraft of air exiting the outlet, into the ground and directing the droplets into a plurality of collection reservoirs. The ground preparation comprises at least two alternating layers of impermeable soils and impermeable membranes having seams, wherein the seams of one layer are laterally spaced apart from the seams of an adjacent layer. The collection reservoirs may uniquely supply the collected water back to the spray system when the sprayed water has lower initial solute concentration. Also, the collection reservoirs may supply the collected water to a disposal site and to an energy recovery system comprising hydroelectric turbines.

A synergistic combination of technologies results when adding a desalination system connected to the water supply and spray system wherein the predetermined amount of water may flow through the desalination system before reaching the spray system. Preferably, the desalination system utilizes the reverse osmosis method. Alternatively, only a fraction of the predetermined amount of water may flow through the desalination system.

Another unique synergistic combination results when adding an aquaculture farm connected to the water supply system wherein the predetermined amount of water may flow through the aquaculture farm before reaching the spray system. Alternatively, similar to the desalination system, only a fraction of the predetermined amount of water may flow through the aquaculture farm.

Another unique feature of the present invention is that preferably 1/3 of the net energy is used for energy losses due to the air flow and 2/3 of the net energy is turned into the turbines to produce a net deliverable power, the net energy being defined as the potential energy due to the increased air density under static conditions minus the energy required for pumping and spraying the water. The division of 1/3 and 2/3 is approximate, but with only small deviations as will be explained below.

A renewable resource power generation plant according to the present invention also comprises a downdraft of air driven by the evaporation of the water droplets causing the aero-cooling effect and the spray and gravitational energy of the excess water falling within the duct causing the hydro-drag effect.

Also disclosed is a method for generating power, comprising the steps of isolating a column of air from the surrounding air, wherein one end of the column of air is at a greater elevation than the other end; adding a predetermined amount of water to the air column to maximize the cooling and density of the air at every elevation throughout the air column, thereby causing a flow of air down the column; and recovering energy from the air flow at the lower end of the air column. In adding the water, the predetermined amount of water is preferably in the range of about 1.1 to over 2.5 times a calculable maximum amount of water that would theoretically evaporate at every elevation throughout the air column. This is when the main power source is due to the aero-cooling effect.

The unevaporated water droplets resulting from adding more than the calculable maximum amount of water that would theoretically evaporate may be collected. These unevaporated droplets have a greater concentration of solutes than the water added to the air column. Additionally the collected droplets can be recycled, until a predetermined solute concentration level is reached, by adding a predetermined amount of collected droplets to the air column to increase the cooling and density of the air at every elevation throughout the air column thereby causing a flow of air down the column.

Further, the collected droplets that have reached the predetermined solute concentration level may be disposed by introducing the collected droplets into a water source where the collected droplets are gradually diluted over time. Preferably, the collected droplets are introduced at a low velocity at a water depth having a similar density to the density of the collected droplets.

A method of disposing of a solution containing environmentally harmful concentrations of solutes is also disclosed, comprising the step of introducing the solution into a body of water where the solution is gradually diluted over time. Preferably, the solution is introduced at a low velocity at a water depth having a similar density to the density of the solution. The above method of disposing the concentrated brine into the water depths also makes it possible to load into the water different pollutants such as organic refuse from fish growing, sewage, sludge, etc. This will delay and dilute the effect of such pollutants. The increased concentration of this water and its reduced volume can also be utilized in disposing of solutes that would otherwise salinize fresh water resources.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE DRAWINGS

Figure 21:
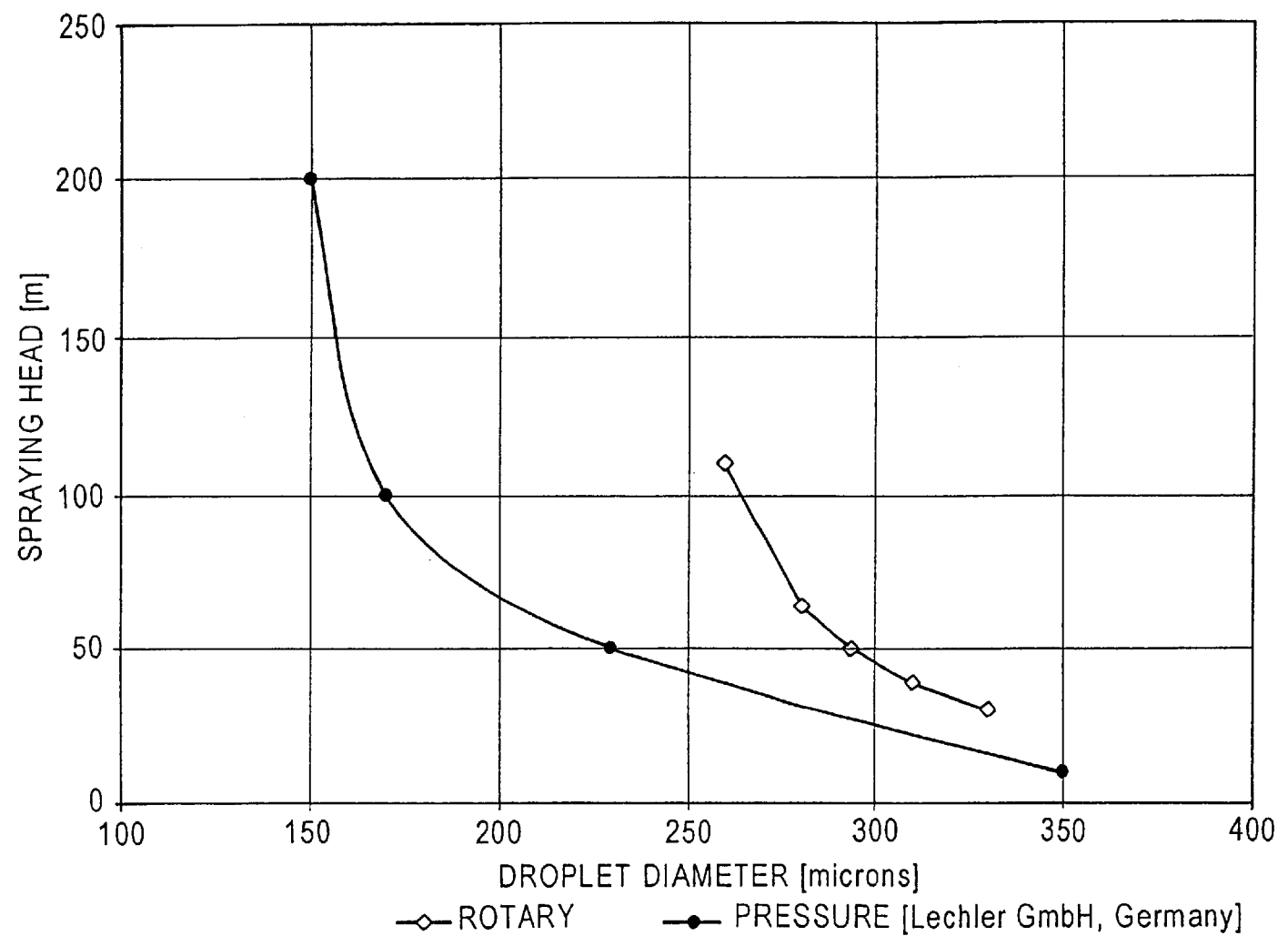

FIG. 21 is a graph depicting the change in required spraying head for a given average droplet diameter for two different type atomizers;

DETAILED DESCRIPTION OF THE INVENTION

Overview of Hydro/Aero-Power Generation

Figure 1:
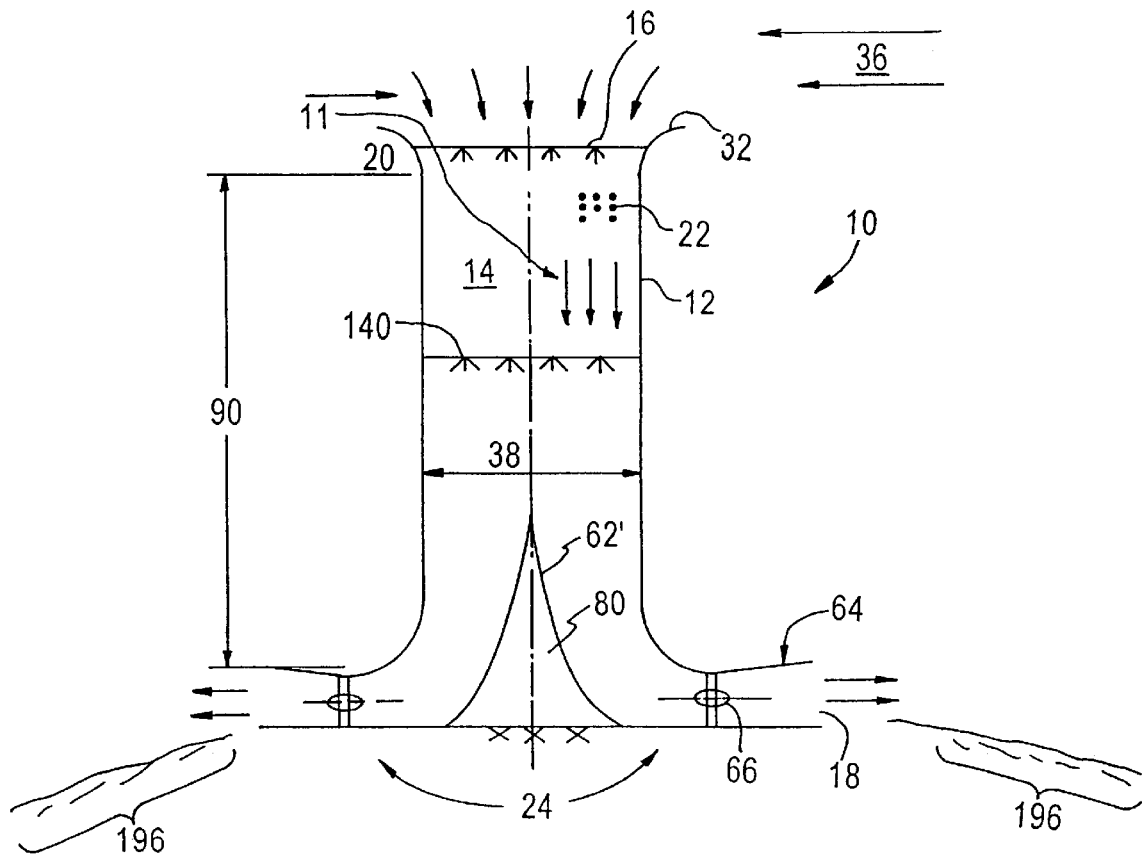
FIG. 1 is a schematic cross-sectional view of the preferred embodiment.
Figure 2:
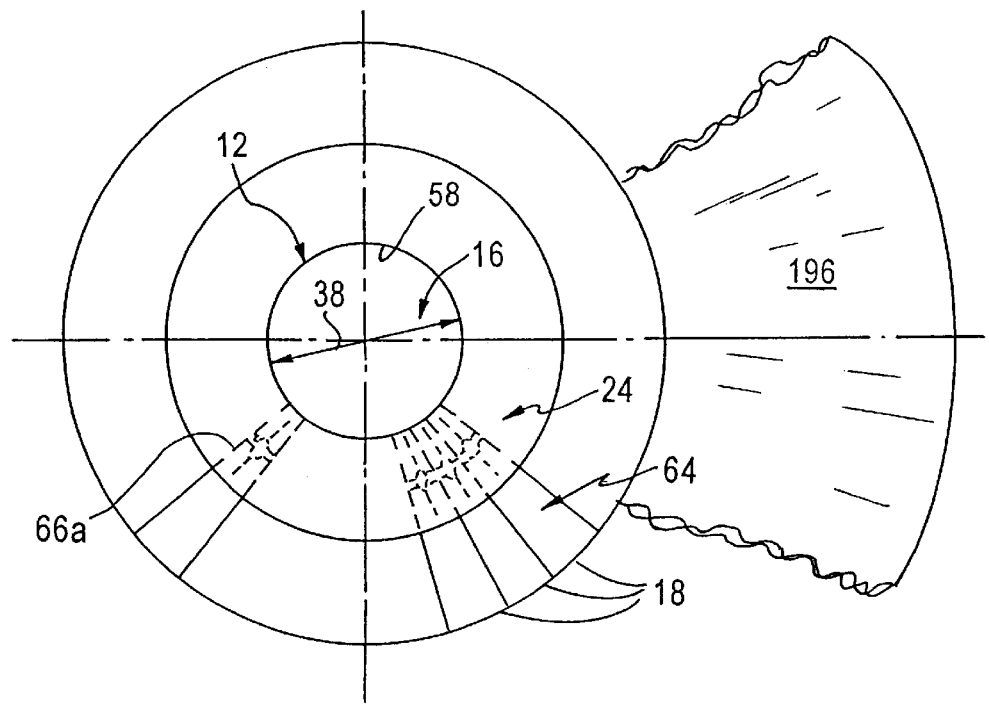
FIG. 2 is a top view and partial cross section of the preferred embodiment.

The present invention comprises a tower, generally designated by reference numeral 10, for generating power by producing a downdraft 11 of air to power a turbine arrangement disposed within the tower. Referring to FIGS. 1 and 2 of the preferred embodiment, tower 10 includes a cylindrical side wall 12 forming a vertical interior duct 14 having an open top or inlet 16 and an open bottom or outlet 18. Spray system 20, receiving water through pumped storage and/or other unique supply means described more fully below, sprays water droplets 22 over the cross-sectional area of duct 14, preferably at the upper portion of tower 10 in the proximity of inlet 16. The addition of droplets 22 evaporatively cools the air within duct 14, increasing the density of the inside air. The substantially greater density of the inside air compared to the air outside duct 14 creates a pressure difference that causes downward movement of the inside air. The downdraft of air powers shrouded turbine array 24, preferably located at the bottom portion of duct 14, before exiting at outlet 18. By confining the moving air within duct 14, a large percentage of the available energy can be extracted by shrouded turbine array 24 and applied as useful work.

Stated differently and in a more conceptual manner, the present invention comprises having an elevated water source and the possibility to drop the water over a certain height to utilize the gravitational energy of the water, very much like in any hydroelectric power station. However, the water is not dropped continuously through a penstock in the liquid phase. Rather, the water is first broken into droplets and sprayed into the air. The drag forces between the falling droplets and the air transmit any initial momentum and the full weight of the droplets to the air in the form of extra pressure in the air column. Confining the air and the falling droplets inside a substantially vertical duct with smooth walls will produce a vertical downdraft of the fluid. The droplets and the energy of the vertical motion of the air can move turbines that lie in the path of the flowing fluid mixture. The shrouded turbines will motivate electrical generators or will do other useful work. This is called the hydro-drag effect.

The topographic drop of the water can be produced by first pumping the water to a high elevation, as is common in pumped storage stations. The drop can also be achieved in part by pumping and in part by a natural topographic difference between the water source and the base of the duct.

The water droplets in the hydro-drag effect will evaporate to some extent if the air into which it is sprayed is not initially saturated with moisture. Alternatively, as the air descends, it compresses and warms up adiabatically. Then it can absorb more moisture and cool down. The result of the evaporative cooling is that the air obtains a higher density and further enhances the vertical pressure gradient and vertical downdraft. This effect of evaporative cooling is called the aero-cooling effect. Thus, compared to normal hydropower stations, these effects create an energy gain beyond the gross potential water drop energy, producing more useful energy.

In the places where the air is initially hot and dry and there is no natural high level water, the aero-cooling effect will become dominant. According to the present invention, the hydro-drag effect is still an essential and significant part without which the aero-cooling effect is either not feasible at all or at least much less efficient.

There are several reasons for this:

(1) It is necessary to spray water in excess to the quantity which will potentially evaporate, because it is essential to maintain high enough rates of evaporation, heat and mass transfer between the air and the droplets continuously as the air falls vertically through the duct.

(2) In water which contains salts, the vapor pressure will greatly reduce when a large part of the water evaporates. Unless the solution remains sufficiently diluted the rate of evaporation will slow to a stall.

(3) The excess spray maintains a high rate of evaporation and cooling from the very beginning and thus makes the effective average cooling higher, i.e., the effective cooling height increases.

(4) Unless the solution in the droplets is sufficiently diluted, solid crystalline salt may accumulate in high volumes that could add up to tens of millions of tons per year. This volume of salt is very difficult and expensive to clear out.

(5) The excess pumping and spraying require higher pumping energy. However, with the hydro-drag effect made possible by the present invention, much of this pumping energy can be recovered. In fact, the major part of the full energy for the excess water is recovered because the unevaporated water at every elevation of the shaft exerts its full weight to the air column within the duct and the spraying energy is in large part recovered by the transmission of the droplets initial momentum to the air.

(6) When the main energy source is from the aero-cooling effect, there is an important use of the hydro-drag effect over and above its ability to help maximize the net deliverable power. The hydro-drag effect additionally provides the capacity to have built-in pumped storage in several forms (as will be explained in the following), adding considerably to the economy of the power plant and the quality of the electricity supply.

In accordance with a unique feature of the invention, enough water is sprayed to achieve the maximum output power through the combination of the aero-cooling effect and the hydro-drag effect. As more fully described below, aero-cooling involves harnessing the energy of evaporatively cooled air while hydro-drag involves utilizing the initial momentum of the spray and gravitational energy of unevaporated water. In order to achieve the maximum net power and optimize inside air density through evaporative cooling, considerably more water than will saturate the air at the inlet 16 needs to be added to the air. The excess or liquid water not initially evaporated is available for evaporation as the air mass descends, adiabatically warming and becoming more dense. The liquid water optimizes the inside air density by allowing the evaporation to approach the theoretical maximum at every elevation, thus creating a larger pressure gradient. Further, spraying even more water, in addition to the amount required to achieve optimum evaporative cooling and inside air density, utilizes the gravitational energy of the unevaporated water as an additional energy source to further increase the pressure gradient. Thus, the aero-cooling effect and the hydro-drag effect sum up to produce the maximum output power.

Figure 3:
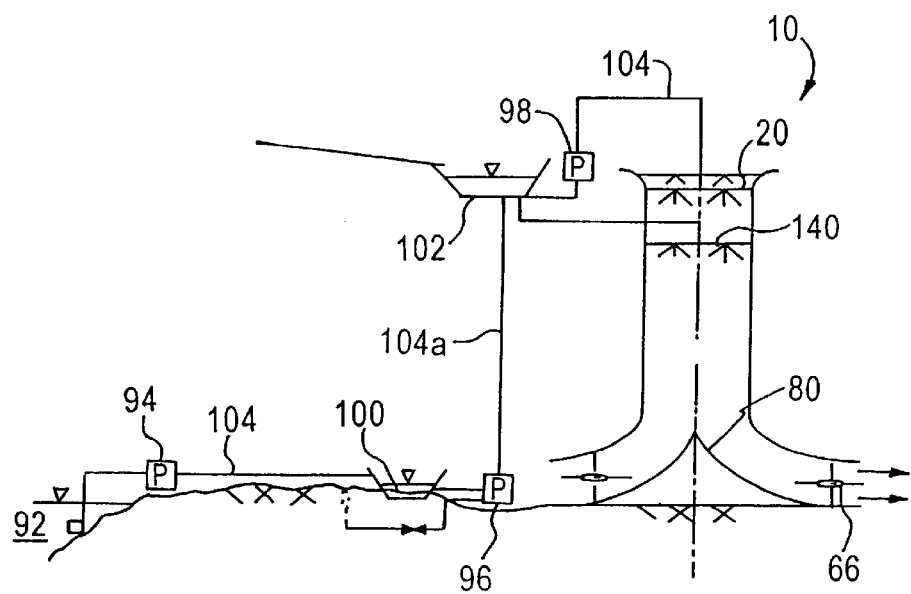
FIG. 3 is schematic sectional view of the preferred embodiment with the water supply system and pumped storage.

The design of tower 10 lends itself to the efficient use of other technologies. Referring to FIG. 3, the water supply system can be easily adapted to take advantage of pumped storage of reserve water. Operational reservoirs at varying elevations, such as low level operational reservoir 100 and high level operational reservoir 102, store water for use when pumping water is more costly due to high electricity demand and high electricity cost. The reservoirs are recharged at times when there is a low electricity demand and the revenue for sold electricity is also low. One of the pumped storage modes is the return of the collected unevaporated water or end brine from collection reservoir 220 (FIG. 4) through a conduit to a disposal site through a turbine (not shown) at times when the revenue for delivered power is highest. The upper operational reservoir 102 may be used for driving the spraying system with the head produced by the elevation difference, thus producing a very high gain.

The selective pumping ability leads to an increased profit on electricity which can be sold when the return is higher. This is in the normal running of the aero-cooling effect. The pumped storage, however, can be utilized with quantities of water higher than those necessary for the aero-cooling. In these cases, the hydro-drag effect may be used by itself. Yet, the turbines used are the same as those in the aero-cooling effect. For example, the hydro-drag effect may be used during winter when the aero-cooling effect is minimal, but the turbines, the generator and pumps are still available.

Stated differently, the power system of the Energy Tower invention and water spray are designed to be operated by both effects, the aero-cooling effect and the hydro-drag effect. The proportions of both effects can be adjusted to meet variable climatic conditions. When there exists an elevated water source, the hydro-drag effects forms a primary energy source which is transmitted to the power system, while providing an aero-cooling effect. The hydro-drag effect could be used also for recovery of pumped energy storage, as well as to recover a large part of the pumping energy when the primary energy source is due to the aero-cooling effect, thus making it possible to optimize the contribution of cooling. The fact that the gravitational energy invested in the pumping can be recovered reduces considerably the energy overall expenditure in trying to spray more water so that the cooling rate will be faster and thus the utilization of the aero-cooling effect more complete.

Figure 4:
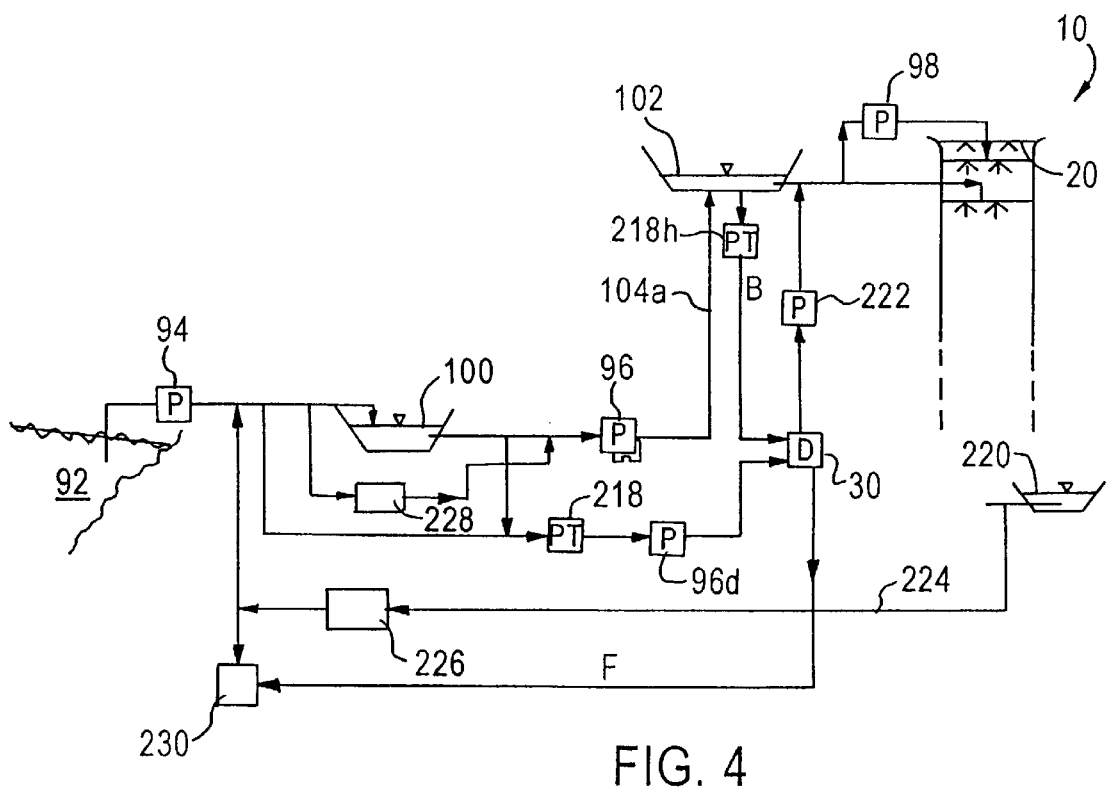
FIG. 4 is a schematic sectional view similar to FIG. 3, but further including a desalinizing plant and a collection reservoir.

Also, the design inherently complements a sea or brackish water desalinizing plant 30, as illustrated in FIG. 4. Desalinizing plant 30 can be easily added to the water supply system without extra costs, such as for pipes and pumps. Large savings in investment as well as energy outlay can be proven. Further, desalinizing plant 30 can utilize the head produced by the pumped storage and desalinate water more efficiently than conventional desalinization plants. The result would be a lower cost for energy.

Further, tower 10 can be used in conjunction with aquaculture to exploit the availability of a large supply of water to make aquaculture more economically feasible at locations inland and at elevations above sea level where otherwise the cost to supply and dispose of water would be prohibitively high. Additionally, the water after being used in aquaculture that normally would be of no use can be cycled through tower 10 to produce energy and to reduce the volume of water to be disposed. As will be shown, the combination of aquaculture and the tower to produce energy can have environmental advantages.

Further advantageous combinations of these technologies with the present invention will be discussed in detail below.

For purposes of the specification and claims, "aero-cooling effect" means the process of evaporating water into air to produce cooler and denser air, creating a downdraft within a duct to produce energy. The term "hydro-drag effect" means utilizing the mechanical energy of unevaporated droplets, the gravitational energy and the initial momentum of liquid water falling within a duct for the production of energy. "Fluid" is the mixture of unevaporated water and air (at varying levels of saturation) that comprises the downdraft within the duct. The term "pumped storage" refers to using surplus low value energy to pump water during off-peak periods to an elevated reservoir, where it becomes available for generating high-value peaking energy. More generally and conceptually pumped storage is formed when the time distribution of the water supply and the time distribution of the spray do not coincide "Installed capacity" is the maximum capability of the plant to produce power, which would involve all components of the plant working at maximum capacity given no redundancies.

Plant Design

The main driving force of the power produced is the extra pressure of the air column inside duct 14 as compared to the pressure of the outside air. This excess pressure is the cooling energy per unit volume of air, denoted as $E_c$. $E_c$ is further defined as the total mechanical energy per unit volume of fluid in the duct including the pressure, the elevation and the velocity head terms in the Bernoulli equation relative to the outside air when the rate of fluid flow in the duct diminishes to zero and there are no energy losses. $E_c$, measured in Pascals, is expressed mathematically as $$E_c = \int g(\rho_i - \rho_o) dz \tag{1}$$

where g=gravity (m/sec$^2$);

$\rho_i$=density of the fluid inside the duct, including liquid water droplets (kg/m$^3$);

$\rho_o$=density of the air outside the duct (kg/m$^3$) and z=elevation of the duct (m).

The explanation of Equation 1 can be simplified by relating $\rho_o$ initially only to the change in air density due to cooling. $E_c$ is then the potential energy of this process due to cooling alone.

Equation 1 is true in the case where the air is completely static both inside and outside duct 14. Under dynamic flow conditions, $E_c$ is expressed by a more complex equation that takes into account the velocity head at inlet 16 which produces a local pressure deficit and through it some density differences in the moving air. Correction of Equation 1 is of secondary importance, however, since this pressure deficit leads to typically less than 3% of the anticipated density difference. Thus, Equation 1 can be used to estimate $E_c$ in dynamic flow conditions, as the 3% error is negligible for practical purposes of the following needed deductions. Therefore, $E_c$ is really the motive force for the whole process. It is a main component of the mechanical energy per unit volume of fluid inside duct 14.

The dynamics of the air flow affect $E_c$ in several ways. One way is the change in the velocity head as described above. But a more influential parameter is the rate of cooling. Given a certain amount of sprayed water, a certain solute concentration in the sprayed water, and a certain distribution of water droplet diameters, the rate of cooling of the fluid within the duct per unit elevation will vary with the average air velocity. This is because the average air velocity will determine how much time is available for the sprayed water droplets to evaporate and cool the fluid. The same amount of sprayed water droplets will cool the fluid more if the fluid velocity is lower. This velocity, as will be shown, is a designable parameter.

So, $E_c$ is affected by the following:

(a) the initial air temperature and humidity;

(b) the amount of water sprayed per unit volume of air;

(c) the water droplet size distribution;

(c) the concentration of solutes which affect the water vapor pressure;

(e) the discharge of the fluid or its velocity; and (f) the magnitude of the prevailing outside wind.

With the exception of the initial air temperature and humidity, all of the other parameters depend on the decision of the designer. In order to solve the problem of the most efficient design for the present invention, the designer must define these parameters. Furthermore, to know the power generation capability of the present invention, the rate of fluid flow and the energy losses must be defined.

The maximum theoretical cooling energy which can be produced per unit volume of air, $E_{c\ max}$, can be described by reference to FIG. 5. An ideal immediate cooling of the air at the elevation of the spray system will produce a horizontal temperature line 82. If there is a very high water spray mass in the air and very fine droplets, the cooling is nearly immediate.

If after the initial cooling there is still a very large quantity of very fine droplets in the air and they follow the air in its flow down the duct, then the air temperature inside the duct will theoretically follow straight line 84 which represents wet adiabatic cooling, and the temperature decreases with the elevation at a rate of about 0.5° C. per 100 meters. In reality, however, the colder temperature inside the duct will look like the broken lines 86.

Figure 5:
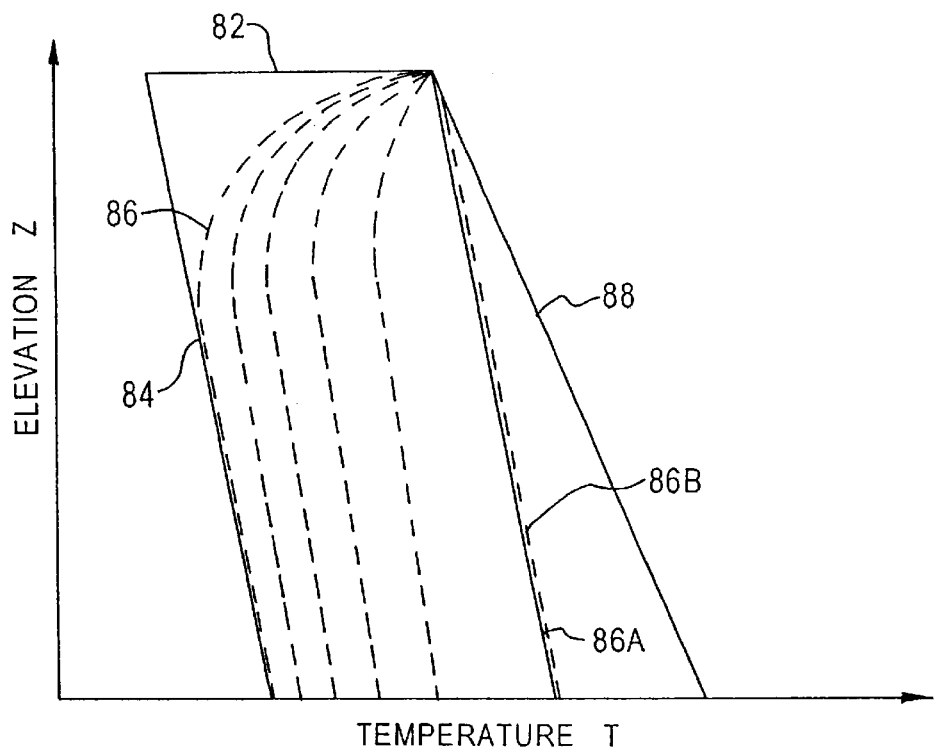
FIG. 5 is a graph depicting the temperature changes in dry outside air and saturated or newly saturated air with spray cooling over a change in elevation.

Each one of the broken lines 86 in FIG. 5 deviates from the ideal wet adiabatic cooling line 84, and the broken lines will be more to the right of the graph if the cooling is less intensive or not as fast as the ideal. The cooling will be less than ideal if:

(a) the amount of sprayed water is smaller;

(b) the droplets are larger in diameter;

(c) the air flow is faster, thus reducing the cooling time within the duct; and (d) the concentration of solutes is higher, which depends on the initial concentration and the degree of evaporation.

Line 88 represents dry adiabatic warming outside the duct. The horizontal distance between line 88 and any of the lines 84, 86 is the temperature difference between the inside and outside air. The area between the line 88 and any of the lines 84, 86 is an expression of the total cooling driving force. In reality, line 88 follows the atmosphere lapse rate which does not necessarily follow the dry adiabat and which does not have to be a straight line. The broken line 86B represents the change in temperature over a change in elevation inside the duct, without initial cooling due to the fact that at the top inlet the outside air is saturated with vapor (100% relative humidity). In this case the temperature difference between the inside air and the outside air is only due to the wet adiabatic compression inside as compared with dry adiabatic compression outside. Starting with saturated air, line 86B represents the minimum cooling effect even when the main effect is hydro-drag, or wet adiabat warming. As the wet adiabatic cooling (line 86A adjacent line 86B) is about 0.5° C. per 100 m, the maximum potential cooling at the bottom is the difference between the dry adiabat (line 88) and wet adiabat warming (line 86B), which is about 0.5H/100 in centigrades, where H is the height of the cooled column of air in meters. The average cooling is about half of this, assuming a triangular distribution, or about 0.25H/100. For a 1000 m height effective cooling, this amounts to about 90 Pascals pressure difference between the inside fluid and outside air, over and above the pressure added to the inside fluid by the unevaporated droplets. This pressure difference increases on the square as the square of the tower height. For a 1200 m tower, it will be 730 pascal. Of course, as mentioned, line 88 can have different shapes with slopes greater than 1° C./100 m and less than 0.5° C./100 m.

The considerations in choosing the different parameters will be discussed later. It should be noted, however, that without defining these parameters there is no way to determine how the power plant will operate, what the output rate of the plant will be, or what the net deliverable power will be.

Looking at Equation 1, the main term affecting $E_c$ is the density difference $(\rho_i - \rho_o)$ as a function of elevation, z. The ideal gas law can be used to approximate the density difference, $\Delta\rho$, using the temperature difference, $\Delta T$, and neglecting for now the density difference due to water droplets, as follows:

$$\frac{\Delta\rho}{\rho} \approx \frac{\Delta T}{T} \quad (2)$$

where in this case $\rho$ is the density of air and T is the absolute temperature in Kelvin.

The most important correction to Equation 2 is due to the difference between the molecular weight of vapor (18 gm/mol) and air (29 gm/mol). The mass of evaporated water per unit mass of air, m, is found roughly by comparing, over the elevation of the duct, the cooling of the inside air to the cooling of air being adiabatically compressed without any evaporative cooling. This is dry adiabatic cooling as represented by straight line 88 in FIG. 5, where the temperature decreases about 1° C. per 100 meters.

This cooling $\Delta T$ is not necessarily the temperature difference between the real air temperature outside and inside duct 14. If the real temperature difference is $\Delta T_t$, then from $\Delta T_t$ the evaporated mass per unit mass of air, m, can be estimated and $\Delta\rho$ can be corrected for the difference in molecular weight of vapor as compared to air. The correction is in the order of $$m\frac{(29-18)}{29} = \frac{\Delta T_t C_p}{L}\frac{(29-18)}{29} \quad (3)$$

where
m=the mass of water per unit mass of air that would have been evaporated over the elevation in a dry adiabatic state;
$C_p$=the specific heat in J/kgK; and
L=the latent heat of evaporation in J/kg.

Simplifying, the correction factor for air density is approximately $[(\Delta T_t) 1.6 \times 10^{-4}]$. Thus, because the cooling of the air is a result of vaporizing water, the air density will increase less than anticipated and the expected density should be reduced by this correction factor to get the true air density. Naturally, a true calculation of the density will have to include the suspended water droplets. This correction can also be made by introducing a special term for energy recovery.

For example, if a typical temperature difference is $\Delta T \approx 10°$ C. and $\Delta T_t$ is the same, then according to the ideal gas law the relative density change is $$\left|\frac{\Delta\rho}{\rho}\right| = \frac{\Delta T}{T} - (1.6 \times 10^{-4})(\Delta T_t)$$
$$\approx \frac{10}{300} - \frac{(1.6)10}{10^4}$$
$$\approx (3.3 \times 10^{-2}) - (1.6 \times 10^{-3})$$
$$\approx 0.0314$$

which is about a 5% correction over the 3% density increase. If 5 grams of unevaporated water droplets were present in excess of the evaporated water, then the density would increase by about 0.4–0.5% or about 12–17% of the density change due to cooling. There is another correction term $$\frac{\Delta P}{P}$$

due to change in the absolute pressure P of the flowing air. This term is of the same order of magnitude as the correction term for the water vapor molecular weight ($10^{-3}$) but having the opposite sign. Thus, the two more or less offset each other. Typically over 1000 m, the average increase in absolute pressure P is about 300 Pascals over and above an absolute pressure of over 100,000 Pascals, or about 3 parts in a thousand.

From this point on, assuming that instead of integrating $(\rho_i - \rho_o)$ in Equation 1, the following can be approximately substituted:

$$E_c = \bar{\rho}g\int\frac{\Delta T}{T}dz \quad (4)$$

where $\bar{\rho}$ is the average air density. Here we assume $E_c$ to be only the pressure build-up due to cooling of the air without the affect of the unevaporated water droplets. The integral in Equation 4 is simply the area between any one of the broken lines 86 and the dry adiabatic straight line 88 in FIG. 5 divided by the average absolute temperature, T.

Thus, it can now be stated that what affects the density difference integral (in Equation 1) is affected by cumulative temperature differences between the inside and the outside air with some corrections. To reiterate these factors:
 (a) a high amount of spray increases the cooling rate and the cooling energy, $E_c$ and at the same time the added density due to liquid water droplets;
 (b) finer droplets increase the rate of cooling and increase $E_c$;

(c) less solute concentration improves the cooling and increases $E_c$; and (d) slower rates of air flow extend the residence time of air in the duct, increasing the cooling and increasing $E_c$.

Assuming there is a value for $E_c$, the net deliverable energy output, N, of the plant based on the air downdraft is $$N = Q \Delta P_{net} \eta_t \qquad (5)$$
$$= Q[E_c - E_p + E_{R_1} + E_{R_2} - E_f]\eta_t$$

where

Q=the average flow or fluid discharge rate at the turbines in m³/sec, where $$\overline{V} = \frac{Q}{A_c} \qquad (6)$$

where $\overline{V}$=the average velocity of the air flow in the duct in m/sec, and $A_c$=the cross-sectional area of the duct in m², strictly speaking, the volumetric discharge Q as well as the velocity $\overline{V}$ vary slightly with elevation due to the changes in density and in vapor mass. The summed variations do not exceed one or two parts per thousand. In the exact numerical computation, this has been taken into account.

$\Delta P_{net}$=the pressure drop (in Pascals) across the turbines related to net energy production, the total pressure drop $\Delta P_t$ additionally includes the energy per unit volume of air devoted to pumping the water spray;

$\eta_t$=efficiency of the power system;

$E_p$=the pumping energy per unit air volume, $E_p$ in Pascals is the energy required to bring a quantity of water from the water source, lift it up to the top inlet and spray it into one cubic meter of air (see also Equation 7);

$E_{R1}$=recovered energy of water droplets that did not evaporate falling within the duct, in Pascals;

$E_{R2}$=recovered energy of unevaporated water sent from the base of the plant to the place of disposal, in Pascals; and $E_f$=the energy losses as a result of air turbulence and flow through the tower from the inlet down through the outlet and the kinetic energy lost through fluid that leaves the outlets 18 (FIG. 1).

Note that Q, the fluid discharge rate in m³/sec, is not known. Moreover, Q has an infinite number of possible values that will only be determined by the design of the plant. If this design has not been determined, then Q has not been determined and the net deliverable energy output, N, is also undetermined. None of the former patents recognized this point and none of them ever correctly calculated the flow rate or the true power output rate.

Note also that the cooling energy, $E_c$, is a function of the fluid discharge rate, Q. The rest of the terms depend very strongly on design decisions. The present invention specifies a selection of parameters that will make it possible to have the highest possible value of N, the net deliverable power, for a given set of air temperature and humidity and for a given height and diameter of the duct.

If the mass of pumped and sprayed water per unit volume of air is M, the total head of pumping is $H_p$ and the pumping efficiency coefficient is $\eta_p$, then the pumping energy, $E_p$, in Pascals is:

$$E_p = \frac{gM H_p}{\eta_p} \qquad (7)$$

where $H_p$ is in meters. As M (in kg/m³) is increased, $E_c$ also increases because of better and faster cooling. The total head of pumping, $H_p$, includes: the elevation difference between the water source and the bottom of the plant, $H_G$; the elevation difference between the bottom of the plant and the top of the diffusers, $H_D$; the distance from the top of the outlet 18 to spray system 20 (FIG. 1), referred to as the effective height, $H_e$, of the duct; the spraying head, $H_S$; and the energy losses head, $H_L$, due to friction losses of the water in the conduits. Thus, the total head of pumping is $$H_p = H_G + H_D + H_e + H_L + H_S \qquad (8)$$

As stated above, a spray of finer droplets causes a better and faster cooling which leads to a higher cooling energy $E_c$. But spraying finer droplets requires a greater spraying head $H_S$. Spraying more water also increase the cooling, but results in a higher energy loss head $H_L$. Moreover, increasing the sprayed mass increases M in Equation 7 and the pumping energy $E_p$. Thus, to get the maximum net energy N, the optimum relationship between $E_p$ and $E_c$ must be determined for each set of parameters. None of the former patents recognized this consideration and none specified the design for maximum output.

Through experimentation, in the case when the aero-cooling effect is dominant, the recommended mass of pumped and sprayed water M was found to be equal to $Rm_b$, where R is between 1.1 to greater than 2. This range is true as long as the main consideration is the net deliverable power maximization and the pumping head from the water source to the base of the tower is not too excessive. When the elevation difference between the water source and the base of the tower is excessive, then the optimal discharge coefficient will become somewhat smaller. Here $m_b$ is the total amount of moisture that can saturate the air at the bottom of the duct when the air is brought from the top to the bottom of the duct over an unlimited time period and including a sufficient water spray. This theoretically defined mass of water $m_b$ is a function of the difference in elevation of the inlet and outlet and the temperature and humidity of the air entering the inlet. Thus, one of the design decisions is to set M to be between 1.2 to greater than 2 times $m_b$ in order to achieve higher cooling, however, the result is increased pumping energy $E_p$. In accordance with the present invention, M is determined in a way that a maximum net power will be obtained.

The energy to pump the extra recommended water mass M can be considerably reduced by recovering the gravitational energy of the mass of the unevaporated water, $m_u(z)$, which is a function of elevation z. The recovered energy is $$E_{R_1} + E_{R_2} = \int_0^{H_e} m_u g\, dz + m_u(z=0) H_G g \qquad (9)$$

where the terms are defined as above and $m_u(z)$ is the unevaporated water mass per unit volume at elevation z. Some head losses may be subtracted from Hg.

$$E_{R_1} + E_{R_2} > (R-1) m_b (H_e + H_G) \eta_t \qquad (10)$$

The recommended water mass M can be defined also as $M = R m_b$, where R is the relative discharge coefficient. In other words, the excess water factor R may range from 1.1 to more than 2. Setting R=2, then at any elevation the unevaporated water mass $m_u(z)$ is larger than M/2, and the recoverable energy is nearly half of the pumping energy:

while the excess pumping energy due to the excess water spray is $$E_{P_{excess}} = (R-1) m_b [H_G + H_D + H_e + H_L + H_S]_{excess} / \eta_p \quad (11)$$

Dividing Equation 10 by Equation 11, the ratio of the recoverable extra energy to the extra pumping energy is therefore $$\frac{E_{R_1} + E_{R_2}}{E_{P_{excess}}} > \frac{\eta_t \eta_p}{1 + \frac{H_D + H_L + H_S}{H_e + H_G}} \quad (12)$$

Choosing typical numbers, assume $\eta_t = \eta_p = 0.85$; $H_G = 40$ M; $H_D = 60$ m; $H_e = 1000$ m; $H_L = 20$ m; and $H_S = 35$ m. Then the recoverable energy is larger than 0.65 of the extra pumping energy due to the extra spray. This is another important manifestation of the hydro-drag effect. Taking advantage of this recoverable energy by providing advantageous features such as a vertical and smooth duct, optimized turbines and generators, etc. will be discussed more fully below.

In the extreme case where there is very little evaporation at all, $E_c \rightarrow 0$ ($E_c$ in its limited sense of cooling alone) in Equation 5 and the recoverable energy approaches the expression in Equation 12. In this case the spraying head $H_S$ can be reduced to a minimum, the energy losses head $H_L + 0$ because there is no need to make up for evaporating water, and also the diffuser head $H_D \rightarrow 0$. $H_L$ goes to zero because the flow rate in the conduits leading to the spraying system is very small. The head loss $H_L$ reduces as the square of the flow rate. $H_D$ vanishes because the larger droplets precipitate very fast and the air flowing out has the same density as the air outside. Also, the energy for pumping up to the diffusers is almost fully recovered. As a result, the recovery comes very close to $\eta_t \eta_p$. For the above example the recovery would be 0.723, as in common pumped storage stations where energy is lost in pumping the water on the way up and on the way down. In reality, under the present invention there can be a compensation even for this loss of $(1-\eta_t \eta_p)$.

In a common pumped storage station, there is a pumping efficiency $\eta p$. The energy production efficiency in the turbine and generator is $\eta_t$. The overall efficiency is then $\eta_p \eta_t$. One pumps water up at a low cost of electricity (e.g. 3 cents/kWh) and then collects only $\eta_p \eta_t$ for each kWh invested. But the revenue can be high, say 15 cents/kWh. Thus, the whole transaction is a gain of 15 cents times $\eta_p \eta_t$ minus 3 cents. If $\eta_p \eta_t = 0.723$, the result is a gain of 7.845 cents for each kWh invested in pumping water up and then dropping it down. These figures are of rough illustrative value.

When there is no aero-cooling effect, the power generation plant according to this invention can still be used as pumped storage if there is an operational reservoir placed at a sufficiently high elevation. This is a pumped storage unit which is earned with a minimal investment in a reservoir and piping. There is no need for investment in water supply, pumps, turbines and generators. Note, however, that some evaporation and cooling almost always takes place (broken line 86B in FIG. 5) with the average cooling (a nearly triangular area) being 0.25 centigrade for every 100 m if the temperature drop rate in the outside air is 1° C./100 m. As shown for a 1,000 m duct height H, the average cooling can be 2.5 centigrade, which is small but not negligible. In this case, $E_c$ due to the cooling is in the order of 90 Pascals. Thus, even when only using the hydro-drag effect, the present invention is highly efficient. If, for example, the extra pressure $E_{R1}$ due to unevaporated droplets is 400 Pascals which will be obtained by about 40 grams of unevaporated water per cubic meter and the cooling adds 90 Pascals, then the relative addition of net deliverable power would be about 35%. This raises the net energy recovery to 0.723×1.35= 0.976, i.e., nearly 100% if the tower height is 1200 m, the power gain due to the minimal cooling effect is 43% and the net recoverable energy of pumping for storage is 0.723× 1.43=1.03. In other words, there results a pumped storage with a net gain of energy.

This is exactly the case during cold and humid days. Even when there is no elevated water source, one obtains a pumped storage station with only a minimal investment. The evaporation and cooling due to adiabatic wet compression (broken line 86B in FIG. 5) enhances the power significantly beyond a normally known pumped storage station.

It is very rare that the air is initially at 100% relative humidity and therefore, most of the time, there will be a significant addition of energy in pumped storage operation and no energy losses.

To make the hydro-drag effect useful to its utmost extent, several specific features should preferably be embodied in the present invention. Among them:

a. The walls should be substantially vertical for most of the duct height so that the droplets which fall relative to the air flow will not hit and adhere to the walls.

b. The walls of the air inlet to the tower where the air turns into a vertical flow should be aerodynamically shaped not only to reduce energy losses but to reduce the amount of droplets that hit the wall.

c. The walls should be very smooth so that the viscous boundary layer tends to roll the droplets away from the wall; the wall remains materially dry.

The above three features are highly advantageous since any droplet hitting the wall cannot continue to transmit its weight to the fluid downdraft. Thus, the hydro-drag effect is reduced. The process of droplets hitting the wall can be very inefficient unless the above measures are taken. For example, over a falling height of 1000 m and a duct diameter of 400 m, three fourths of the droplets may gradually be removed from the fluid flow by hitting the wall due to turbulent dispersion before the droplets reach the bottom.

d. A still further feature of the invention that is essential for achieving the hydro-drag effect is in the configuration of spraying system and water supply for delivery of excess water rates as described elsewhere herein (i.e. discharge coefficient R>1).

e. The turbines and diffuser are installed at the lowest possible position so that the vertical flight of the droplets will be as long as possible before striking the turbine surfaces.

f. A highly preferred feature of the present invention is to install the atomizers so that the weighted average of the droplets flight vectors will be substantially parallel (i.e. within 30°) to the local velocity vector of the flowing air. This is highly desirable to recover a large part of the spraying energy. This atomizer orientation is, for example, important near the outer rim of the curved inlet where the air turns from a horizontal to a vertical flight direction.

g. operational reservoirs make it possible to use the hydro-drag effect in a pumped storage operation mode of the plant, especially when there is little aero-cooling effect.

In order to optimize the net deliverable output N, the net energy must be optimized. Defining the net energy as $$E_{net}=(E_c-E_p+E_{R_1}+E_{R_2}) \quad (13)$$

then Equation 5 reduces to the following $$N=Q(E_{net}-E_f)\eta_t \quad (14)$$

Similar to Equation 5, as stated above, there is no unique solution to Equation 14 without an engineering decision on the design of the plant, which is a unique feature of this invention.

The first question is whether there are cases where $E_{net}$ is positive. For this to be true, the cooling energy $E_c$ plus the recovered energy $E_{R1}$ and $E_{R2}$ must be larger than the pumping energy $E_p$. With perfect efficiencies and no energy losses, $H_G = H_D = H_L = H_S = 0$ and $\eta_p = \eta_t = 1$, then $E_c/E_p \approx 8$. There is, however, no general proof that $E_{net} > 0$. It is very easy to point out cases where $E_{net} \leq 0$, such as when $E_c$ is very small and at the same time $H_G$, $H_D$, $H_L$, and $H_S$ are large. However, it is easy to show that there are also cases, in fact many cases, where $E_{net} > 0$.

The second question, then, is whether it will always be possible to have a positive net deliverable power N if $E_{net} > 0$. The answer is definitely and generally yes, but the power may not necessarily be cost effective.

There are an infinite number of possibilities to satisfy Equation 14. The flow energy loss $E_f$ is assumed to be:

$$E_f = \frac{\rho}{2}\left(\frac{Q}{A_c}\right)^2 F = \frac{\rho \overline{V}^2}{2} F \quad (15)$$

where $\rho$ = average density of the inside fluid (kg/m$^3$);

Q = fluid discharge rate (m$^3$/sec) (Q is only approximately constant with elevation);

$A_c$ = cross-sectional area of the duct (m$^2$);

$\overline{V}$ = average fluid velocity in the duct (m/sec); and

F = flow energy loss coefficient which is assumed to be constant as a first approximation.

Inserting Equation 15 into Equation 14 yields $$N = Q\left[E_{net} - \frac{\rho}{2}\left(\frac{Q}{A_c}\right)^2 F\right]\eta_t = Q \Delta P_{net} \eta_t \quad (16)$$

$E_{net}$ also depends on the air discharge rate Q. Different turbines can be installed to obtain different rates of discharge Q. The net pressure drop $\Delta P_{net}$ over the turbines for energy delivery will change accordingly as $E_{net}$ and $E_f$ change.

One extreme value of the flow rate Q is Q=0, where there are no energy losses, but the deliverable power N vanishes. Thus, the whole plant is useless. On a second extreme, Q is maximal, which reduces the factor $$\left[E_{net} - \frac{\rho}{2}\left(\frac{Q}{A_c}\right)^2 F\right]$$

to zero. But again, there is no deliverable net power. Between these two zero values of the power N, there must be at least one maximum of N.

To get a rough idea of the value of Q, it will be assumed that N will be maximized. Taking the derivative of N with respect to Q in Equation 16 results in (17)

and setting this equal to zero gives $$\frac{\rho}{2}\left(\frac{Q}{A_c}\right)^2 F = \frac{1}{3}\left[E_{net} + Q\frac{\partial E_{net}}{\partial Q}\right] \quad (18)$$

where the left hand side of the equation is equal to the energy loss term.

Assuming $E_{net}$ is a constant, by controlling the necessary spray parameters and other parameters to compensate for changes in Q, the resulting expression for energy loss is very nearly $$\frac{\rho}{2}\left(\frac{Q}{A_c}\right)^2 F = \frac{1}{3}E_{net} \text{ and thus} \tag{19}$$

$$\Delta P_{net} = \frac{2}{3}E_{net} \tag{20}$$

Using Equation 19 to solve for the air discharge rate gives $$Q = \left(\frac{2}{3}E_{net}\right)^{\frac{1}{2}} \frac{A_c}{\sqrt{\rho F}} \tag{21}$$

Inserting Q from Equation 21 and $\Delta P_{net}$ from Equation 20 into Equation 16 results in $$N_{max} = \eta_t\left(\frac{2}{3}E_{net}\right)^{\frac{3}{2}} \frac{A_c}{\sqrt{\rho F}}. \tag{22}$$

Since $\eta_t$, $\eta_p$ and $E_{net}$ change with Q, Equation 22 is a rough indicator of the range of choices for the turbines and generators in the plant. Those skilled in the art would realize how to use the same logic to develop more accurate computations.

The meaning of the above evaluation is of principal importance:

(a) There is a need to design the power plant to obtain the maximum deliverable power. It is a highly preferred feature of the present invention.

(b) If the main power is from the aero-cooling effect, the maximum net output from the power plant is obtained when the turbines are set such that the net energy is roughly divided ⅓ for losses and ⅔ for pressure drop across the turbines. If $E_{net}$ also includes $E_{R1}$ due to the hydro-drag effect, as in Equation 13, then this conclusion is more generalized.

(c) It is apparent from Equation 22 that regardless of how high the energy loss coefficient F is, it is possible to maximize useful deliverable energy $N_{max}$ as long as $E_{net}$ is positive.

(d) The useful deliverable energy reduces proportionally by 1 over the square root of F but never vanishes or becomes negative as long as $E_{net}>0$.

Notably, the requirement to have a maximum net deliverable rate of power is not the only possible requirement and design. In the case where the major process is the hydro-drag effect and the power plant acts on a mode of pumped storage, the maximization should be of the net revenue gain. The best setup would then be with lower air speeds and higher pressure drops on the turbines. The type of turbines, generators and controls will allow for such adjustment. Furthermore, the optimization of N also involves the optimization of $E_{net}$ using different rates of spray and different droplet size distributions.

One of the advantageous features of the present invention, as defined by the above equations, is the recognition of the energy available for power production in the falling water droplets and in the unevaporated water droplets collected at the base of the tower. This invention uniquely takes into account the hydro-drag effect and the aero-cooling effect. Various known prior art inventions appear to have completely failed to take these energies into account and, by virtue of their design (i.e. locating shafts/ducts on the slope of a mountain, lack of smoothness of the walls, type of turbines, very high unrecoverable spray energy, combination of high loss coefficient and improper flow rate) could not possibly fully utilize both of these energies, resulting in very poor performance or even negative net deliverable energy. The present invention, on the other hand, optimizes the net deliverable output by harnessing the synergy of these two effects.

Even when only one of the effects is available for use, the present invention can be designed to efficiently produce power. For example, in the case where there is no evaporative cooling (at least at the inlet) and $E_c$ is small (it hardly ever vanishes) (see Equations 13 and 5), then the hydro-drag effect can be used to generate power. One example of how this can be done efficiently is when there is a high elevation source of water that can be dropped to a lower elevation. The Mediterranean-Dead Sea Canal (FIG. 16) is a good example of such a set up, having a 400 meter difference in elevation. In this case $E_p$=0, and the resulting equation for N (from Equation 5 or Equations 13 & 14) is $$N = Q(E_{R_1} - E_f) \quad (23)$$

Equation 23 can be solved just like Equation 14 where $E_{R1}$ replaced $E_{net}$. $E_{R1}$ was the energy recovery term due to the hydro-drag effect. The hydro-drag effect is in fact the added excess pressure of the fluid column in the duct due to the integral of the weight of the unevaporated water droplets over the elevation plus the recovered spray energy. Notably, there will always be some component of the cooling effect $E_c$ added to $E_{ri}$ in Equation 23, as explained elsewhere in this application.

The rule of solving for Equation 23 with the insertion of Equation 15 (the expression of $E_f$), however, is not necessarily the same in this case as in Equations 19, 20, and 21. In the hydro-drag effect, the policy does not have to maximize the output of the plant. Instead, it will be a compromise between the maximum efficiency, which calls for a very small discharge rate Q, and a minimum investment per unit power, which is in line with maximum power production for the plant. The conclusion is that with the net hydro-drag effect the net deliverable power is greater than $\frac{2}{3}E_{R1}$ and $E_f$ is somewhat less than $\frac{1}{3} E_{R1}$.

A second example of using only the hydro-drag effect involves, as mentioned above, the use of pumped storage. The considerations are the same as in the above case, and the net income rate is $$Q\left[-\left(\frac{E_p}{\eta_p}\right)C_1 + (E_c + E_{R_1} - E_f)\eta_t C_2\right] \quad (24)$$

where the net income rate is the net earning per unit time of the installation, $C_1$ is the unit price paid for electricity at hours of low demand and $C_2$ is the price obtained by selling electricity at high demand.

When Equation 24 is differentiated with respect to the air flow rate and equated to zero to maximize the net income rate, the result is that the energy losses equal $$\frac{Q^2}{A_c^2} \frac{\rho F}{2} = \frac{1}{3}\left[(E_c + E_{R_1}) - \frac{E_p}{\eta_p \eta_t}\left(\frac{C_1}{C_2}\right)\right] \quad (24A)$$

-continued
$$N = \frac{A_c}{\sqrt{\rho F}} C_2 \eta_t \left\{ \frac{2}{3}\left[(E_c + E_{R_1}) - \frac{E_p}{\eta_p \eta_t}\left(\frac{C_1}{C_2}\right)\right] \right\}^{\frac{3}{2}} \quad (24B)$$

The left hand side expression in Equation 24a is $E_f$, the friction energy losses per unit volume of flowing air. Clearly it is less than $\frac{1}{3} E_{net}$, now replaced by the expression in square brackets on the right hand side of Equation 24A. This expression is different than the expression in Equation 19. It is clear that the whole undertaking is worthwhile only when $C_1$ is much less than $C_2$. It can be shown that the rate of air flow in Equation 24A should usually be less than in Equation 19. This means that the preference in this case is for lower energy losses and a higher pressure drop on the turbines.

In order to utilize the maximum net deliverable power over a wide range of conditions and to adjust for a maximum net income, flexibility in the design of the turbines is highly desirable. Turbine blades and guide vanes having adjustable angles of attack are preferred. Alternatively, variable speed turbines that have minimal efficiency compromises from one speed to another may be used. Finally, a combination of adjustable blades and/or guide vanes along with variable speed turbines may be utilized.

As stated above, this invention relates to the combination of the hydro-drag effect and the aero-cooling effect. As such, any cooling energy $E_c$ will also contribute to the hydro-drag effect. This contribution, especially in the case of pumped storage, is not negligible, as was shown above. A standard pumped storage which recovers the water energy in the normal continuous liquid phase cannot take any advantage of the aero-cooling effect. Even if it is not the major effect, its added benefit can be highly significant. The above discussion also shows that even if the air at the top of the inlet is saturated with water, it is quite probable to get some cooling with respect to the outside air which can add up to ≈90 Pascals to $E_c$ for a 1,000 m high duct. Using the flow and power equations, Equations 21 and 22 or Equation 24A, and the more general interpretation of $E_{net}$, as in Equation 13, the effect of a change in $E_{net}$ on $N_{max}$ can be determined. If $E_c-E_p$ is 400 Pascals and $E_{R1}$ is 90 Pascals, then from Equation 22 $E_{net}$ is found to increase from 400 to 490 Pascals, which when raised to the power 1.5 increases the power $N_{max}$ by 35.6%.

The invention is not merely concerned with the addition of water spray to obtain optimal output power, but has to do with the technical arrangements that make the hydro-drag effect and its utilization possible at its full range. Also, the invention relates to the ability to adjust the air discharge rate with the help of the turbine design in such a way that the net output for delivery is near $\frac{2}{3}$ of $E_{net}$ multiplied by the power system efficiency, $\eta_p$, when the main effect is aero-cooling. And the air discharge rate can be adjusted for the case where $E_c$ is negligible and maximum economical gain is required rather than maximum power output. Between these two extremes the power system is adjustable.

One of the outstanding benefits of the invention is the considerable addition to the net power in using the hydro-drag effect. Further, the present invention considerably improves the aero-cooling effect by recovering a large part (over 65%) of the energy invested in pumping and spraying the extra water. There is still another intrinsic improvement in the present invention embodiment which makes it possible to express equation 22 or equation 24B as they are for the maximum net deliverable output or maximum net benefit. The preferred embodiment is of shrouded turbines. Each turbine fits closely into the walls of a shroud in a way which forces the fluid to flow through the blades of the individual turbine and not allowing the fluid to circumvent the turbine. As the turbines are adjusted so that the flow vanishes V→O the static motive force is $E_c+E_{ri}$. The static pressure buildup due to colder air and due to a load of unevaporated droplets. The optimum setup of the turbines is determined by an interplay between the pressure difference across them and the rate of volumetric flow Q (equations 22 or 24B).

For example, from Equation (22) the maximum net deliverable power per unit area of the vertical shaft $n_{max}$ is volumetric.

$$n_{max\,shrouded} = \eta_t \left(\frac{2}{3}E_{net}\right)^{1.5} \frac{1}{\sqrt{F\rho_a}} \quad (25)$$

and the fluid average velocity in the shaft is Va $$V_a \text{ shrouded} = \left(\frac{1}{3}E_{net}\right)^{0.5} \frac{1}{\sqrt{\rho F}} \quad (26)$$

For the free standing turbines the net power would be $$n_{force} = 0.59\eta_t \frac{\rho V_f^3}{2} - \text{pumping power} \quad (27)$$

The maximum fluid free flow would be determined by turning $E_c t_c E_{RI}$ fully into a velocity head and energy losses. Thus $$n_{max\,free} = 0.59\eta_t \frac{1}{(2\rho)^{\frac{1}{2}}} \left[\frac{E_c + E_{R_1}}{(\rho+f)}\right]^{\frac{3}{2}} - \frac{E_{p\,free}}{\eta_p} \quad (28)$$

being the energy loss coefficient.

Even if we assume that $EctE_{ri}$ are the same f or the shrouded and the free standing $E_c EsbC$ turbines it is easy to demonstrate the inferiority of the free standing turbine.

It is possible to work out an example for the shrouded turbines $E_c$-450 Pascal $E_{RI}$-60 Pascal $E_p$-170 Pascal $E_{net}$-340 Pascal f-0.65

F-0.9

V-10.6 m/sec.

For free standing turbines let us assume $E_c$ and $E_{RI}$ are the same although they must be smaller. However, $E_p$ will be proportional to the air velocity.

$$V_{free} = \left[\frac{2(E_c + E_{R_1})}{\rho(R+f)}\right]^{\frac{1}{2}} = 23.5 \text{ m/sec} \quad (29)$$

Thus the pumping energy would be $$\frac{23.5}{10.6}170 = 367.9 \text{ pascal}$$

The individual powers can be worked out assuming $\eta_t = \eta_p = 0.85$.

$$n_{shrouded} = 2889 \text{ watt/m}^2$$

$$n_{free} = 1377.4 \text{ watt/m}^2$$

Clearly, the shrouded turbine is about 2.1 times more efficient than the free standing turbines. In reality, the free turbine case is even worse. This is because $E_c$ will be smaller than in the shrouded case or the residence time of the water spray for cooling will be less than one half despite twice the necessary pumping power.

Using the above theory, the actual net deliverable power and the optimal parameters have been determined more accurately. Referring to Equation 22 to solve for net power, the following steps were taken.

First, the flow energy loss coefficient F was determined through wind tunnel experiments. F has two components:

$$F = F_f + F_k \quad (25)$$

$$= F_f + \left(\frac{A_c}{A_d}\right)^2$$

where $F_f$ is the energy loss coefficient due to flow losses through the fluid flow path, $F_k=(A_c/A_d)^2$ is energy loss coefficient due to the kinetic energy losses of the air flow out of diffusers 64 (FIG. 1 or FIG. 12), $A_c$ is the duct cross-sectional area where the average velocity $\overline{V}=Q/A_c$ is calculated, and $A_d$ is the sum of the largest cross-sectional area of each diffuser 68 in diffuser region 64, where the outflowing air fills up the vertical cross-section almost evenly. If $A_d>A_c$, then the flow out of the diffusers is slowed down and F is reduced.

It is possible to estimate the flow energy loss coefficient F from literature, however, to optimize the design, F should be measured in a wind tunnel. The measured F value will vary considerably with a prevailing horizontal wind of velocity W. The ratio W/V, where V is the average velocity of air flow within the duct, and the shape of the inlet also affect the flow energy loss coefficient F. As discussed more fully below, the present invention solves this problem by devising an inlet having a preferred shape (reference number 32 in FIG. 1 and FIG. 11).

Second, the discharge rate Q, upon which both $E_{net}$ and $\eta_t$ are dependant to some extent, was determined by an intricate mathematical procedure. Equations of the discharge rate Q, which will now be readily apparent to persons skilled in the art as a result of the discussion herein, include:

(a) equations of momentum and viscous fluid flow;

(b) equations of conservation of energy and mass, for both air and water;

(c) equations of state for the gaseous phase;

(d) vapor pressure as a function of the solute concentration and temperature of the unevaporated droplets;

(e) transfer equations of heat and mass between the droplets and the air;

(f) mass, momentum and energy equations of the droplets, taking into consideration their slowly changing diameter and weight; and (g) boundary conditions at both ends of the duct.

Altogether, the mathematical procedure included sixteen equations and sixteen unknowns.

Utilizing numerical simulation techniques, the equations were solved step-by-step across the height of the duct assuming:

(a) an initial average air velocity at the top of the duct;
(b) a certain mass distribution of water spray; and
(c) a certain distribution of droplet diameters and an average droplet diameter.

The results were in the form of: pressure distribution along the flow path; pressure drop across the turbines; velocity distribution; evaporated and unevaporated water; air density; and fluid density.

Third, the above calculations were repeated for different values of assumed average initial air velocity. Then the best combination was chosen of average velocity $\overline{V}$ or air discharge rate Q times the pressure drop on the turbines $\Delta P_t$ multiplied by the efficiency $\eta_t$ to give the maximum net deliverable output after subtracting the needed pumping energy.

Fourth, the third step was repeated with different amounts of excess sprayed water and the optimum of the optima was chosen.

Finally, the fourth step was repeated with different average droplet diameters and again the optimum of the optima was chosen. The above solution assumes that the hydro-drag and aero-cooling effects are both being utilized, with aero-cooling being the main effect. If the main effect is hydro-drag, however, then the flow losses $E_f$ will tend to be lower due to the reduced average air flow velocity $\overline{V}$ or air discharge rate Q. And thus, the net deliverable energy will be somewhat higher than $\frac{2}{3} E_{net}$ (as predicted by the less detailed analysis), especially when optimizing the net income by using specific hourly price scales for electricity.

Following the above steps, a preliminary computation and tabulation guides the design of the plant components. The same tabulation and collected data of the real plant behavior will direct the minute-by-minute control decisions. The results obtained through the above rigorous procedure were very close to the results obtained through the simplified and lumped analytical computations introduced initially. They certainly had the same behavior and led to the same decisions. A later effort using two other methods of computational fluid dynamics led to the same.

A characteristic set of dimensions and performance of a base line design in the south part of the Arava Valley in Israel (20–40 km north of Eilat, Israel), are as follows:

| | |
|---|---|
| Effective height | 1200 m |
| Main diameter | 400 m |
| Annual net deliverable output | 4000 GWh/year |
| Net average deliverable power | 460 MW |
| Maximum air speed over | 21 m/sec (76 km/hour or 47 miles/hour) |
| Maximum rate of water spray | 32 m³/sec; |
| Total sea water diverted per year about | 600 × 10⁶ m³/year |
| High head pumping installed capacity | 430 MW |
| Production of electricity/m³ sprayed water | 11.7 kWh/m³ |
| Ratio of energy devoted for water pumping and spray | 43% |
| Net deliverable output/m³ of sprayed water about | 6.7 kWh/m³ |
| Net deliverable output/m³ of evaporated water about | 13 kWh/m³ |

The foregoing is believed to be a true and correct representation of the operating principles, however, the invention is operable in accordance with other modelling equations that may occur to one skilled in the art after reviewing the specification. Irrespective of the theory discussed above, the present invention possesses utility that will result in the fulfillment of the beneficial results and objects outlined herein.

Tower Structure

Figure 6:
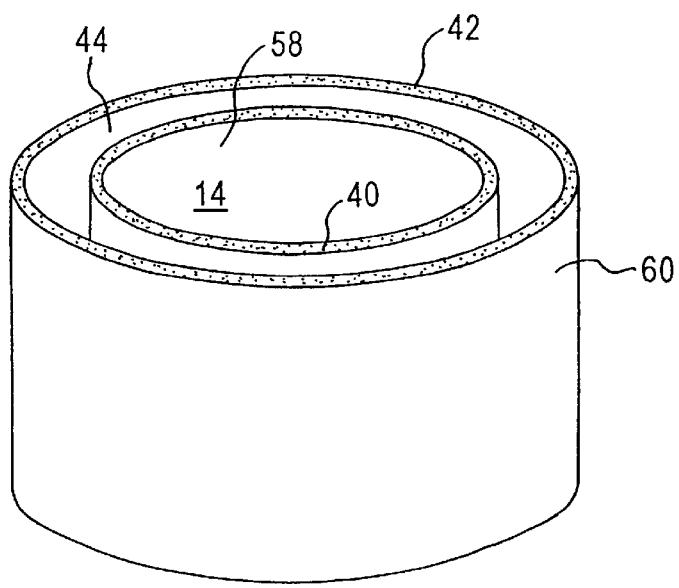
FIG. 6 is a perspective view of one embodiment of the side wall of the tower comprising the structural equivalent of two concentric cylinders.

A unique feature of tower 10 is cylindrical side wall 12 which is substantially vertical and provides the structural support for the entire tower. Referring to FIGS. 6–8, the preferred embodiment of cylindrical side wall 12 comprises at least one concentric inner cylinder 40 and outer cylinder 42 structurally linked by inter-layer 44 spaced between them. Inter-layer 44 connects inner and outer cylinders 40, 42 using vertical ribs 46 or horizontal ribs 48 (FIGS. 6A and 7, respectively), diagonals (not shown) space frame elements 50 (FIG. 8), or other structural elements well known in the art.

Having two structurally linked concentric cylinders 40, 42 results in superior structural performance to weight under static and dynamic conditions compared to a single cylinder. Generally, the two concentric cylinders 40, 42 provide a more solid structural foundation which increases the structural height of wall 12 and resists various modes of deformation. Under a prevailing outside wind 36 (FIG. 1), which has substantially horizontal components, a cylindrical structure tends to deform into an oval shape. The wind can also cause a cylindrical structure to buckle and deform under torsional bending. The two structurally linked concentric cylinders of the preferred embodiment, however, resist ovalling, buckling, torsional bending and other modes of deformation better than a single cylinder for the same material weight.

A preferred design of two structurally linked concentric cylinders is shown in FIG. 8, where a space frame 50 of infinite polyhedral lattices (IPL) form dense inner and outer cylinders 40, 42 linked by less dense inter-layer 44. The IPL design allows the structure to be easily modelled to determine the stresses, weight and external forces of the structure. One skilled in the art, however, will recognize that side wall 12 may be made out of reinforced concrete, steel, aluminum, composites, or other materials well known in the art. Similarly, there may be other geometries of the space frame 50.

An advantageous feature of side wall 12 is that there is room between the structural supports that can be utilized in unique ways. For example, a hotel, apartments, or even a shopping mall may be built within side wall 12. Side wall 12 can also be used for different services, such as elevators, power lines, water pipes, landings and maintenance aids. Further, side wall 12 may be utilized for storage space, including the storage of water to be sprayed within duct 14 as will be discussed below.

Inner cylinder 40 has inside surface 58, referring to FIG. 6, which forms vertical interior duct 14. Referring to FIG. 2, the cross section defined by inside surface 58 is preferably circular, which provides the most uniform flow of air through tower 10. The circular shape seems, at least hydraulically, to be the optimal as it has the smallest perimeter per cross-sectional area. Other considerations may lead to other shapes. There are mainly three: (1) when the turbines have vertical axes and the wall conforms to the boundaries of the turbine apertures; (2) a shape that includes elements for the structural stiffening of the wall; and (3) a shape that promotes stabilization of the vertical fluid flow against circulatory motion. It is important for efficient air flow that the horizontal cross-section of vertical interior duct 14 remains substantially constant, or slightly increases in diameter, from the top of the duct to the bottom of the duct.

Figure 9:
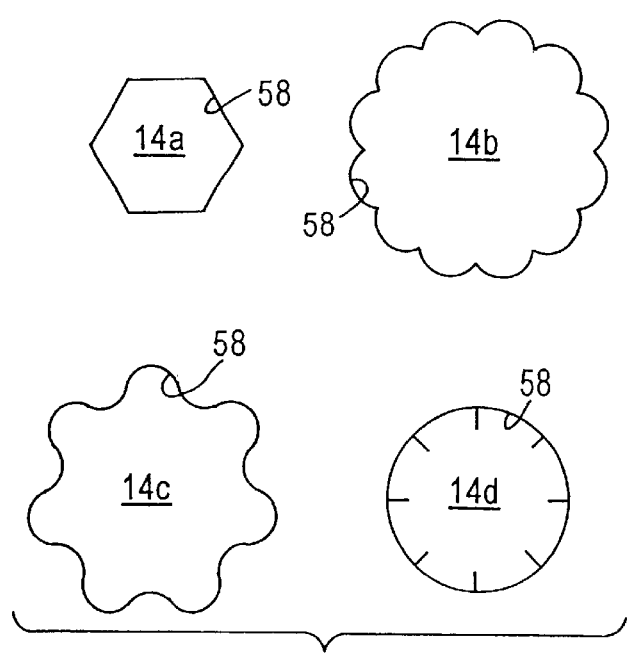
FIG. 9 is an illustration of a number of different configurations of the inside surface of the side wall inner cylinder.

Inside surface 58 may form other shapes, however, as long as the shape promotes an uninterrupted vertical flow of air within duct 14. FIG. 9 is an illustration of a number of horizontal cross-sections of inside surface 58. Shape 14*a* is a 6 sided polygon, but polygons of 4–8 sides may also be used. The polygonal cross-sections form convenient angles with many of the other structural elements and with some of the turbine arrangements. Shapes 14*b* and 14*c* are formed from sections of circles outlining an arrangement of vertical axis turbines. Shape 14*b* illustrates the circular sections bulging out and the intersection of two neighboring sections forming a sharp internal edge. On the other hand, shape 14*c* illustrates the circular sections alternating from bulging in to bulging out forming an undulating inner surface. In these cross-sections, the local curvature of the wall will be considerably higher than the overall cylindricality of vertical interior duct 14, thus providing better resistance against buckling and an increased structural height of side wall 12. Finally, shape 14*d* is a circular cross-section with vertical, inwardly facing radial ribs. These ribs also provide additional structural support. One skilled in the art will now recognize that inside surface 58 may be defined by many other equivalent horizontal cross-sections.

Another feature of the preferred embodiment of the present invention is that inside surface 58 forming vertical interior duct 14 is very smooth in the direction of the air flow, which is mainly a vertically downward flow. This smoothness helps to reduce friction losses and also reduces the chance that the falling water droplets will become attached to the inside surface due to protruding elements of roughness. It has been discovered by experimentation that the viscous boundary layer formed on the inner surface tends to roll droplets away from the wall if it is smooth enough. Also, inside surface 58 separates the air inside duct 14 from the outside air, forming a substantially airtight barrier that allows only negligible amounts of air, if any, to flow through side wall 12.

Preferably, inside surface 58 further comprises liner 62 (FIG. 8), which is made of a material having a roughness that does not exceed a few units in a million in relation to the cross-section dimension of duct 14. For example, if the effective duct diameter 38 (FIG. 1) is of the order of 400 m, then the roughness in a vertical direction should not exceed a millimeter or two.

Liner 62 can be a corrugated metal wherein the corrugations are formed in the vertical axis, i.e., channels and ridges running vertically. Also, as would be evident to one skilled in the art, liner 62 may be formed of concrete with a smooth lining on the surface, a composite material, a coated metal corrugate sheet, or a flexible membrane.

Although duct 14 may have a certain shaped inside surface 58 and a vertical axis of symmetry, the outside surface 60 of outer cylinder 42 does not necessarily have a corresponding shape. One skilled in the art will recognize that these surfaces are independent of each other, and many acceptable combinations may be developed. Referring to FIGS. 6 and 7 of the preferred embodiment, outside surface of outer cylinder 42 is a circle, matching the preferred shape and axis of symmetry of inside surface 58.

Figure 10:
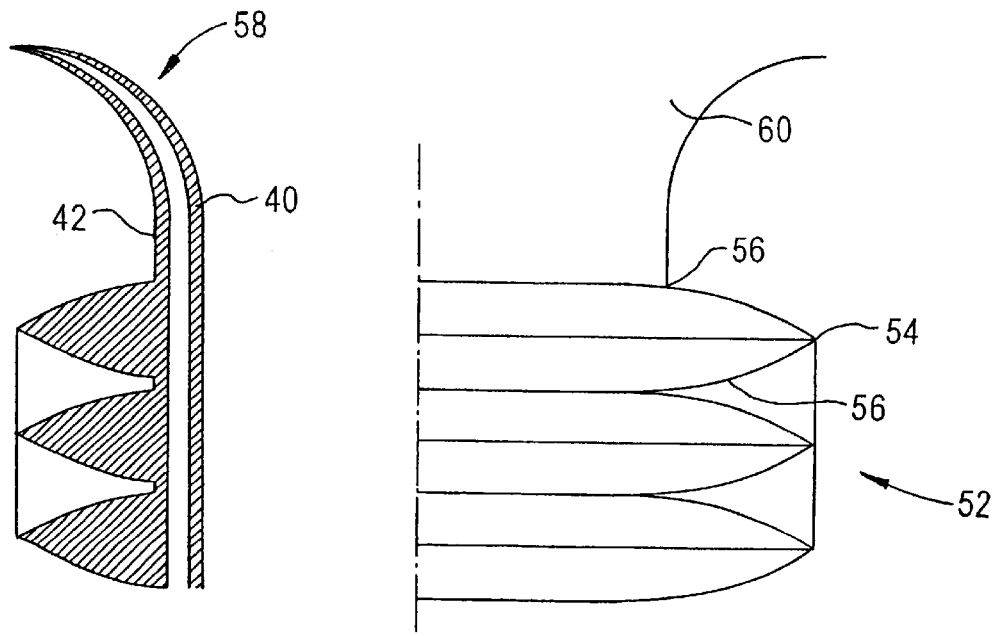
FIG. 10 depicts a side view and partial section of the tower illustrating the tapered discs on the outside surface of the side wall outer cylinder.

Alternatively, outside surface 60 of outer cylinder 42 may take the shape of tapered discs 52 stacked vertically one on top of the other. As illustrated in FIG. 10, each disc 52 has an outer circular edge 54 of a markedly greater diameter than the inner circular edges 56. When viewed in vertical cross-section, stacked discs 52 produce a serrated vertical edge on outside surface 60 of outer cylinder 42. Extending horizontally out from the body of tower 10, tapered discs 52 reduce the drag on the air flowing about the tower and consequently reduce the forces acting on the tower.

Another variation on the shape of outside surface 60 of outer cylinder 42 also has a serrated vertical edge, but this edge is produced by spiraling a single serration vertically around the body of tower 10, similar to the threading about the body of a screw. The resulting spiral vertical serrations improve the air flow around tower 10 and also reduce vortex shedding. These shedded eddies can cause a lot of alternating forces on a tower structure, but the spiral serrations introduce vertical interference between the eddies, which destroys them. Also, the spiral shape is useful in providing a gradually rising ramp up tower 10, thereby improving accessibility and maintenance to the tower.

In order to improve the stability of a tower having outer serrated vertical edges, the outer circular edges 54 of discs 52 or thread-like spirals are tied vertically and diagonally by tension elements 57, comprising wire cables or the equivalent.

Another important feature of tower 10 is the substantially horizontal flared portion 32 extending from side wall 12 (FIG. 1) which improves the aerodynamics of the tower. Flared portion 32 may lie ±15° with respect to the horizontal plane. Varying the local radius of curvature of flared portion 32 varies the energy losses due to friction of the air flow into duct 14. Unexpected results of reduced friction were found for a properly shaped inlet 16 under both symmetrical air flow (i.e. no wind) into the duct and also under an outside wind 36 condition. When outside wind 36 blows, the efficiency of tower 10 without a specially designed inlet 16 drops very fast and thus the net deliverable energy output falls very quickly. The object of the design of inlet 16 is to take advantage of the kinetic energy of outside wind 36 to help drive the downdraft of air within duct 14. An improperly designed inlet can result in wind 36 drawing air out of duct 14, resulting in a decrease in efficiency.

Figure 11:
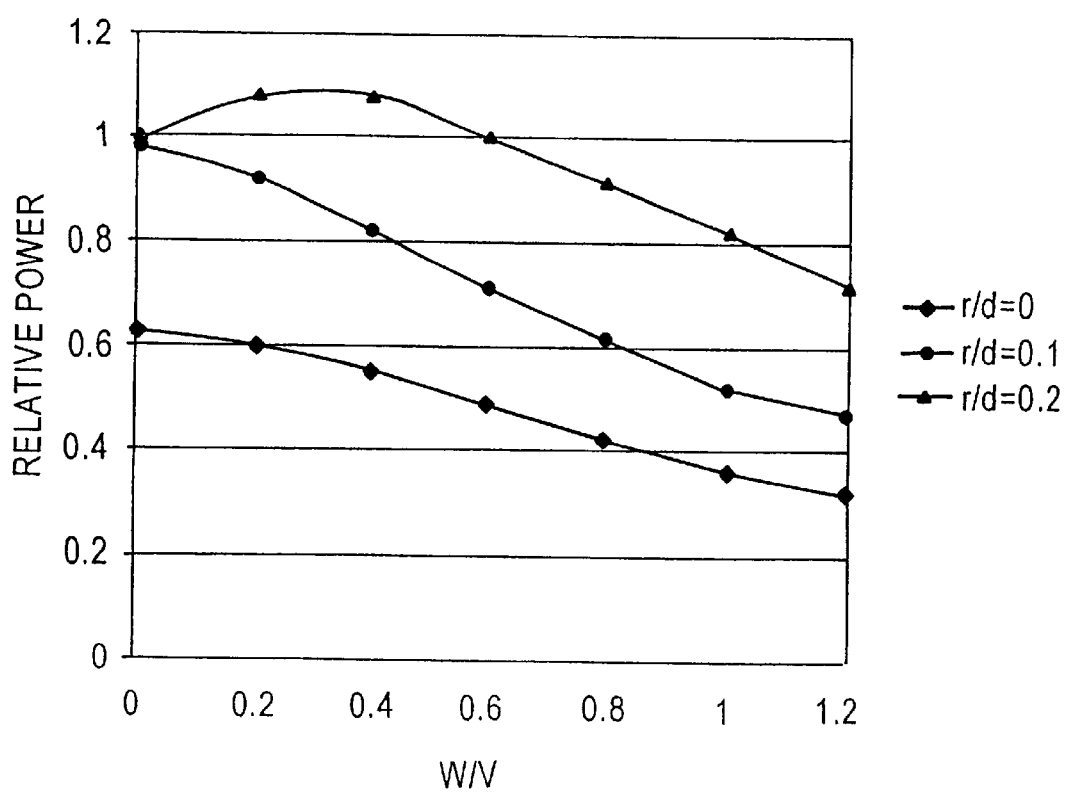
FIG. 11 is a graph depicting the change in relative power for various inlet designs and different horizontal winds.

FIG. 11 is a graphical representation of the effect on net power for various designs of inlet 16, where r=radius of curvature between side wall 12 and flared portion 32 at inlet 16; d=effective diameter 38 of duct 14, which is the diameter of the inner surface 58 of inner cylinder 40; W=velocity of outside wind 36; and V=average vertical wind velocity within duct 14. This graph of experimental results compares the relative gross power versus the W/V ratio, where $$RelativePower = \frac{(N_{gross}\text{with wind})}{(N_{gross}\text{without wind})}$$

W=horizontal wind velocity; and
V=vertical average fluid velocity, within the effective diameter 38 of the duct.

It was found that a tower 10 with an inlet 16 that has no radius of curvature (r/d=0) experiences a relative power loss even with no wind (where W=O). With the initiation and increased magnitude of outside wind 36, the losses increase (FIG. 11). Even a tower 10 having a slight radius of curvature (r/d=0.1) was found to experience a relative power decrease, although the output with no wind 36 was increased compared with an inlet having r/d=0. Yet, with r/d=0.2, the relative power unexpectedly increased. It became apparent that the outside wind 36 contributes to the power in the tower. This addition was maximal at about W/V=0.3. No reduction in power was observed from W/V=0 up to about W/V=0.6. As W/V increased to greater than 0.6, the relative power slowly decreased, but still remained greater than the relative power of the other designs at each level of W/V. Thus, in accordance with the invention, the relative power generated by tower 10 is improved with the radius of curvature between side wall 12 and flared portion 32 being at least 20% of effective duct diameter 38. The preferred radius of curvature may vary slightly due to hydraulic reasons as well as due to economical considerations. For example, at very high wind speeds flairing an r/d>0.2 may be called for as well as curvature that turns more than 90 degrees. It is, however, not very likely that the required inlet plane will have dimensions much larger than r/d>0.2 and angles much larger than 90° for such winds, which rarely occur. Similarly, the best design for relative power will have the plane P (FIG. 1 only) of the outermost edge 32a of flared portion 32 lying ±15° to the horizontal plane.

Alternatively, when the prevailing outside wind 36 is especially strong, the radius of curvature may be formed in accord with the air streamlines to prevent flow separation at these higher air velocities. The best results were obtained when the second derivative of the curve between side wall 12 and flared portion 32 forming inlet 16 changed in a continuous way. Additional designs may be used to prevent flow separation at the inlet. For example, flow separation may be prevented by using special roughnesses, turbulence generating protrusions, grooving of the inlet surface and guide vanes, all of which are known to professionals in the field. The flaired shape of the inlet also widens the cross section and slows the entering air speed. It thus reduces the friction energy losses at the top structure that supports the atomizers and improve the spray energy recovery (Equation 43) while providing other advantages.

Another important feature of the present invention is outlet 18, which expels the downward flowing fluid from duct 14 after the fluid passes through turbine array 24. The preferred embodiment of outlet 18 is illustrated in FIGS. 1 and 2, where the bottom portion of tower 10, adjacent to the turbine array 24 in FIGS. 1, 2, 33, 34, 35, flares a circumferential diffuser region 64 having an increasing vertical cross-sectional area which slows the velocity of the outflowing air.

Referring to FIG. 12, diffusers region 64 is made up of separate diffusion chambers 68 for each turbine 66 in turbine array 24. Each diffusion chamber 68 comprises side partitions 70, floor 72 and ceiling 74 in order to keep the rotating air flow from each turbine separate, gradually reducing the air flow velocity and associated energy losses. The energy losses mainly comprise kinetic energy which is expelled out of the outlet 18. The rotational motion of the air reduces separation effects of the air flow from the floor 72, ceiling 74, and partitions 70 and reduces the overall energy losses.

The vertical cross-sectional area of diffuser region 64, measured at the outermost radial end, needs to be greater than the cross-section of vertical interior duct 14 in order to slow down the velocity of the outflowing air to reduce the kinetic energy losses out of tower 10.

The slowing down ratio, n, is mathematically expressed as:

$$n = \frac{A_d}{A_c} \quad (31)$$

where $A_d$ is the sum of outermost cross-sectional areas of each diffuser 68 in diffuser region 64 and $A_c$ is the cross-sectional area of vertical interior duct 14, as defined above. This ratio appears as a component of the loss coefficient F in Equation 30 above, where $F_k=1/n^2$. As illustrated in FIG. 12, for example, Ad is outermost diffusion chamber width 76 times outermost diffusion chamber height 78 summed for all diffusion chambers 68, which comprise diffuser region 64. If n=1, then the speed of the downdraft within the duct is close to the speed of the air flowing out diffuser region 64, resulting in a major loss of kinetic energy (FIG. 13, compare net power of 67.9% at n=1 to net power of 100% at n=3 assuming F to be constant and n having different values). Thus the slowing down ratio, n, must be maximized in order to reduce the kinetic energy losses. Strictly speaking, the increase of n leads to somewhat increased F due to friction losses and diffuser performance and causes the diffuser cost to increase. Thus, in each case n has to be optimized.

Referring to Equation 22, the maximum net deliverable output $N_{max}$ is inversely proportional to the flow loss coefficient F (and $F_k$, a component in F, is proportional to $1/n^2$). And, substituting the slowing down ratio into Equation 25 results in reducing F by increasing n. Thus, a larger slowing down ratio results in a larger maximum net deliverable output $N_{max}$.

To optimize the economy of tower 10, however, the maximization of the slowing down ratio must be balanced with the cost of constructing diffuser region 64. As $A_d$ increases, so does the cost of constructing the diffuser region total partition area, $A_{dp}$, which is the sum of the areas of the side partitions 70, the floor 72 and the ceiling 74 for each diffusion chamber 68. As one skilled in the art will recognize, each of these sections does not have to be the same length, and some advantage may be gained by having side partitions 70, floor 72, and ceiling 74 of different lengths.

Figure 12A:
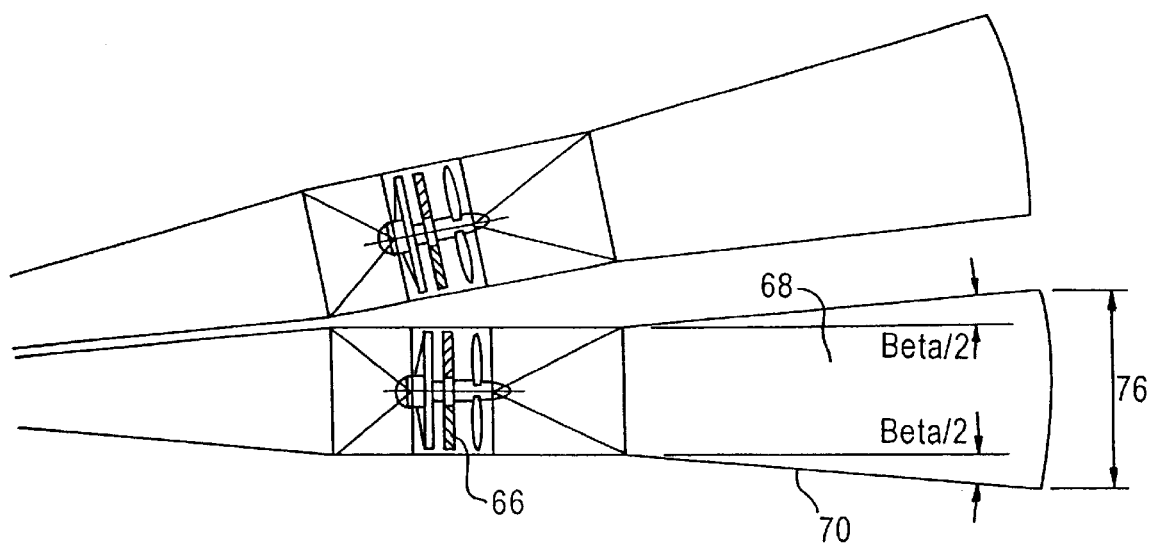
FIG. 12A is a top view of a section of two individual turbines.
Figure 12B:
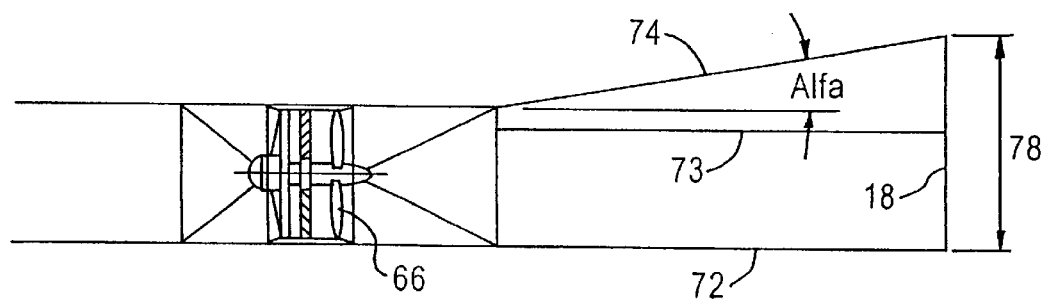
FIG. 12B is a side view of a section of an individual turbine and diffuser.
Figures 13, 14:
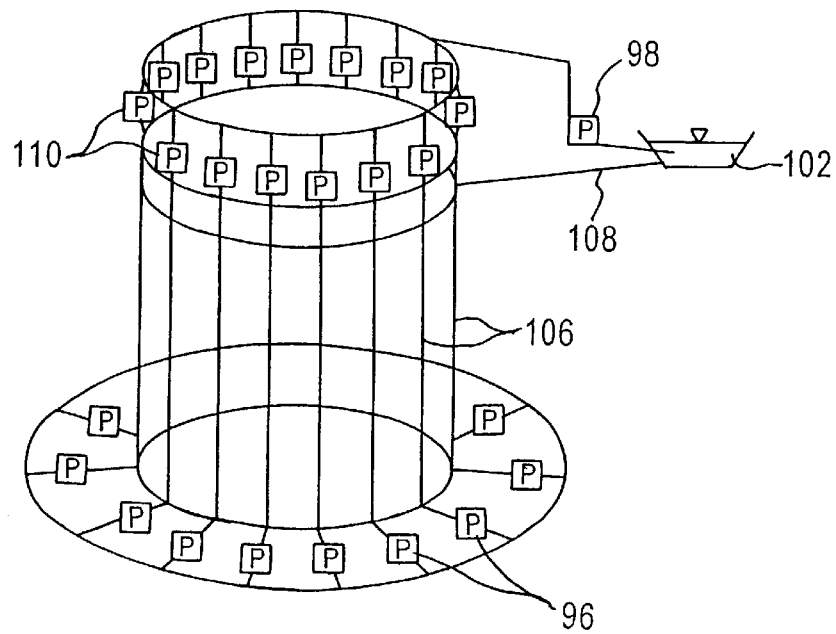
FIG. 13 is a table of different values for the slowing down factor n and the resulting effect on net deliverable power and the ratio of partition area to duct cross-sectional area.
FIG. 14 is a schematic representation of a high level operational reservoir and the associated pumping system.

A rough rule of thumb is that the total partition area, $A_{dp}$, of diffuser region 64 and the slowing down ratio, n, are directly dependent, such that:

$$\frac{A_{dp}}{A_c} \approx \frac{n-1}{\tan(\alpha) + \tan(\beta)} \quad (32)$$

where $A_c$=cross-sectional area of vertical interior duct 14 at effective diameter 38;

α=the angle of the vertical opening between floor 72 and ceiling 74, depicted in FIG. 12B; and β=the angle of the horizontal opening between side partitions 70 as depicted in FIG. 12A.

Thus, increasing n increases the construction costs and reduces the economy of the plant, but the larger maximum net deliverable output, at least partially, offsets this.

The net deliverable output is also influenced by α because increasing α decreases the effective height 90 of tower 10, where effective height is the vertical distance between the spray system 20 and the top of diffuser region 64 as depicted in FIG. 1. Further, increasing α too much will cause flow separation between the outflowing fluid and ceiling 74, leading to damaging eddy currents that increase the flow losses $E_f$ and does not make use of the slowing down effect. Through experimentation it was found that the α should not exceed 12°, and preferably should be less than 6°. Similarly, the preferred β is 6°, and should not exceed 12°.

A preferred slowing down ratio n was found by using Equations 22, 30, 31 and 32, under the assumption that the energy loss coefficient due to friction $F_f$ equals 0 and α=β=6°. The results are illustrated in the table in FIG. 13. The contribution to net deliverable power is very high between n=1 and n=1.5 (from 67.9% to 83.4%). Beyond n=2.5 (net deliverable power 96.9%) the increases are not nearly as dramatic. Referring to the last column in the table, the investment in constructing the diffuser region increases dramatically as n>3. Thus, n is preferably between 1 and 3, and more preferably between 1.25 and 2.25.

As mentioned above, if α is too large then flow separation occurs. With large angles of α and β a preferred slowing down ratio is reached in a relatively short radial length of diffuser region 64. Note Equation 32 and the reduced cost of diffuser region 64 with greater α and β. On the other hand, there is a great danger of separation of the flow with large angles. Moreover, if α and β are different, the cross-sectional area of each diffusion chamber 68 starts as an equal side square and turns into a rectangle. The fact that the fluid in this case is a mixture of cooled air and droplets denser than the air outside the duct makes the danger of separation higher. There will be a tendency for the heavier fluid to be detached from ceiling 74. As soon as there is a detachment of the fluid from ceiling 74, the diffuser region 64 does not perform the air slowing down task. Besides keeping α less than 12°, this problem can be avoided by shortening the length of ceiling 74 or by providing a rougher surface on ceiling 74, floor 72 and partitions 70 to induce turbulence. Further, a horizontal plate 73 may be positioned to divide the cross-section of diffusion chamber 68 to keep the heavier air closer to ceiling 74.

Two of the main factors that affect the flow in the diffusion chambers 68 are Froude number $F_r$ and Reynolds number Re, where:

$$F_r = \frac{V}{\sqrt{g' h}}; R_e = \frac{V h}{v} \qquad (33)$$

where:
- h=characteristic fluid depth, corresponding to the diffusion chamber height;
- g'=(Δρ/ρ)×g, where g=gravity acceleration; ρ=air density outside; and Δρ=difference in the flowing fluid density compared with the outside air density;
- v=kinematic viscosity of fluid; and
- V=fluid velocity.

It appears that with high Froude numbers (above 1), the fluid will be more likely to fill up the complete height of the diffusion chambers 68. In order for the diffusion chambers 68 to achieve their targeted performance, it is desirable for the fluid to completely fill up the diffusion chamber. With higher Reynolds numbers, there will also be a tendency to fill up the diffusion chamber 68 and avoid detachment and separation of the fluid flow from the chamber. The separation of fluid flow will be ascertained if, very roughly, $Re(F_r)^n > C$ where n~1.5 and C is a number to be found experimentally, e.g. 100,000. Also, the rotational motion imparted to the fluid after passing through the turbines reduces the possibility of flow separation.

Another unique feature of the present invention is inner conic section 80, as depicted in FIG. 1, which has a base at the bottom of tower 10 and is concentric with cylindrical side wall 12. Inner conic section 80 helps to optimize the efficiency of tower 10 by providing a central aerodynamic structure to direct the downdraft toward outlet 18 and maintaining a substantially constant cross-sectional area for the air to flow through. The height of inner conic section may vary, as illustrated in FIGS. 3 and 7. Similar to inside surface 58, inner conic section 80 should have a surface that is smooth in the direction of the downdraft and may include a liner, similar to liner 62.

The ratio of the effective height 90 to the effective diameter 38 is important in the design of the present invention. The optimal ratio from an economic point of view varies depending on what parameters are fixed. For example, if a power plant having a fixed installed output is to be constructed, then the preferred effective height to effective diameter ratio is in the range of about 3:1 to 5.5:1. On the other hand, if the effective height is constrained, then the preferred ratio of effective height to effective diameter is in the range of about 2:1 to 2.5:1. Further, if the objective is to design a tower 10 having the least weight, then the preferred ratio is in the range of about 3:1 to 5.5:1. Thus, depending on the initial design constraints, the ratio of effective height to effective diameter varies from about 2:1 to 5.5:1. Specific variations in unit costs will also vary the optimum within this range.

In order for the present invention to produce enough energy to be economically feasible, the effective height 90 must be relatively large. It is almost impossible to get a net useful energy in towers of less than 100 meters in effective height because of conveyance losses in pumping water to the bottom of the tower and the partially unrecoverable energy for spraying. The gradual cooling at the top part of the tower 10, as depicted in FIG. 5, also considerably reduces the net energy for towers having relatively small effective heights 90. However, a configuration of 500 meters produces power approaching economical feasibility. Thus, the minimal effective height 90 of the tower 10 is greater than 100 meters and preferably greater than 500 meters.

Water Supply System

FIG. 3 depicts a preferred water supply system embodiment, where water from source 92 is delivered to spray system 20 through a series of pumping stations and operational reservoirs, which may comprise low head pumping station 94, high head pumping station 96, final high head pumping station 98, low level reservoir 100 and high level reservoir 102. Preferably, operational reservoirs 100 and 102 are located at an elevation above high head pumps 96 and 98, respectively, to eliminate the need for the pumps to be primed by intermediate pumps and to eliminate high suction at the inlets of the pumps. Generally, operational reservoirs 100 and 102 may have the capability to store a volume of water greater than a couple of days demand required by tower 10 operating at full capacity. The minimum volume should be determined by the need to maintain continuous operation over a week with the supply pumps operating selectively during hours of low electricity cost.

The water travels from source 92 to spray system 20 through a conduit 104, which may be one large diameter pipe, parallel pipes, a canal, or combinations thereof. Preferably, parallel operational reservoirs, pumping stations, and conduits are provided for redundancy to increase the reliability of the system, to handle parallel supply sources, and to handle different water sources having different qualities.

Figure 40:
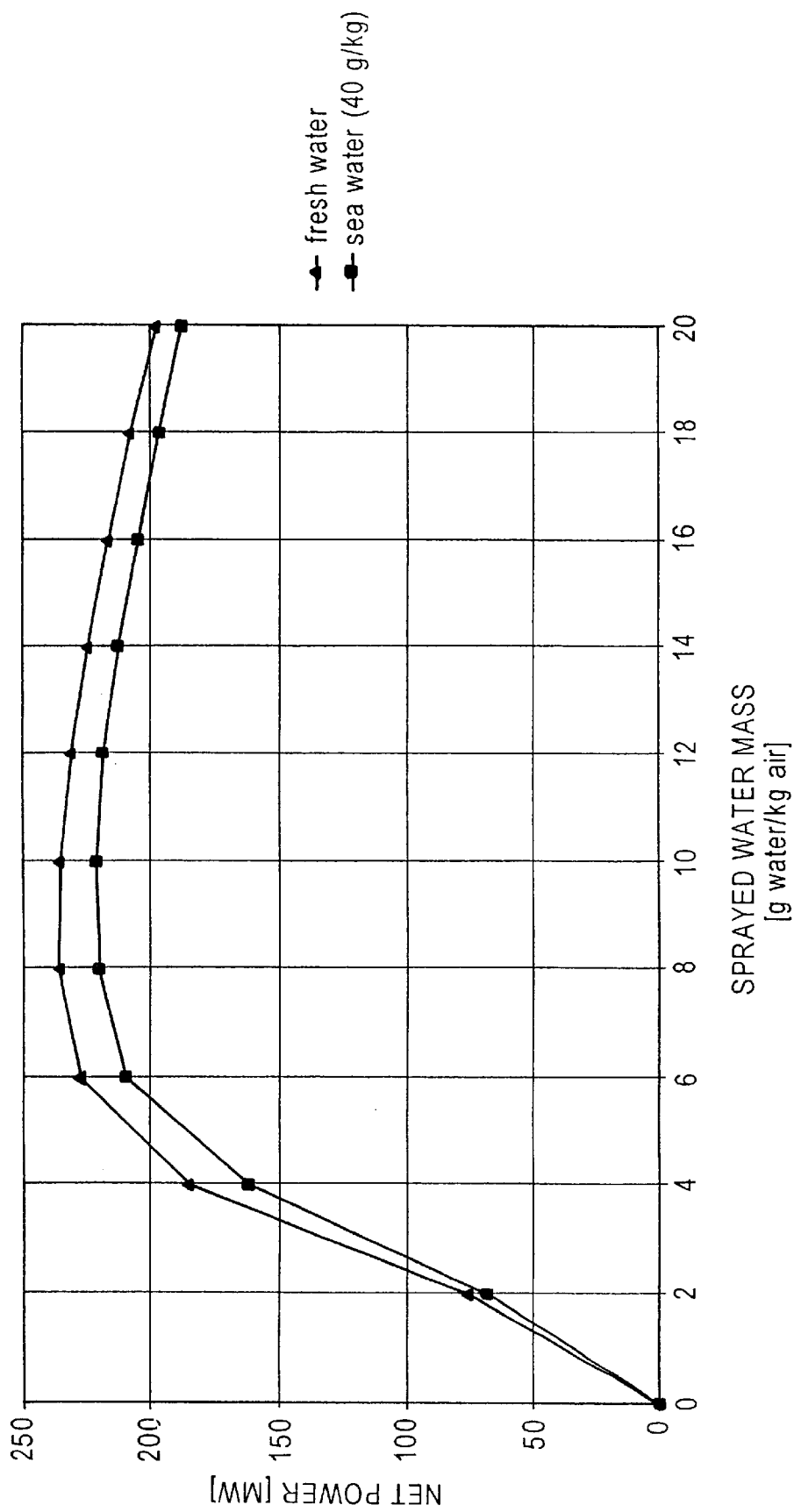
FIG. 40 is a graph depicting the effect of changing the sprayed water mass on the net power for fresh water and sea water having a saline concentration of 40 grams/kilogram.

Water source 92 may be salt water, brackish water, or fresh water. Examples of the different types of water sources 92 are an ocean or sea, a river, lake or irrigation drainage, or end brine from a station for water desalination. Tower 10 is flexible enough to use any one of these varied water sources or a combination of the sources. The sources 92 with increased solute concentrations, such as salt water and brackish water, result in a spray from spraying station 20 having a reduced vapor pressure. This reduced vapor pressure results in less efficient evaporation and less of a pressure differential between the inside air and the outside air. Yet, tower 10 is designed to use these water sources to an overall advantage, for example, by exploiting the cheaper cost of supplying this water or combinations with other technologies that increase the overall economy of tower 10. Further, the combination of the aero-cooling and hydro-drag effects, with the excess amount of sprayed water, advantageously reduces the effect of the reduced vapor pressure due to solutes in the water. Thus, the overall efficiency of tower 10 is optimized no matter what water source 92 is used (e.g., FIGS. 40 and 41).

The use of operational reservoirs 100, 102 provides a number of advantageous features. First, operational reservoirs 100, 102 provide a reserve of water that enables the time of water utilization and the time of water pumping to be independent of each other. Pumping can then be performed when the electricity to power the pumps is the least expensive or the revenue that can be obtained for the electricity is low. The pumped water can be separately utilized when the return for power generation is high. This principle is generally referred to as "pumped storage". Second, the pumps associated with each reservoir always work against the same heads and the same discharge. The only change in head is the change in water elevation in the reservoir. The pumps can then be regulated by turning on or off a number of parallel pumps. Finally, operational reservoirs 100, 102 provide an emergency reserve of water that greatly improves the reliability and availability of the plant as a whole.

The use of the pumped storage principle is one of the main economical advantages of the present invention, and there are numerous situations in which pumped storage can be used opportunistically. One situation involves an operational reservoir having a volume sufficient for storing water from hours of low cost electricity to hours of high cost electricity over a day or a week, and for maintenance time during planned and unplanned outages. Whenever the average daily or weekly pumping requirement drops below the installed pumping capacity, the pumping time can be chosen to be during hours of lower electricity cost. This simplest type of pumped storage involves no extra investment in pumping or power generation equipment and no extra energy investment, contrary to conventional examples of pumped storage.

The common form of pumped storage is obtained by pumping up water from a topographically low lying reservoir to a topographically high lying reservoir. On the way up, power P is used with an efficiency $\eta_p$. The water is dropped back from the upper reservoir and electricity is produced by a turbine and generator with an efficiency $\eta_t$. Thus, power P is invested at a unit cost $C_1$, in cents/kWh. The produced electricity will be $P\eta_p\eta_t$, with a revenue $C_2$ in cents/kWh. The overall financial rate of gain is $P(C_2\eta_p\eta_t-C_1)$. Obviously, both $\eta_p$ and $\eta_t$ are less than an unity. A characteristic value is $\eta_p=0.85$, $\eta_t=0.85$ and the gain per kWh is $(0.7225\ C_2-C_1)$. If it is necessary to pay a penalty for the external communal cost due to environmental pollution and other factors, $C_1$ may have to be replaced by a figure which is often estimated to be twice as large or more. Thus, a sustainable development approach which internalizes the external communal cost may convert pumped storage into an uneconomical undertaking.

Additional costs of the classical pumped storage exercise are the construction of a pumping station, a hydroelectric station, one or two reservoirs, a penstock and very often a source for make up water. These installations work in a limited number of hours. They also have to be operated and maintained. In the case of pumped storage involved with the construction of operational reservoirs included in this invention, the water is pumped up in order to feed the spraying system 20. This energy has to be invested in any case. The necessary energy is almost the same when the water is pumped up at a time of high electricity value or at a time of low electricity value. The only difference is the very small friction losses at a higher rate of flow in the supply conduits. Thus, to a first approximation, the financial gain of pumped storage in accordance with the present invention is $P(C_2-C_1)$. It is also obvious that there is no real extra expenditures on pumps, on turbines or on a penstock. Even the reservoirs are multi purpose and their cost can be written off all or in part, even without the use for pumped storage. Since the present invention is non-polluting, there will be no communal external costs.

The most beneficial use of this type of pumped storage is with a high level operational reservoir 102 located at an elevation that provides the highest possible head. Depending on the climatic conditions and the cost differential of using and selling energy, pumped storage with a high level operational reservoir 102 can improve the economy of the plant by as much as about 50% by providing a high head supply of water at a very inexpensive price. This type of operational reservoir may not always be possible, however, depending on the local topographical conditions.

A low level operational reservoir is always possible. Its contribution to the economical gain by the choice of pumping time is not negligible. There are other forms of pumped storage that can be materialized due to the unique configuration of the present invention as will be described in the following.

FIG. 14 depicts a preferred arrangement of a high level operational reservoir 102 being supplied with water from parallel high head pumps 96, high head conduits 106, and a conduit 108 leading the high head water to the high level operational reservoir 102. If high level operational reservoir 102 is high enough in elevation, the water may be fed directly into the spray system (not shown). Otherwise, it may be necessary to provide final high head pumping station 98 to boost the water to the top of the tower.

FIG. 14 also depicts one way to provide increased flexibility and reliability by providing many of the elements in parallel, and by providing upflow pumps 110 (e.g. which may be mounted to or within the tower side wall 12), if necessary. Those skilled in the art will now realize that there are many different configurations that can accomplish the goal of pumped storage using a high level operational reservoir 102.

Figure 6A:
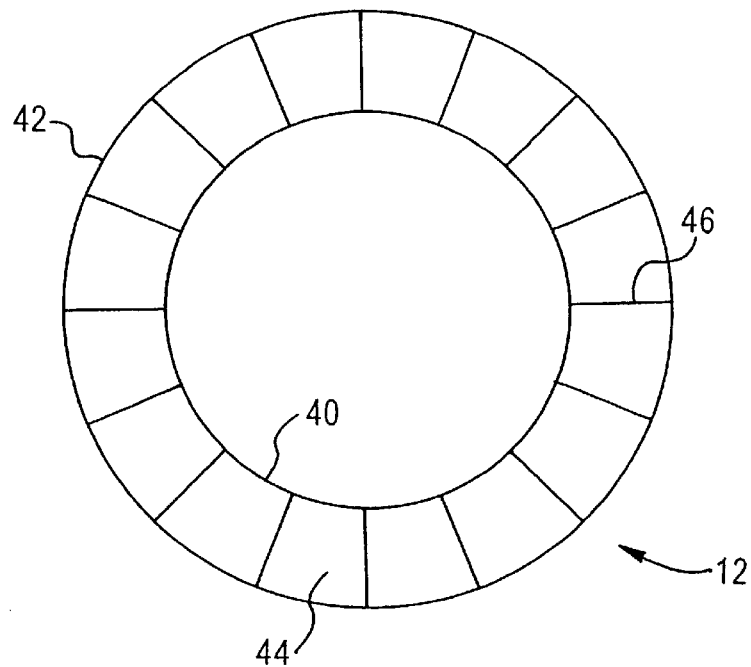
FIG. 6A is a top view of the side wall of FIG. 6 with radial interconnecting walls.
Figure 7:
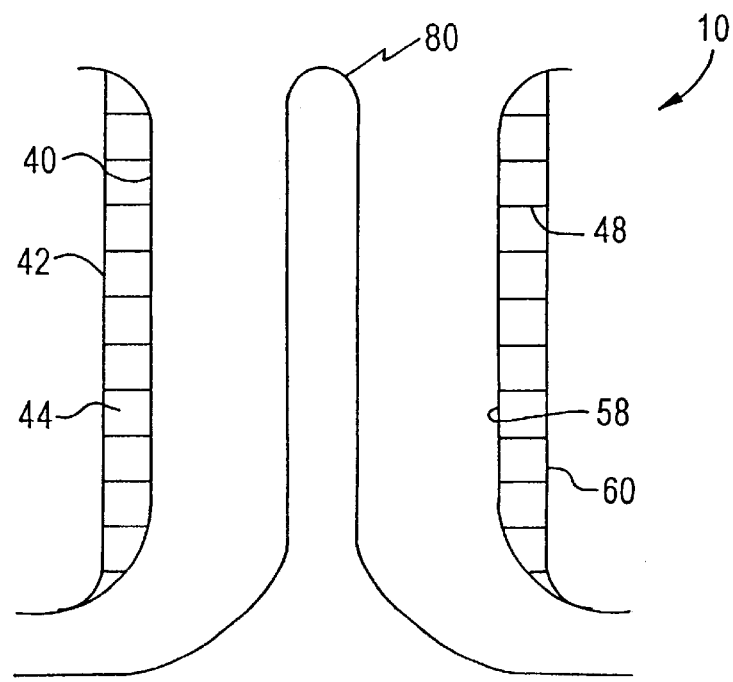
FIG. 7 is a side view of a partial vertical section of the tower with horizontal floors and a central tower all the way to the top inlet.
Figure 8:
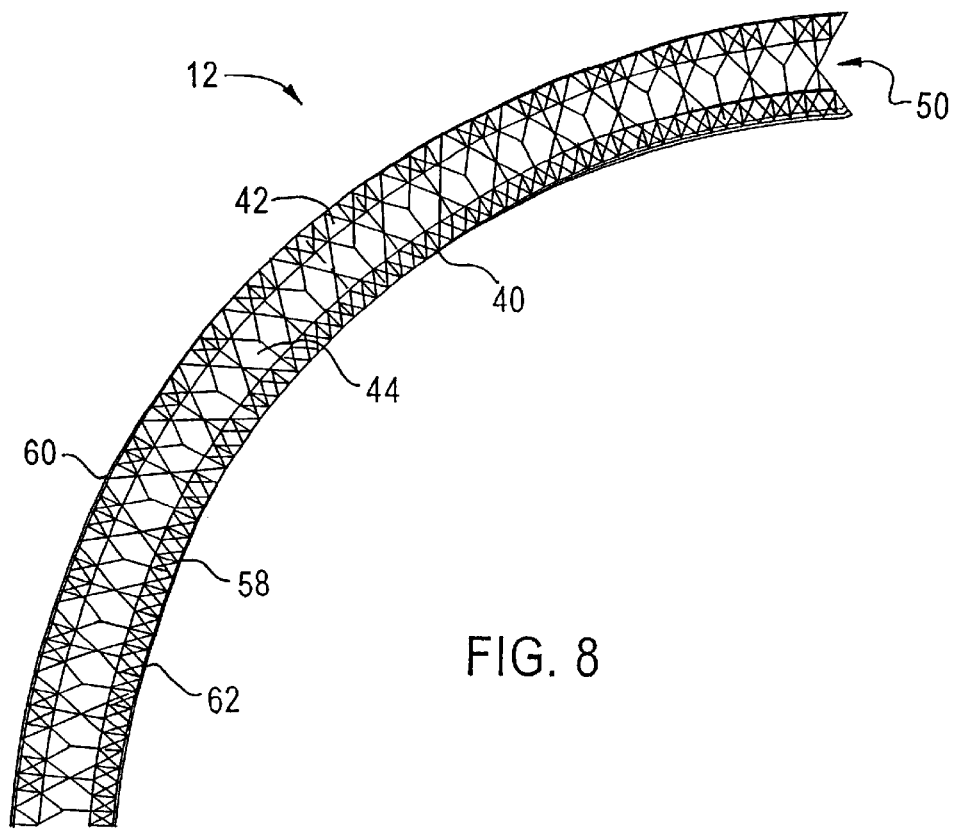
FIG. 8 depicts a partial view of a horizontal section of the side wall with two concentric layers and interconnecting element, all made of space trusses.

The reservoirs can be built within the tower structure as for example between the walls 42 and 40 in FIGS. 6, 6A, 7. This would be economically feasible especially if the construction is made to serve other purposes such as dwellings, offices, etc.

This first form of built-in pumped storage could be used when the tower 10 does not operate at full capacity because of a colder or a more humid climate. The then redundant pumping power can be used to fill up the operational reservoir 102 in a limited number of hours (see FIG. 46 for the daily and annual power production distribution).

Alternatively, if the electricity cost differences are high and the equipment costs are low, it may be economically attractive to increase the installed pumping capacity in order to finish the pumping in a shorter period of time. Even during peak exploitation of the power generation equipment, the pumping equipment will not have to be operated 24 hours a day and thus economical pumping times can be chosen. This is a second type of pumped storage that involves extra investment only in pumping equipment and not in power generation equipment or invested energy.

A third general type of pumped storage comprises an installed capacity for pumping and power generation greater than the maximum need for the operation of the tower. Besides increased equipment costs, this would generally require an extra investment and extra invested energy. Similar to the other types of pumped storage, under the right conditions this setup can improve the economy of the regular operation of the tower. This is because the added capacity of pumping and water conduction and the added cost of increased reservoir volume are only marginal. One such use of this excess installed capacity would be to spray the extra water volume using the hydro-drag effect during times of low cooling capacity. Another use would be by installing a special turbine for energy recovery. A final example would be providing a reversible pump-turbine, which involves only a small extra cost or reduced efficiency. Another variation in running the power station in a mode of a pumped storage is to select not only the pumping hours but also preferred spray hours.

Figure 39:
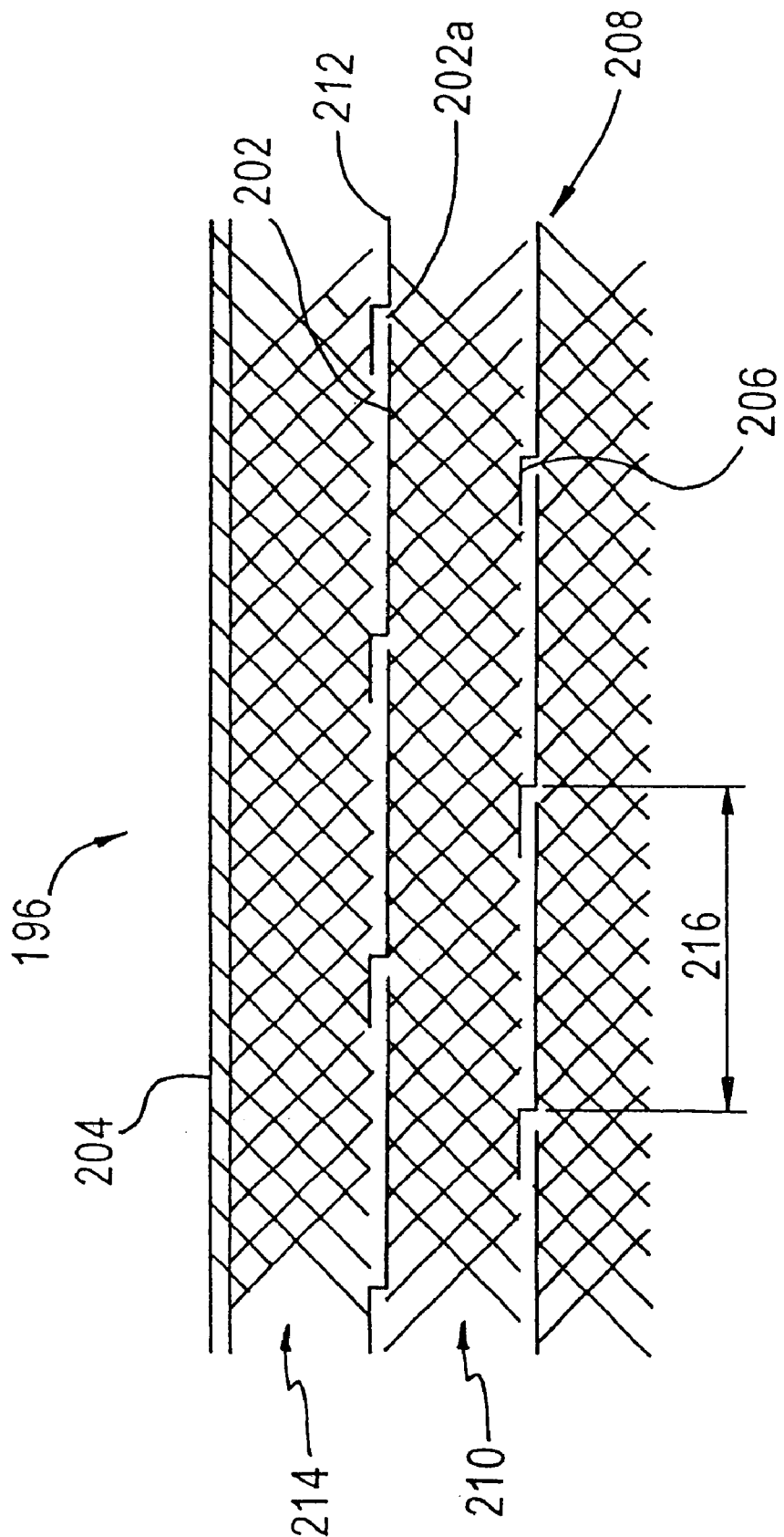
FIG. 39 is a cross-section of the preferred ground preparation in the precipitation area around the tower.

Another operational reservoir, collection reservoir 220 as depicted in FIG. 4, can be advantageously provided to collect the unevaporated water near the bottom of tower 10 and in precipitation area 196 (FIGS. 1, 2 and 39). When the collection reservoir 220 is at a higher elevation than the disposal site 230 for the unevaporated water, the unevaporated water can be accumulated and released through brine return conduit 224 to an energy recovery system 226, such as an electric turbine. To improve overall efficiency, the water in collection reservoir 220 would be released only during times of high pay for the electricity. Thus, the head of the collected unevaporated water can be used to improve the efficiency of the system and its overall economy.

Further, the unevaporated water from collection reservoir 220 may be fed through brine return conduit 224 directly back into spraying system 20 through conduit 104 if the salinity of the unevaporated water is low enough. If the water salinity is too high (for example solute concentration >80,000 ppm), then the unevaporated water is directed to disposal site 222. Since ⅔ to ½ of the water sprayed from spraying system 20 evaporates in duct 14, the collected droplets have a higher concentration of solutes than the initially sprayed water.

As explained above, re-spraying the unevaporated water from collection reservoirs reduces the efficiency of tower 10 through reduced vapor pressure and reduced cooling. However, it may be advantageous to re-spray the water from collection reservoir 220 in certain situations. For example, this water can be favorably used, when the price for generated energy is low. Also, some of the inefficiencies can be recouped by, for example, reducing the volume of unevaporated water, or end brine, to be disposed. Additionally, it is worthwhile to re-spray this water as long as the penalty in reduced cooling is less than the cost of bringing new water from the source.

The recycling of the collected unevaporated water from reservoir 220 in FIG. 4 is especially worthwhile when the water supplied from source 92 is only brackish, with relatively low solute concentration. Then, one cycle of spraying through the tower 10 will still leave the unevaporated water at a sufficiently low concentration so that the vapor pressure is high enough to cool the air by evaporation. A so called "blow down" ratio of water disposal from reservoir 220 to a disposal place and replacement of newly supplied brackish water from source 92 will maintain low enough salinity and a minimum overall cost of water supply.

For example, a specific baseline design with an effective cooling height of 1000 m showed about a 5% net deliverable power reduction for an additional elevation difference between the tower base to the water source of 100 m. Doubling the solute concentration from 40000 parts per million to 80000 parts per million also reduces the net deliverable power by nearly 5%. In this example, respraying the collected end brine or unevaporated water is economically feasible if the aforesaid elevation difference is more than 100 meters.

The use of brackish water for spraying is applicable near large irrigation projects. The drainage from the irrigation leaches through the soil and can be several times more saline than the original irrigation water. As an example, the irrigation water may have a total soluble concentration of 700 parts per millions (PPM). After irrigation, the concentration in the drainage water could be 2,000–2,500 PPM, precluding the drainage water from being used again for irrigation. Very often, this drainage water poses a very serious problem. It raises the ground water level and increases its salinity. Also, the drainage water may form lagoons of salt water. The drainage water progressively salinizes the water sources and it destroys soils and can eventually threaten the very existence of the irrigation projects. This form of salinization is the most serious cause of loss of arable land in the world in an alarming rate. The process is often called desertification. This process occurs mainly in arid and semi arid lands. The present invention offers a unique solution to the problem.

Disposal of the brackish water from drainage to the proper site is often very expensive and therefore avoided. Examples are in the Colorado River, the orange River in South Africa, the Murray Darling River in South Australia, the Indira Gandhi Canal in Rajastan, India, etc.

The unique application in accordance with the present invention is that the volume of the brackish water can be reduced by concentrating it from the original salinity of about 2,000 PPM to about 100,000 PPM. Thus, the brackish water is concentrated at least 50 times which reduces it to only 2% of the original volume. In the process it is possible to produce on the order of 10 kWh or more of electrical energy for each cubic meter which evaporates, i.e., about 13 kWh in the base line design described above. The cost of disposal is thereby reduced more or less in proportion to the brackish water volume reduction.

Interception of the brackish water and prevention of its return to a river or to an aquifer increases the net amount of fresh water that can be used without becoming saline. This allows a more thorough water exploitation in a sustainable manner. The brackish water source can be used in part directly for spraying and in part for desalinization as will be explained below.

Figure 15:
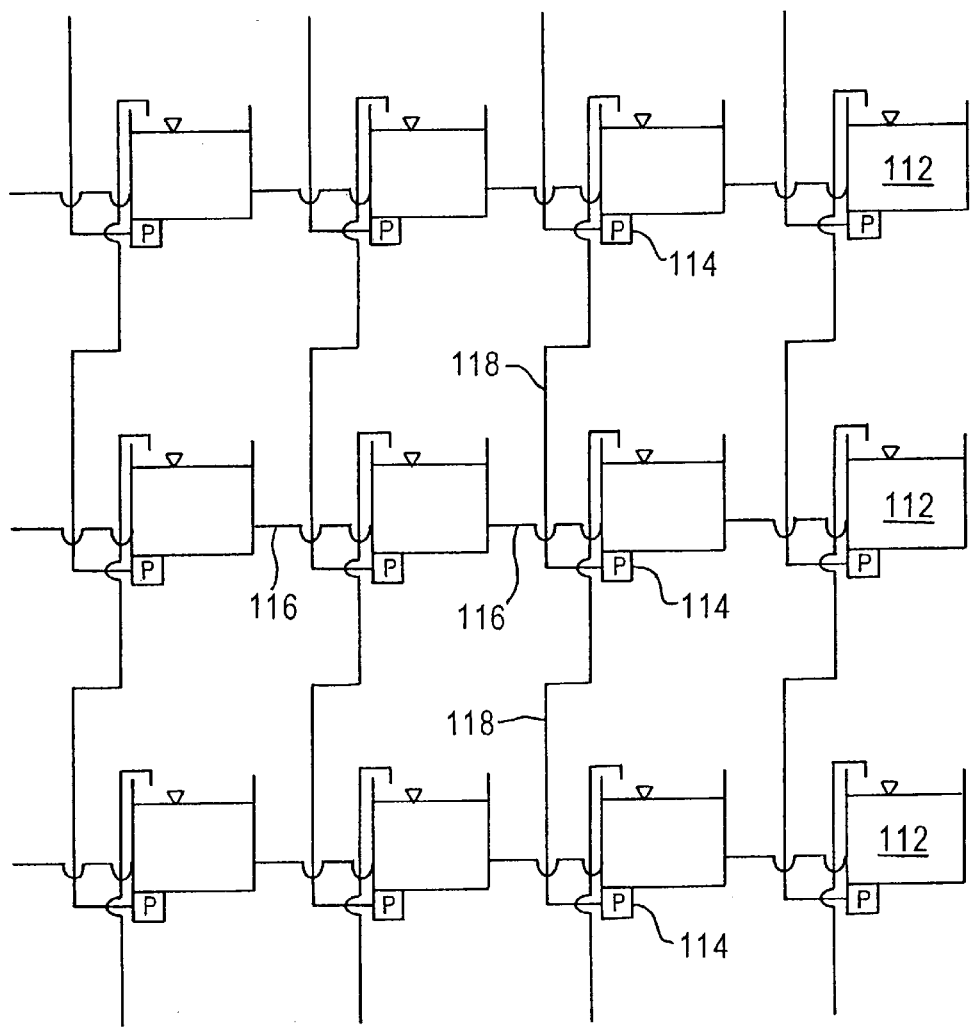
FIG. 15 is a schematic illustration of small operational reservoirs located within the structure of the tower side wall with pumping elements in series and in parallel.

FIG. 15 illustrates small operational reservoirs 112 installed within the duct structure. Pumps 114 are fed by gravity from the small operational reservoirs 112, and pump the water to the next reservoir above. Lateral conduits 116 may connect the reservoirs 112 to equalize the water supply around the tower. Also, lateral conduits 116 may be continuous outside the reservoirs 112 so that a reservoir may be completely isolated without stopping the whole system. Finally, upflow conduits 118 may be provided to guide the water from the high head side of pumps 114 to overflow into the higher reservoirs 112. There may be advantages and disadvantages in providing parallel, serial or combinations of parallel and serial reservoirs 112, pumps 114, and conduits 116, 118 depending on installation costs, desired reliability, and other considerations known to one skilled in the art.

Preferably, the volume of the small operational reservoirs 112 provides a water supply lasting minutes, or at most fractions of an hour. The advantage of small operational reservoirs 112 is that they can be built on tower 10 as part of the structure, connecting several pumps in series to provide a large head or for the connection between spray system 20 and the water supply system. A unique feature of installing small operational reservoirs 112 on tower 10 is that the mass of liquid inside the small reservoirs can be used for the impedance of dynamic cyclic deformations, thus reducing the cost of the structure.

Figure 16:
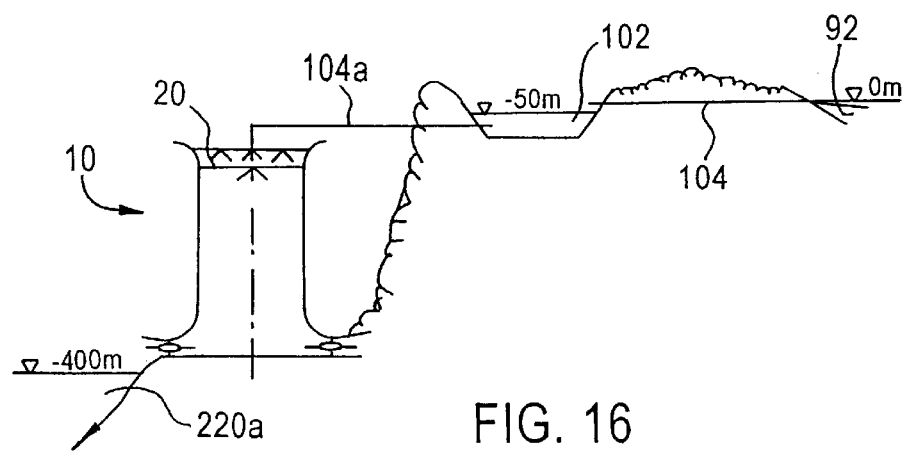
FIG. 16 depicts the use of a natural water source at a high elevation and a high level operational reservoir to supply water to the spray system.

FIG. 16 is an illustration of a natural water source 92 at a high elevation which can be used to supply water directly to spray system 20 through high level operational reservoir 102, which enhances pumped storage in the sense that spraying for energy utilization can be made at selective hours when the price obtained per kWh is maximal. An example of such a system would be in the Mediterranean Sea-Dead Sea canal area where water source 92 would be the Mediterranean Sea. Water would be fed from the Mediterranean Sea in conduit 104 through the mountain range separating the Mediterranean Sea from the Jordan Rift Valley, and into high level operational reservoir 102. Another conduit 104a would provide water from operational reservoir 102 to spraying system 20. Some pumping head may need to be added to the water in conduit 104a before reaching reservoir 102 to provide flexibility in the design of the power plant components. Tower 10 could further be provided with an unevaporated water collection reservoir 220a, in this case the Dead Sea itself at 400 m below Mediterranean Sea level. Thus, this set up utilizes the natural head of the elevated water supply to improve the efficiency of tower 10.

The use of the power station in this case can be in combination of both the hydro-drag effect and the aero-cooling effect. In one extreme, when the air is initially saturated with vapor, the hydro-drag effect is used almost exclusively just like any other hydraulic power station, except that the water fall is done with the water atomized into droplets and transmitting the energy through the air that flows into the air turbines.

Even the slightest extent of evaporation considerably enhances the energy produced over and above the hydro-drag effect. As was shown above, every time the air is initially saturated at the top inlet 16, the air compresses adiabatically during descent inside the duct and some cooling becomes possible. This contribution to the net deliverable power is not negligible, and can add 35% to the net deliverable power for a tower of 1000 in height. For a 400 m tower it will be limited to 2–3%.

Figure 17:
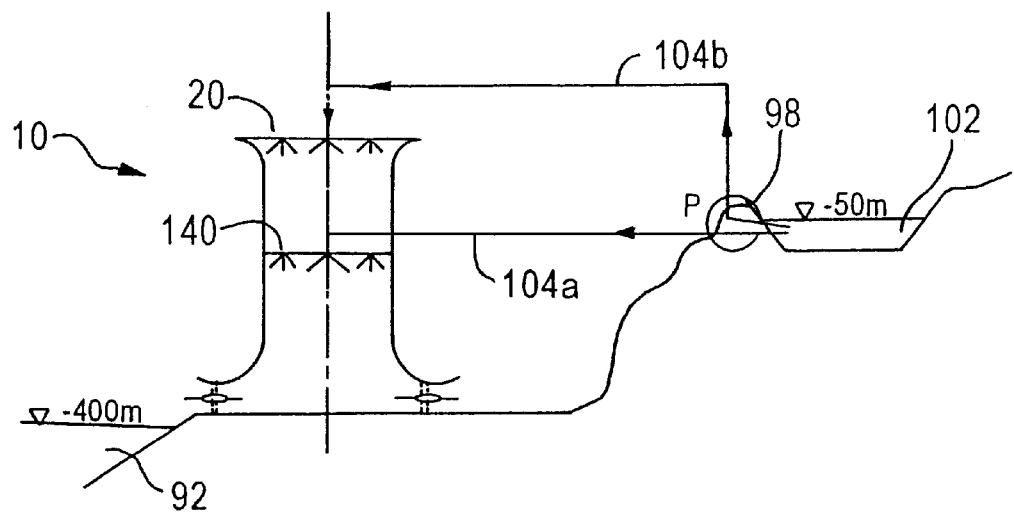
FIG. 17 is an illustration of a high level operational reservoir built into the local topography or a natural elevated water source which is lower than the top inlet spray system.
Figure 18:
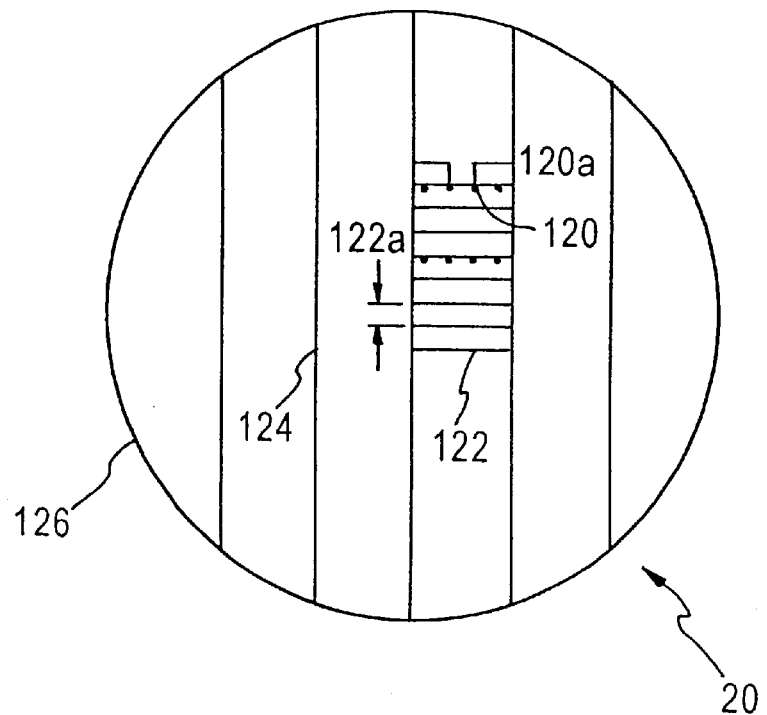
FIG. 18 depicts one embodiment of the spray system structure.
Figure 19:
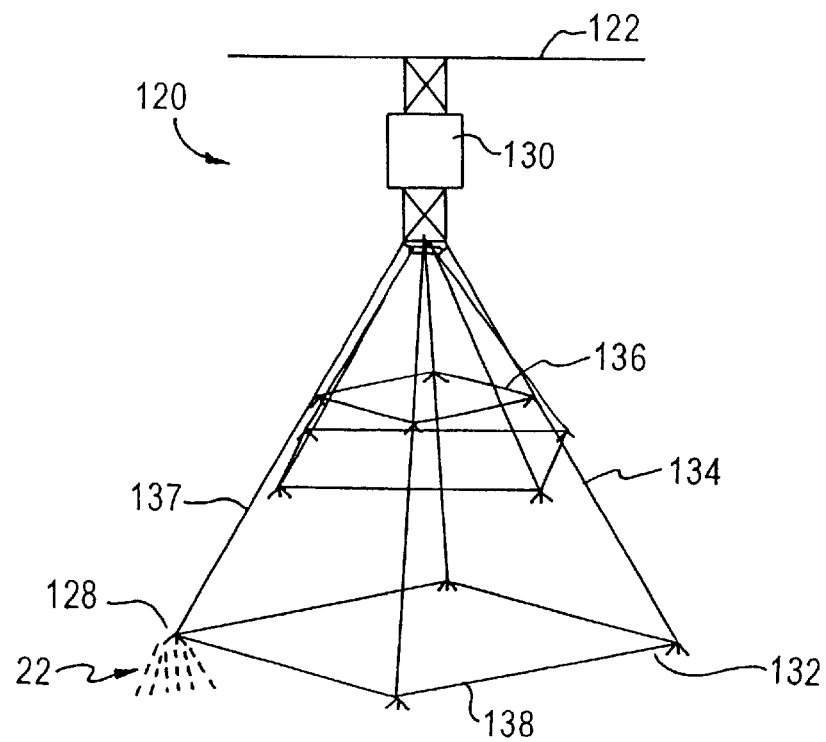
FIG. 19 depicts the preferred spraying station with 12 atomizers.
Figure 20:
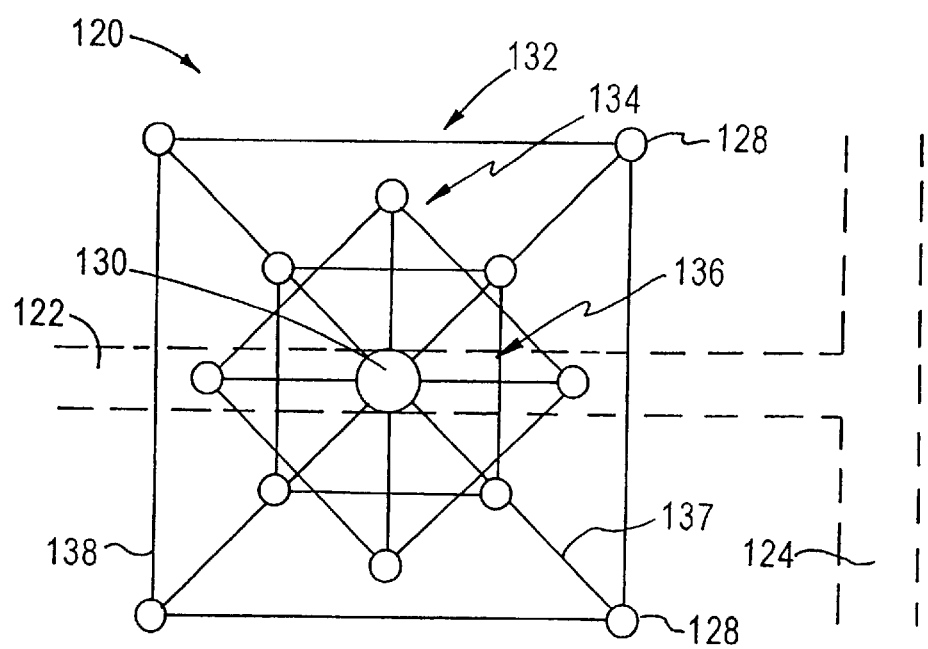
FIG. 20 is a bottom view of the preferred spraying station.

Finally, FIG. 17 depicts the use of high level operational reservoir 102 maintained in the elevated local topography to supply water to main spray system 20 and also to secondary spray system 140 (discussed in detail below), preferably located within tower 10 at a height lower than the reservoir. Because operational reservoir 102 is below spray system 20, final high head pumping station 98 will be required to pump the water to spray system 20. This is a similar system as that depicted in FIG. 14.

The added height of tower 10, compared to that in FIG. 16, will enhance the effect of aero-cooling effect due to the spray evaporation if the climatic conditions are right. The hydro-drag effect, however, is not compromised, nor are the different forms of pumped storage which make full use of the elevated operational reservoir 102.

The power obtained from the configurations in FIGS. 16 and 17 will greatly exceed that from an equivalent hydroelectric power plant. The power obtained from a regular hydroelectric power plant by dropping water from effective heights greater than 350 m will not exceed about 0.8 kWh/m$^3$. With the aero-cooling effect of the present invention, however, the power produced in a 350 m high tower (FIG. 16) would be closer to 2 kWh/m$^3$. This is a considerable gain over a conventional power plant having the same effective height of 350 m. Finally, in a 1,000 m tower, such as depicted by FIG. 17, the power will be over around 7 kWh/m$^3$ for the present invention.

There is an additional advantage in using the present invention in combination with the specific case of the Dead Sea, or other similar closed depressions. Since the Dead Sea is below sea level, the total energy that can be produced annually, either conventionally or with the present invention, is limited by the total amount of water that can be disposed annually into the Dead Sea. This, in turn, is determined by the allowable rise in the water level and by the annual evaporation rate of the Dead Sea. In this specific example, this annual quantity is about one billion cubic meter per year.

In this situation, the present invention advantageously allows the use of more than twice as much water to produce power than conventional hydroelectric plants. For each cubic meter of water used in a hydroelectric plant, essentially the entire cubic meter needs to be disposed of into the Dead Sea. Due to the aero-cooling effect and the other principles of the present invention, less than half of each cubic meter of water is disposed. Thus, more water can be used to produce power. As stated above, the power per cubic meter of water disposed by a conventional hydroelectric power station in this case is just around 0.8 kWh. The present invention, on the other hand, is advantageously able to produce around 14 kWh of power per cubic meter of water disposed. Thus, the present invention synergistically provides far greater power than a conventional hydroelectric power plant of the same effective height. The total electricity that can be delivered annually under the specific example exceeds 14 billion kWh with the present invention as compared to 0.8 billion kWh with a common hydroelectric plant—a ratio of almost 20:1.

Adaptation of Electricity Supply to Demand

The net deliverable power of the output of the tower in accordance with the present invention has daily as well as seasonal fluctuations. A characteristic output curve in the climate of Eilat, Israel is given in FIG. 46 in relative terms. Each small fluctuation is characteristic for the month. The curve has an amplitude of 15–30% of the average net deliverable power. The seasonal fluctuation is from a maximum to a minimum of about 4:1 or an amplitude of about 0.6 of the average net deliverable supply. To provide a smoothed out electrical power, about 20% of the annual supply must be stored. This is impractical, however, in terms of pumped storage, which can easily smooth out the weekly incompatibilities between supply and demands as has been explained in the above.

Figure 46:
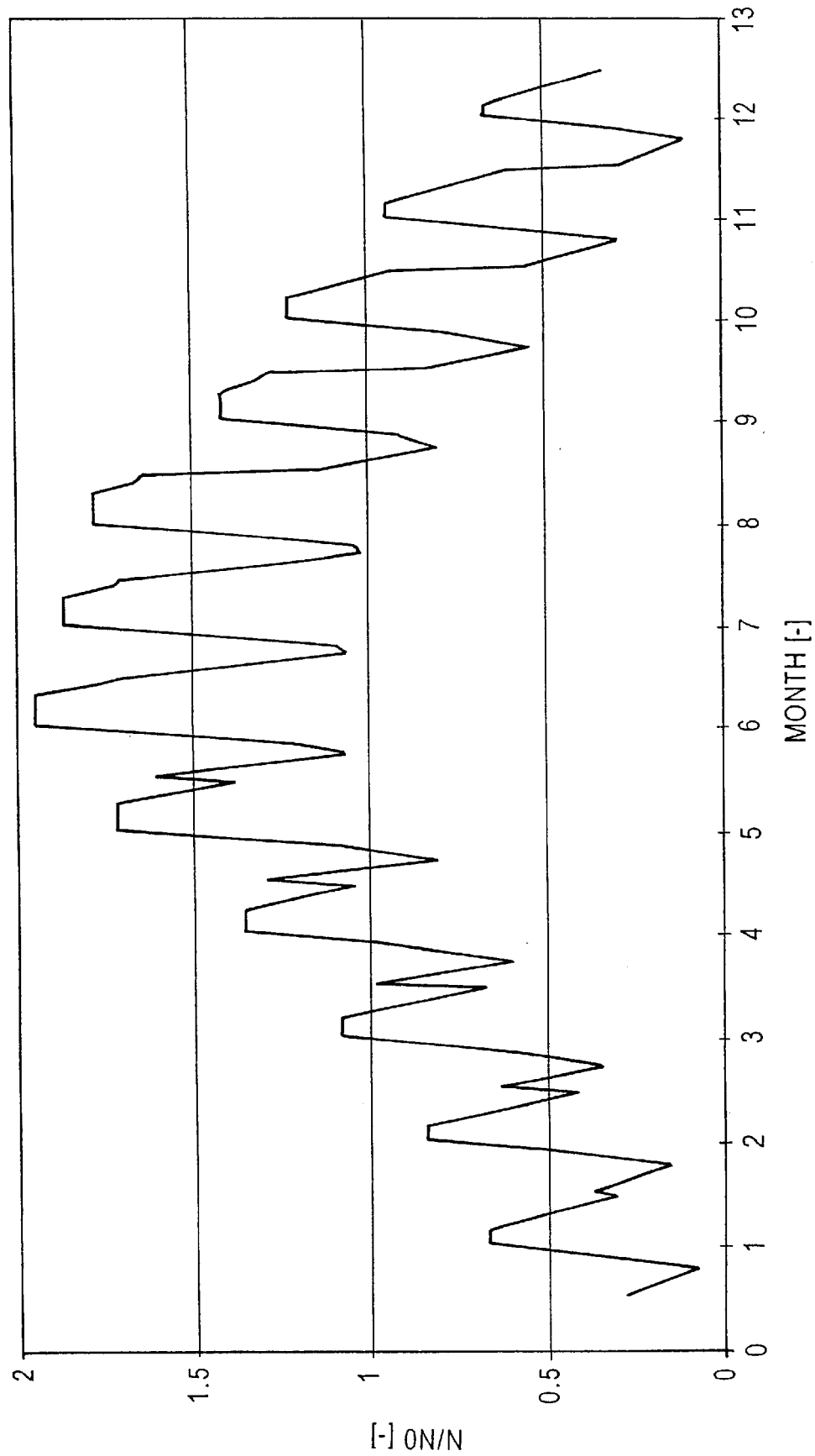
FIG. 46 is a graph of the projected daily and monthly power production of the present invention based on calculations and characteristic climatic conditions at a site south of the Arava Valley in Israel.

The seasonal adaptation of supply and demand can be done today by backup of other power units with fossil fuel as a storage means. However, there is another method that evolved from the present invention, that is the installed capacity of the tower can be reduced. The duct dimensions will remain materially the same, however, the water supply capacity and the power system will be reduced in size. If the installed capacity is as low as the winter average low production such as depicted in FIG. 46, the tower in accordance with the present invention will provide a uniform annual supply, commonly called a base load. The cost of power will be about 50% higher under the above designed winter average low production conditions. However, this design would still be preferable to burning more fuel.

It is possible, of course, to reduce the installed capacity to any level between these summer peaks and the winter low.

Spray Rate Requirements

A unique feature of the present invention is the amount of water that spray system 20 must spray to generate the optimal net power N. Since the optimal net power N is reached by combining the hydro-drag effect and the aero-cooling effect, the amount of water sprayed must be greater than the amount of water that can potentially evaporate throughout the height of the duct to fully take advantage of the downdraft of fluid caused by the evaporating water and the gravitational energy of the falling liquid.

Figure 41:
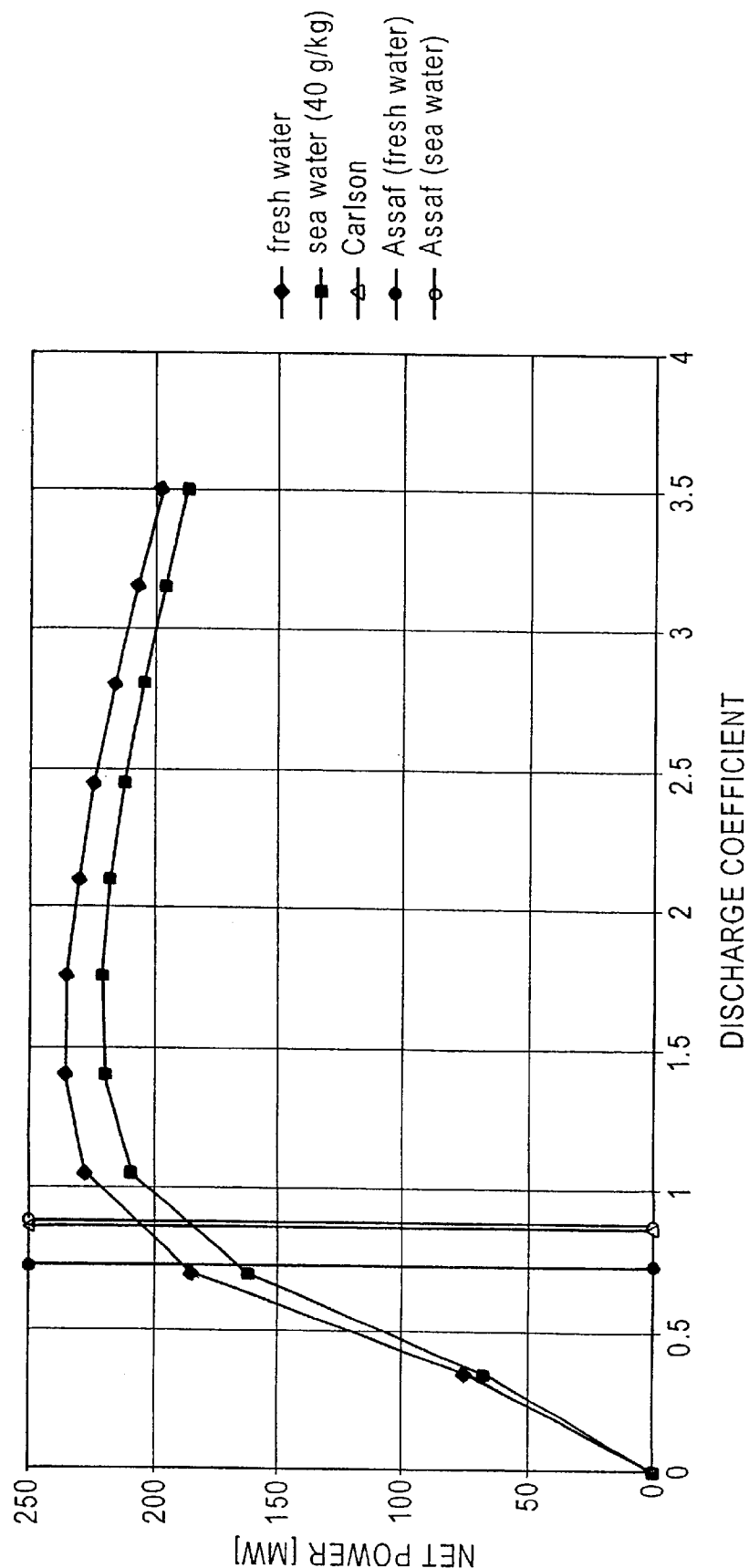
FIG. 41 is a graph depicting the effect of changing the discharge coefficient on the net power for fresh water and sea water, wherein the initial humidity was 5 grams of water per kilogram of air and the moisture difference per kilogram of air between the dry bulb temperature and the wet bulb temperature was 5.7 grams.

Referring to FIG. 41, the ratio of the amount of water to be sprayed compared to the amount of water that can potentially evaporate, or discharge coefficient R, is in the range of 1.1 to 2.3 for fresh water and 1.2 to 2.5 for sea water for net power N to remain within 95% of optimal. To fully optimize net power N, R should equal 1.5 for fresh water and 1.75 for sea water in the specific example of FIG. 41. The corresponding sprayed water mass is depicted in the graph in FIG. 40 for a specific case. Spraying excess water ensures the optimal rate of evaporation and takes advantage of the gravitational energy that can be provided by unevaporated water droplets. The exact optimal discharge coefficient R will depend on the droplet average diameter, on the pumping head from the water source to the base of the tower, etc.

As the aero-cooling effect may in some cases (such as cool, high humidity days) be reduced to nearly zero, the discharge coefficient R may approach infinity. It may therefore be more meaningful to think of this ratio in terms of 1/R. Thus, 1/R for fresh water may range from about 0 to about 0.9, while the 1/R for sea water may range from about 0 to about 0.8.

When the aero-cooling effect vanishes at the top inlet because of cool and humid weather, the hydro-drag effect can be utilized independently to provide the optimal net power N. Even in such a case there is an adiabatic warming of the descending air inside the duct and some cooling compared with the outside air. In a proper climatic site, the temperature difference between the fluid inside the duct and the ambient outside air can vary between 6° C. to 25° C. In the case of reduced aero-cooling effect, the temperature difference at the bottom of tower 10 would approach the low end of the range. Even though tower 10 is designed to run optimally when both the hydro-drag effect and the aero-cooling effect are fully working in combination, a unique feature of the present invention is that the hydro-drag effect can separately utilize the full capability of tower 10. The recommended water mass M to be sprayed in this case is based on a relationship between M and the added overall weight of the air column inside the duct in the case when the hydro-drag effect is utilized in combination with the maximum aero-cooling effect.

The average contribution to the pressure difference because of density change of the air within the duct can be roughly estimated by $$\overline{\Delta \rho} H_e g > \left[ \left( \frac{\overline{\Delta T}}{T} \right) \rho + (R-1) m_b \right] H_e g \tag{34}$$

where $H_e$ is effective height 90, g is gravity acceleration, $\Delta T$ is average cooling measured at all elevations as the temperature difference between air that is not evaporatively cooled outside the duct and air that is nearly saturated inside the duct, T is the absolute temperature (about 300 Kelvin), $\overline{\rho}$ is the average air column density, R is the discharge coefficient, and $m_b$ is the amount of moisture that can potentially saturate the air when the air is brought from the top to the bottom of the duct over an unlimited time period. The first term in the square parenthesis is related to the density change due to aero-cooling while the second term is related to hydro-drag. In reality, the contribution of the hydro-drag effect is somewhat higher because at the upper parts of the duct a larger part of the water spray is still unevaporated. The water mass of $(R-1)m_b$ is the unevaporated part remaining at the bottom of the duct below the effective height 90.

The maximum amount of evaporated water at the bottom of duct 14 and the maximum cooling, $\Delta T$, are related by the ratio of the latent heat of evaporation divided by the specific heat of air, which is 2.4. $\Delta T$ is similarly related to $m_b$ through the maximum cooling which in turn is related to the average cooling $\Delta T$. Assuming, for simplicity, that the relationships are proportional, then $$\overline{\Delta T} \approx (2.4) m_b \tag{35}$$

where $\Delta T$ is in Kelvin and $M_b$ is in grams of water per kilogram of air.

Substituting this into the previous equation results in $$\overline{\Delta \rho} H_e g > \left[ \left( \frac{2.4 \rho}{T} \right) + (R-1) \right] m_b H_e g \tag{36}$$

or equivalently $$\overline{\Delta \rho} H_e g > \left[ \left( \frac{\rho}{T} \right) + \frac{(R-1)}{2.4} \right] \overline{\Delta T} H_e g \tag{37}$$

The greater than sign in Equations 34, 36, 37 is necessary because the recovered energy arises from unevaporated water larger than (R−1) If values are entered into the above equation and R=1.75 for sea water, for example, then $$\overline{\Delta \rho} H_e g \approx 10.3 m_b H_e g \approx 4.3 \overline{\Delta T} H_e g \tag{38}$$

If the average cooling is, for example, 12.5° C. (with a maximum cooling of 15° C. at the bottom of a 1000 meter high duct) then the effect is as if there were an added mass of 53.7 grams per kilogram of air over the full height. The above computation was made with the assumption that the lapse rate is 1° C./100 m. The $m_b$ is then 15/(2.4) which equals 6.35 grams. Taking this and multiplying by the recommended discharge coefficient for sea water, and the result is 10.9 grams water per kilogram of air added at inlet 16. This is when the hydro-drag effect is used in combination with the maximum aero-cooling effect.

When the aero-cooling effect is eliminated due to climatic conditions, the hydro-drag effect can produce the full net power N when 53.7 grams of water per kilogram of air are sprayed. This is about 4.9 times as much spray as would be required when there is some hydro-drag and maximum aero-cooling combined (53.7 gm water/kg air compared to 10.9 gm water/kg air). Thus, to fully utilize the capability of tower 10 on days when there is no aero-cooling effect, the recommended water mass M must be nearly 5 times larger than the recommended water mass when there is hydro-drag and maximum aero-cooling. Therefore, the spraying systems must satisfy these requirements if the full installed capacity is to be utilized even on cool and humid days.

To reiterate, the justification for using the hydro-drag effect without the aero-cooling effect is when there exists an elevated source of water, such as in FIGS. 16 and 17, or when the water can be pumped up into a high elevation operational reservoir 102 at times of low electricity price and dropped back as droplets through the duct at times of high electricity prices. This is a type of pumped storage where one can fully utilize the duct, the turbines and the generators with no extra cost. The pumping and spraying rate, approximately 5 times the maximum pumping rate with the aero-cooling effect, simply indicates the maximum power that can be obtained through the pumped storage using the existing turbines and generators. Any extension of the pumped storage beyond this power rate will require extra investments not only in the pumps, but also in the turbines and generators. Obviously, these are approximate figures and one skilled in the art will be capable of computing it accurately for any specific case.

The optimal rate of spray depends on the air temperature and humidity at inlet 16, the geometry of the duct, the different pumping heads, the salinity of the water, etc. Additionally, the temperature of the sprayed water and the ratio of the sprayed water to air are important so that the hydro-drag effect and the aero-cooling effect can act concurrently. In other words, the mass of heat that has to be extracted from the water in order to cool the air should be limited. Normally, the mass of sensible heat introduced by the water spray will not much exceed about 500 Joules per kilogram of air when using aero-cooling alone (characteristically 10 grams of water and 10–15° C. extra water temperature). The added heat load will not exceed 2,500 Joules per kilogram of air when using hydro-drag alone, assuming 4–5 times the rate of water spray when the aero-cooling effect is predominant. These values of heat load added by the spray may even be tripled without creating a need to have preliminary cooling of the water in the operational reservoir, as would otherwise be required under excessive heat conditions. In the present invention the heat load is clearly limited to distinguish it from cooling towers, where the heat loads are higher by at least an order of magnitude.

Spray System

With reference to FIG. 18, a preferred spray system 20 comprises spraying stations 120 spaced apart on a system of parallel lateral conduits 122 that connect perpendicularly on each end to a system of parallel main conduits 124 that are connected at each end to perimeter conduit 126 that encircles the cross-sectional area of duct 14 and integrates all of the water supply conduits of the water supply system, as described above. The parallel systems of lateral conduits 122 and main conduits 124 increase the reliability and uniformity of the head of spray system 20. Preferably, the spacing **122*a* between two parallel lateral conduits 122 is approximately equal to the spacing 120*a* between two spraying stations 120. Thus, spray system 20 distributes water droplets 22 (FIG. 19) substantially uniformly across the entire cross-sectional area of vertical interior duct 14**.

Referring to FIGS. 19 and 20 of the preferred embodiment, each spraying station 120 comprises at least one spray nozzle or atomizer 128 for dispersing water droplets 22 into duct 14. The rate of water sprayed is measured by water meter 130, connecting atomizer 128 to lateral conduit 122 and having a central on/off valve. Spraying station 120 includes, in this example, three horizontal levels of atomizers comprising a first group of four atomizers 132, a second group of four atomizers 134, and a third group of four atomizers 136, spaced apart and vertically downward from lateral conduit 122 and water meter 130. The spacing between individual atomizers 128 increases at each horizontal level further downward to form a pyramid-like structure which increases the area of the spray distribution, allowing a larger spacing between spraying stations 120 and lateral conduits 122. The horizontal levels are connected to water meter 130 by vertical or diagonal conduit 137. Each atomizer 128 in each group is mounted on the corner of a square-framed conduit 138, and the corners of each square-framed conduit are rotated 45° from the corners of the square-framed conduit at the adjacent level (FIG. 20) to increase the distribution of water droplets 22 within the influence of each spraying station 120.

For example, vertical conduit 137 from water meter 130 to first group of atomizers 132 can be 3 meters long and extend laterally in a diagonal direction so that atomizers 128 are 2 meters away horizontally from water meter 130 at the center. Given a 4 meter diameter spray, the spray coverage can increase from 4 meters to 8 meters diameter per spraying station 120 and thereby reduce by four the number of spray stations 120. Obviously, there can be numerous other geometrical arrangements for water distribution within a spray station 120.

The flow rates of atomizers 128 at the different levels 132, 134, and 136 preferably differ. This arrangement allows the flow rate for spraying station 120 to be precisely controlled and adjusted by turning on and off individual atomizers 128.

As discussed above, to obtain the optimal spray there is a compromise between the faster rate of cooling that can be obtained with droplets of smaller diameter and the wish to reduce the unrecoverable energy required for atomization of these droplets. Additionally, smaller diameter droplets are more difficult to collect at outlet 18 and tend to drift in the outside air further away from tower 10 than larger diameter droplets, as will be discussed more fully below.

The invested energy to atomize water droplets is hyperbolically dependent on the inverse of the average droplet diameter, as illustrated for two different types of atomizers in FIG. 21. Characteristically, the average droplet diameter d is inversely proportional to the pressure P to the power 0.3, or $d \approx (1/P^{0.3})$. Using a typical atomizer, a 100 micron average diameter droplet would approximately require nearly a 1,000 meter head, while droplets of 500 micron average diameter require only about a 10 meter head. The preferred embodiment average droplet diameter for the aero-cooling effect is in the range of 150 to 250 microns, which requires approximately a 40 to 200 meter head using the pressure atomizer represented in FIG. 21. The economical optimum would be closer to the lower required head. In all cases, however, the average droplet diameter should certainly be above 100 microns. Further, providing some droplets having diameters of greater than 500 microns can be advantageous in maximizing the hydro-drag effect and in collecting the unevaporated droplets before they exit the duct. Atomizers with differing dependence of average droplet diameter on invested head in the atomization process can be mixed and matched to increase flexibility and improve results. Also, it is theorized that by directing the spray downward, such as by pointing a pressure atomizer toward the ground, as much as ½ of the spraying energy can be recovered.

The spraying energy per unit volume of air is $$E_S = M.g.lt_s \tag{39}$$

where M—the mass of water per unit volume of air in Kg/M³; g—the gravity of calibration in M/sec² Hs—the spraying head in m. the water velocity $V_j$ of a nozzle is $$V_j = C_k \sqrt{2gH_s} \quad (40)$$

where $C_k$ is the head loss coefficient for the nozzle, characteristically 0.95. The full momentum of the flying droplets is transmitted to the air. As the droplets are slowed down to their final falling speed, relative to the air they have transmitted fully their momentum to the air in the form of extra pressure, it is very much like a fluid colliding head on with a wide dimension flat orthogonal wall. The average pressure in Newton per square meter is $\Delta P_S$ where $$\Delta P_3 = \frac{M(V_j - V_a)^2}{2} \tag{41}$$

where Va is the air velocity. Replacing $V_j$ from Equation (40) and expressing the power ratio of recovering to spray energy we get $$\frac{Va\ \Delta P_s}{Va \cdot M_g - H_s} = C_k^2\left(1 - \frac{V_a}{C_k\sqrt{2gH}}\right)^2 \tag{42}$$

where Va is the local vertical air velocity. When Ck is about 0.95 and Vi can typically be over four times larger than Va the recovery of spray energy may seem to be about 51%.

Notably, however, two more corrections must be made to the calculation. One is for droplets flight which is not collinear with the air flow direction. Mostly the spray is in the form of a cone. If the average angle is 300 then the recovery must be as the curve of the angle, about 0.87. The second correction is due to the pumping efficiency $\eta_p$. If it is 0.85 weight the recovery to be $$\eta_p\, C_k^2 \cos\delta\left(1 - \frac{V_a}{C_k\sqrt{2gH_s}}\right)^2 \tag{43}$$

and for the specific example 0.51×0.87×0.9=0.40, a little less than one half. Clearly, in this invention a preferable embodiment is that the spray jet direction is collinear (within 30°), as much as possible with entering air speed vector at the top inlet. The atomizers should be chosen with high value of Ck as close to a unity as possible. The atomizers should be preferably installed where the air velocity Va is small.

FIGS. 22 and 23 depict the advantages of having droplets of larger average diameter. As droplet diameter increases, so does the terminal velocity of the droplet which simplifies the spray precipitation at the bottom outlet. Also, referring to FIG. 23, increased droplet diameter results in dramatically increased net power up to a droplet diameter of about 150 microns using a certain pressure atomizer. Thereafter, increased droplet diameter results in reduced net power, but at a rate much less than that of diameter changes up to 150 microns. The economical optimum will be to the right of the energy maximum in FIG. 23. This is because of the other advantages, especially the easier precipitation and collection of the unevaporated spray.

FIG. 24 represents a typical volume distribution of droplets within a specified range of diameters. The relative span (RS) of droplet diameters is defined as $RS=(D_{90}-D_{10})/D_{50}$, where $D_{90}$ is the droplet diameter where 90% of the total volume is of droplets with smaller diameters, $D_{10}$ is the droplet diameter where 10% of the total volume is of droplets with smaller diameters, and $D_{50}$ is the droplet diameter where 50% of the total volume is of droplets with smaller diameters.

Several characteristic droplet diameter distributions are illustrated in FIG. 25. The three distributions vary in the mean diameter and in the RS. In order to reduce the amount of fine spray, it is possible to choose an atomizer having a larger average diameter in order to make sure that the droplets will all precipitate within a given distance from outlet 18. It is preferred, for example, that there will be as few droplets as possible smaller than 130 microns (FIG. 25). The distribution curve furthest to the right has the smallest quantity of droplets to the left of this limit. This is expressed by the area under the curve to the left of a vertical line at 130 microns. The size of the droplets is determined mainly by the atomizer's orifice diameter and water pressure. The choice of a large mean droplets diameter, however, involves less efficient cooling and loss of power, as in the curve in FIG. 23 to the right of the maximum.

There is an alternative way to reduce the tail of small droplets to the left of a certain droplet diameter which will precipitate within a certain distance from outlet 18. This method is to choose atomizers with a narrow droplets size distribution or RS (relative span). As an example, rotary atomizers as a rule have a considerably smaller RS. This solution does not require as large an increase in the mean droplets diameter.

It is preferred, therefore, to have an atomizer with small RS, less than a unity. Another preferred embodiment is to have cheaper and simpler atomizers with larger RS, but undertake other means to enhance droplets precipitation as will be explained in the following.

Spray system 20 must adapt to meet a number of general requirements. First, the volume of water sprayed must be controlled to adjust for changes in the difference between the dry bulb temperature and the wet bulb temperature. The rate of spray must be able to vary from the theoretical maximum down to almost zero. During cold and humid spells, the total amount of spray will approach zero, unless the hydro-drag effect is being used. Generally, the amount of spray will be zero only when the station closes because the net energy output does not justify the cost of operation, especially when there is no recovered energy from pumped storage and only or mainly the hydro-drag effect is utilized.

Second, spray system 20 must adapt to grossly changing wind velocity distributions over the cross-sectional area of duct 14, resulting in widely varied vertical air velocity components across inlet 16. The spraying rates must be adjusted such that each cubic meter of air entering duct 14 gets the right proportion of spray so that the water/air ratio across the duct is uniform. The water supply system, spray system 20 and power systems 164 should be able to vary from a nearly zero rate to the maximum rate with an accuracy of better than 1:10 of the full scale spray rate as explained below, even at a third of the installed capacity, or better than 1:30.

Finally, spray system 20 must compensate for malfunctioning individual atomizers 128 and for atomizers taken out of service for maintenance. In order to handle this, there is a need for a redundant spraying capacity at each spraying station 120. The redundancy must be at least 50%, and is preferably 100%, so that gross dissymmetry in spray distribution can be met and outages of a few individual atomizers 128 in each spray station 120 will not necessarily require immediate maintenance or replacement. The individual atomizers 128 in the spray stations 120 may be actuated on and off by solenoidal actuators commanded from a distance. The adjustment of a new spray distribution should be possible every fraction of an hour. The time period from one change to another should not be more frequently than 2–3 times the time it takes for the air to flow from top inlet 16 to bottom outlet 18.

Providing a proper ratio of sprayed water to air and keeping a uniform distribution is important in optimizing the net output of the plant. As depicted in the graph in FIG. 40, the ratio of water mass to air has a direct effect on net power. Further, it can be proven in general that the loss in power as a result of a non-uniform water/air ratio will be roughly proportional to $$\frac{1}{2}\frac{\partial^2 N}{\partial M^2}\sigma^2;\ M = Rm_b \qquad (44)$$

where N is the net deliverable energy output, M is the water mass added per kilogram of air, and $\sigma^2$ is the variance of the water/air ratio, M, across the duct cross-section 38 close to the top inlet 16 where the spray system 20 lies. Note: M is sometimes defined as a mass of water per mass of air. In some cases, however, M is being used to define a mass of water per unit volume of air with no loss of generality if dimensions are used consistently. The variance $\sigma^2$ can be estimated for different spray distribution patterns, and will be in the order of ¼ to ½ the extreme deviation of the ratio from its average squared $(\Delta M)^2$. The second derivative, in relative terms, would be in the order of 2 to 4 near the optimal value of M. Thus, to prevent the reduction of net deliverable power by more than 1%, it will be necessary to avoid local deviations of the water/air ratio by more than 7–14%.

Preferably, local deviations in the water/air ratio will be less than 10% of the optimal average water/air ratio for duct 14 as a whole. This accuracy should be maintained when the overall capacity of the duct is only a fraction, preferably ⅓, of the planned capacity. If it is decided to allow higher reductions in power, say 4% of the optimal power, then the accuracy in the water ratio M can be reduced to ⅕ instead of ⅒. Also, the number of atomizers can be reduced by ½ if such large atomizers are available with the right droplet size.

Wind tunnel experiments indicate that the vertical component of wind velocities at inlet 16 can double or reduce to zero from point to point across the inlet. This means that the water spray distribution must have the capability to vary between the same extremes. If the water spray distribution is uniform while the vertical component of wind velocities doubles at some points across inlet 16, then the power depreciation can be 25% or greater. Thus, a valuable feature of the present invention is the ability to adjust the water spray distribution to the air entry rate distribution across inlet 16.

In order to adjust the water spray distribution it is necessary to measure the vertical component of the air flow in different parts of inlet 16. Then, the average velocity component is calculated. The ratio of the local spray rate to the average spray rate should be equal to the ratio of the local vertical air flow component to the average vertical air flow.

The adjustment of the average spray rate and the local spray rate can be done by adjustment of continuously controlled valves or by on/off valves on atomizers 128. Water meter 130, however, still totally measures the supply of water to spraying station 120. The functionality of individual atomizers can be checked by water meter 130 by opening and closing each atomizer individually and measuring the flow. Notably, many of the commercially available atomizers change the spray rate and droplet diameter concurrently, which is an inconvenient dependence. Thus, it may be more advantageous to have atomizers with constant pressure and on/off type valves where the droplet diameter and spray rate will be known.

For example, consider that spraying station 120 has to provide up to k times the maximum average spray rate, where k>1 is the redundancy coefficient. Assume that there are 3 types of atomizers 128 in each spraying station 120, referring to FIGS. 19 and 20, where: $n_1$ units of the first type of atomizer each providing a rate of spray $k/n_1$; $n_2$ units of the second atomizer type, each with a spray rate of $k/n_1n_2$; and $n_3$ units of the third atomizer type each providing a spray rate of $k/n_1n_2n_3$. It can be shown that the most precise adjustments to the spraying station total rate, with a minimum number of atomizers, can be accomplished if $n_1=n_2=n_3$. Finally, assume that the maximum spray rate may be reduced by a fraction f<1 for times when the climatic conditions do not allow the plant to work at full scale. And, as stated above, the deviations of the water added per kilogram of air (ΔM) are kept to a minimum. Then the formula for this example can be summarized as follows $$\frac{\Delta M}{\overline{M}} > \frac{k}{f\, n_1 n_2 n_3} \qquad (45)$$

where $\overline{M}$ is the average M for all air volumes across the duct inlet and ΔM is the local deviation from ΔM, (ΣΔM=0).

If $n_1=n_2=n_3=4$, f=0.3 and k=2, then the permissible deviation of spray per unit air volume will not be more than 0.1 and according to Equation 44 the reduction in net deliverable power N will be less than 1%.

For example, for a spraying station 120 covering a cross-sectional area of 8 m×8 m, where the air speed is 20 m/sec and the maximum water mass per unit volume of air is roughly 10 gm/m$^3$ then the total rate of the spray from spray station 120 becomes: 64 m$^2$×20 m/sec×0.01 liters/m$^3$=12.8 liters/sec. This can be rounded up to 15 liters/sec. If k=2, then twice the amount of water, 30 liters/sec, should be able to be supplied by $n_1=4$ atomizers (see explanation of choice of n below). Then, each atomizer of the first type should provide 7.5 liters/sec. Additionally, there are $n_2=4$ atomizers each capable of supplying $k/n_1n_2=k/16$ or 1.87 liters/sec. Finally, $n_3=4$ atomizers of the third type are each capable of providing a flow rate of $k/n_1n_2n_3=k/64=1.87/4=0.47$ liters/sec. It is now possible to supply any level of spray rate from spraying station 120 with steps ΔM/M of 1/64 out of the double rate (k×M) of 30 liters/sec, starting from a zero rate when all atomizers are shut to a maximum of 4/4+4/16+4/64=84/64=1.3 times 30 liters/sec when all atomizers run water. This accuracy in water spray application can insure that the water/air ratio does not deviate more than 10% at ⅓ of the full capacity. In a practical case it is still necessary to find if there are atomizers or combined atomizers that can provide the required spray rates with the right droplets size distribution. The assortment of atomizers can easily be changed accordingly.

The above formulation of the assortment of on/off atomizers allows the exact rationing of water spray in each spraying station 120, which can be monitored and changed every 2 to 3 minutes. The number of types of atomizers 128 per spraying station 120 can be one or many. For example, using 2 different types of atomizers 128, the number of atomizers required to satisfy the water spray demand is around 16. If the number of atomizer types is t, with k=2, f=⅓ and $(\Delta M/\overline{M})$=0.1, then n'=64, and the total number of atomizers can be reduced or increased by choosing the number of types t.

To reiterate, the objective is to find a series of atomizers 128 in each spraying station 120 that provide the maximum average mass of water per unit mass of air, $\overline{M}$. It is anticipated, however, that a multiple of this quantity (i.e., k×M) should be provided in extreme cases. Further, the rate of flow should be able to be accurately gauged, such that $\Delta M/\overline{M}=0.1$. And, this accuracy should be maintained in situations where the produced power is only a fraction of the full scale power. In these situations, the quantity of water provided is $f(\Delta M/\overline{M})$, where f<1 (e.g., f=0.3).

In order to provide this quantity of water, a number of atomizers 128 are needed that can accurately provide such small portions of water (see Eq. 29). For example, if the maximum rate of flow is divided into 64 parts, then it is possible to have 64 atomizers of one type. Alternatively, there can be 16 atomizers where 8 of one type provide ⅛ of the maximum flow and 8 atomizers of another type provide 1/16 of the maximum flow. Further, it is possible to have only 12 atomizers, where 4 atomizers provide ¼ of the maximum flow, another 4 atomizers provide 1/16 of the maximum flow, and a final 4 atomizers provide 1/64 of the maximum flow.

The reasoning for the above is as follows: $\Delta M/\overline{M}=0.1$ is chosen in order to make sure that the power reduction due to non-uniformity of the water/air ratio will not exceed 1%. This may be required when the overall flow rate of the atomized water is a fraction, such as $f=\frac{1}{3}$, of the installed capacity. This means that the deviation should not exceed $(\Delta M/\overline{M})\times f=(0.1)/3=\frac{1}{30}$ of the maximum average flow rate. If there is need in extreme cases to give twice this amount (k=2) because of the outside wind 36, then the invention should be able to provide adjustments at each level, from zero to maximum, at steps of $(\Delta M/\overline{M})\times(f/k)=\frac{1}{60}$. This may be obtained in different ways, depending on the number of atomizer types, t. The above example uses atomizers of t=3 types and n=4 of each. Then, $n^t=64$, thereby providing adjustments in steps of 1/64 which satisfies the above 1/60 step requirement. In the other example, there are only t=2 types. Then it is necessary that $n^2>60$ or n=8 atomizers of each type.

There is freedom to change the choice of atomizer types for different practical reasons. As an example, if large atomizers of ½ the maximum planned average rates are not available in the right droplet diameter category and reasonable pressure range, then it is possible to substitute a different quantity of another type and thus fit the design to the available equipment. It is possible to have 20 atomizers of a second, smaller rate replacing 4 large rate atomizers and 4 small rate atomizers. The main point is to have an assortment of atomizers producing the right droplet diameters distribution and different flow rates to enable the regulation of the spraying rate at small steps, with the right accuracy and redundancy and at the minimum life cycle cost. It is further possible to actuate a group of small atomizers with a single valve.

The margins of the design of spray system 20 must remain relatively wide for several reasons. It is possible to develop better and cheaper spray collection methods, discussed below, whereby the droplet diameter relative span can be increased which allows the atomizers 128 to be chosen more freely with greater energy savings. If the water used is not sea water but brackish or nearly fresh, the excess pumping can be reduced and the environmental demands lead to somewhat less stringent and less costly collection methods for prevention of pollution by an escaping liquid spray.

With reference to FIG. 1, the addition of a secondary spray system 140 of large diameter droplets constitutes a relatively powerful means to collect small diameter droplets. Further, secondary spray system 140 is an important factor in providing extra power production through the hydro-drag effect. It is therefore recommended to have the average droplet diameter larger than 500 microns for activation of the hydro-drag effect only, with little or no need for cooling, as the hydro-drag effect is not sensitive to droplet diameter and is almost insensitive to the spray distribution. The use of such large droplets makes it possible to use irrigation system equipment rather than specially designed atomizers 128, reducing the overall spray system 20 cost and increasing reliability. Further, some of the spraying energy is not recoverable and large droplets will keep this lost energy to a minimum.

The location of secondary spray system 140 may be anywhere along the vertical height of duct 14, but preferably at the upper portion of tower 10, proximate inlet 16. The secondary spray system 140 may also be integrated with spray system 20. Referring to FIGS. 3, 16 and 17, secondary spray system 140 may be independently supplied with water by high level operational reservoir 102 or by a natural water source 92 at a high elevation. The advantage of this arrangement is to utilize the natural head of the elevated water supply to reduce or eliminate the need to further increase the water pressure in order to atomize it.

The larger diameter droplets have another very important impact on the spacing between atomizers 128, the number of atomizers and ultimately the spacing between spraying stations 120. The horizontal reach of each atomizer 128 is only as far as the droplets can be catapulted, and the small diameter droplets lose their horizontal flight velocity after a very short distance. On the other hand, the larger diameter droplets fly farther horizontally, allowing for larger spacing between atomizers 128, roughly in proportion to the terminal fall velocity. From laboratory test results introduced into the power computations, it was found that droplets averaging between 150 and 250 microns, preferably 150 microns, worked better and produced more net power than 100 micron diameter droplets for combined aero-cooling and hydro-drag effect. Smaller droplets would be preferred if special energy saving atomizers are found. Droplets of the preferred diameter cannot fly much beyond 2–2.5 meters away from atomizer 128. Smaller diameter droplets would call for more atomizers 128 at shorter distances. Thus, without any overlap of the spray between atomizers 128, the distance between atomizers 128 should not exceed 4–5 meters.

FIGS. 26 and 26A depict rotary atomizer 142 which uses centripetal force to advance water 143 from center section 144*b* and catapult into the air water droplets 22 that are formed at perimeter 144. The edge 144*a* of perimeter 144 may be flat or serrated (FIG. 26B). As FIG. 26A depicts, the resulting spray from rotary atomizer 142 forms a conical pattern 146 with a circular base 148 that expands as it falls. Water droplets 22 are distributed mainly at the perimeter 146*a* of conical pattern 146, rather than throughout the entire volume.

Referring to FIG. 26C, rotary atomizer 142' further comprises hairs, bristles or whiskers 145 that protrude substantially radially from edge 144*a*. Preferably whiskers 145 are curved in a manner to closely match the flight trajectory of the water droplets 22 flying off of the rotary atomizer due to the Coriolis accelerations. These accelerations are produced by the combination of the radially outward movement of the water and the rotation of the atomizer.

The curved whiskers 145 of rotary atomizer 142' advantageously reduce the spill of droplets 22 off of median points on the whiskers at higher rates of water flow. Additionally, curved whiskers 145 allow the flow of droplets to be cleaner, as well as improving the uniformity of the droplets diameters and increasing the flow rate.

Figure 26:
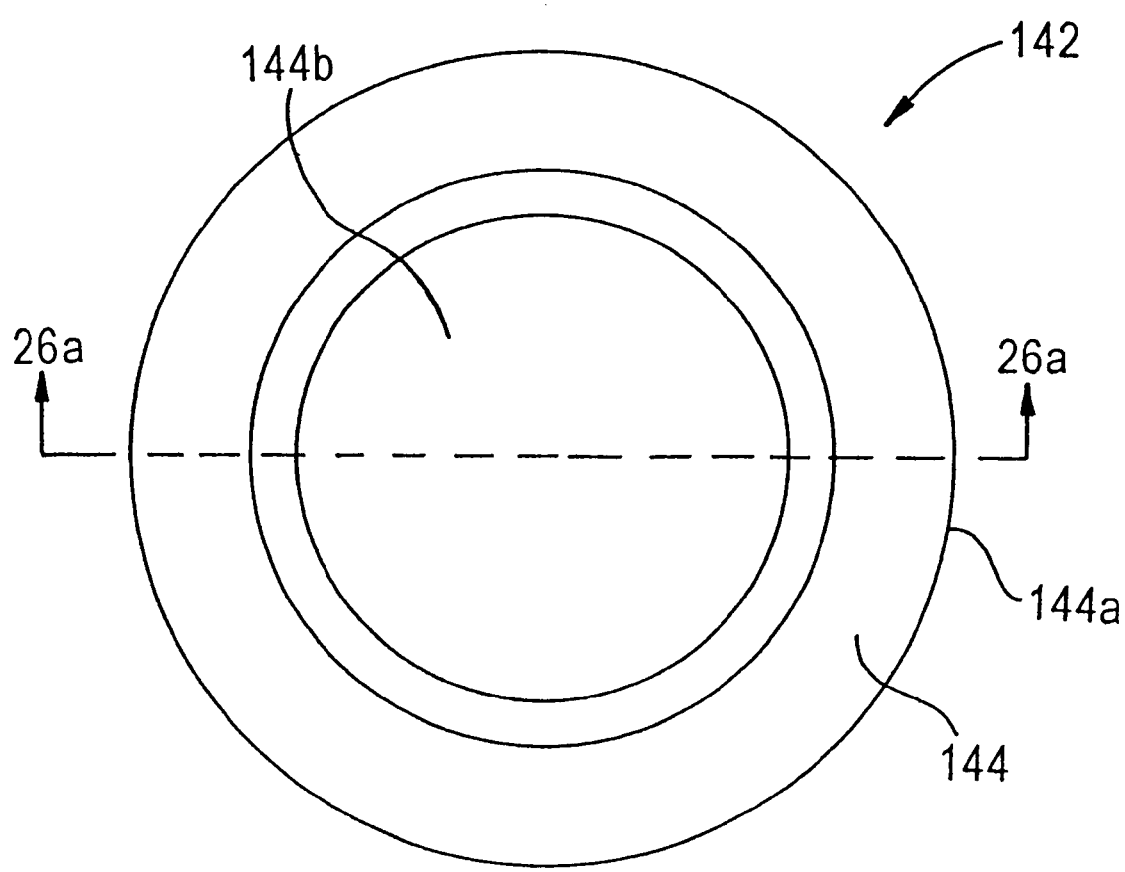
FIG. 26 is a top view of the preferred rotary atomizer.
Figure 26A:
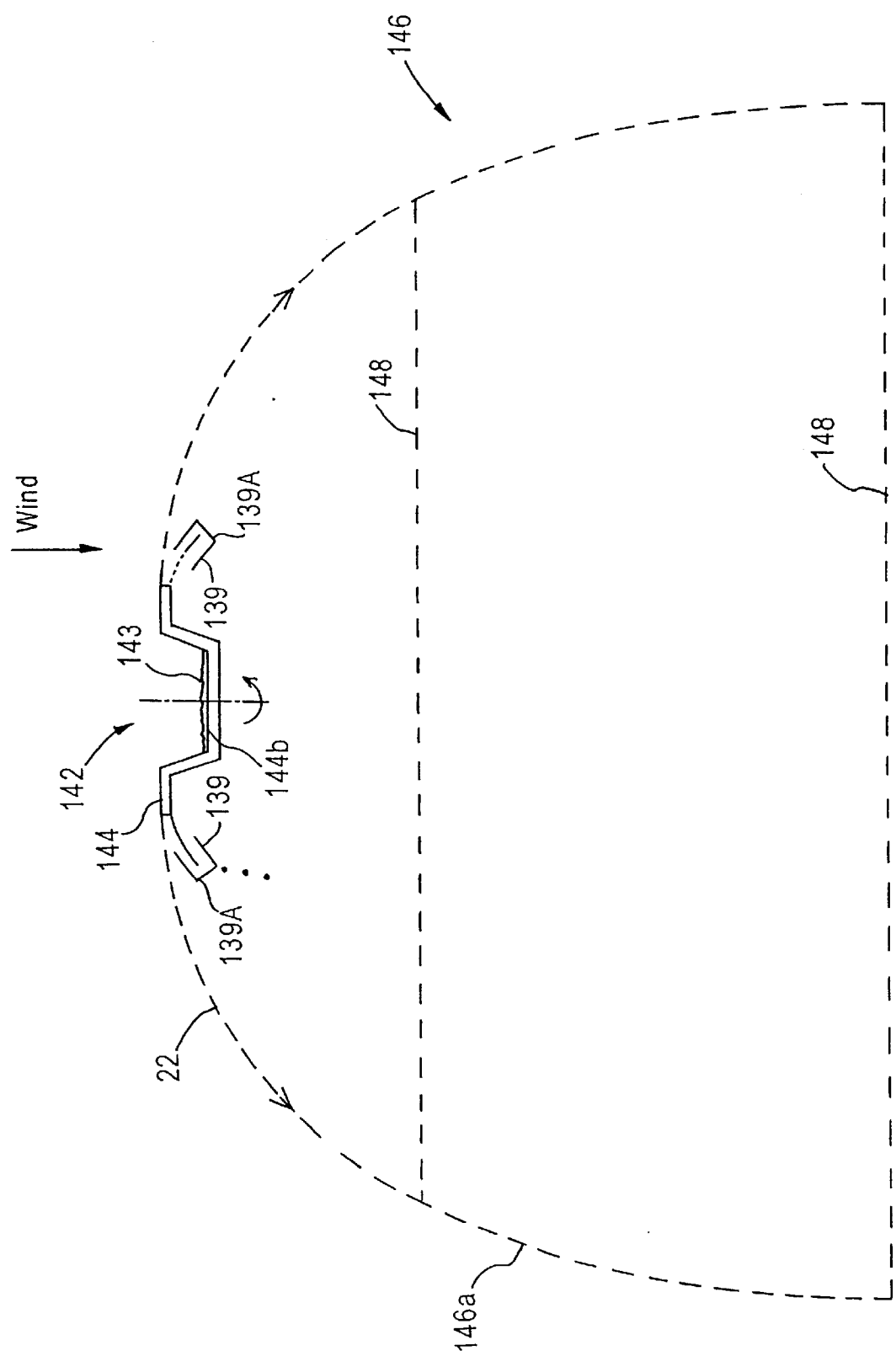
FIG. 26A is side sectional view of the preferred rotary atomizer and the associated droplet spray pattern.
Figure 26C:
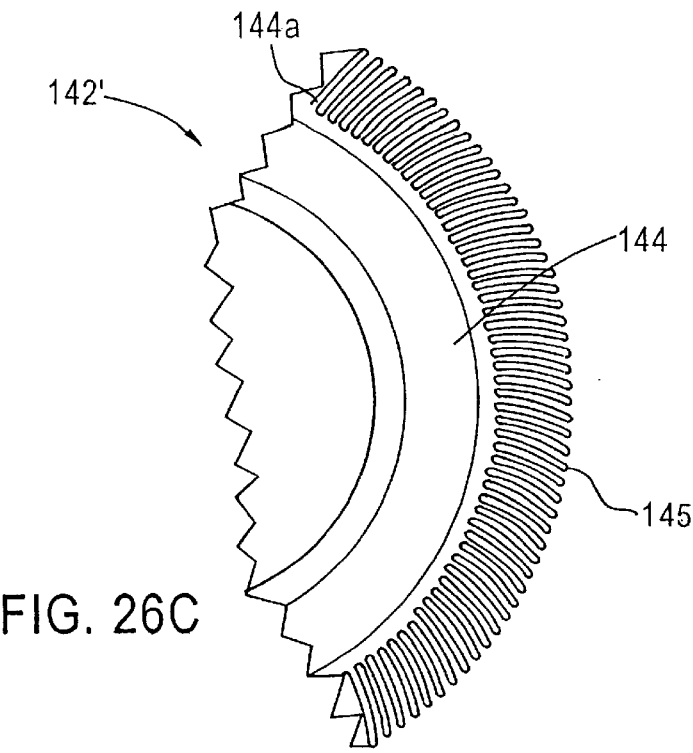
FIG. 26C depicts a partial top view of a rotary atomizer having curved whiskers at the edge.
Figure 26B:
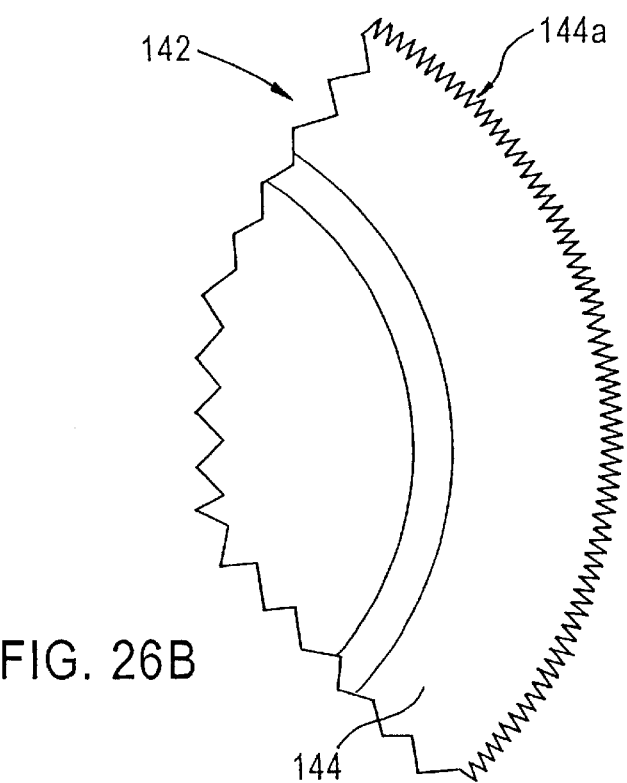
FIG. 26B depicts a partial top view of a rotary atomizer with a serrated edge.
Figure 26D:
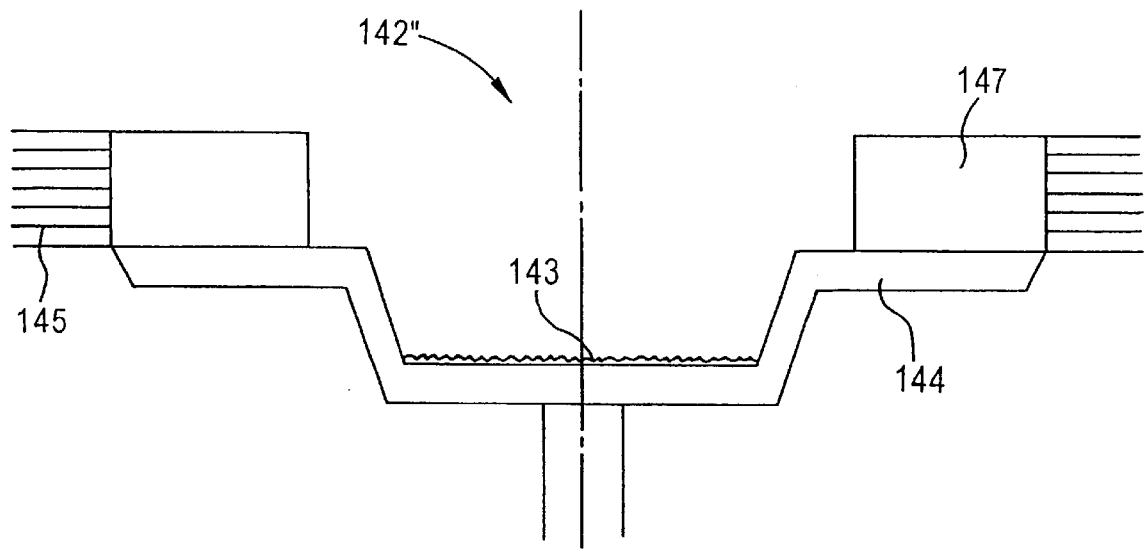
FIG. 26D depicts a vertical cross-section of the rotary atomizer of FIG. 26E.
Figure 26E:
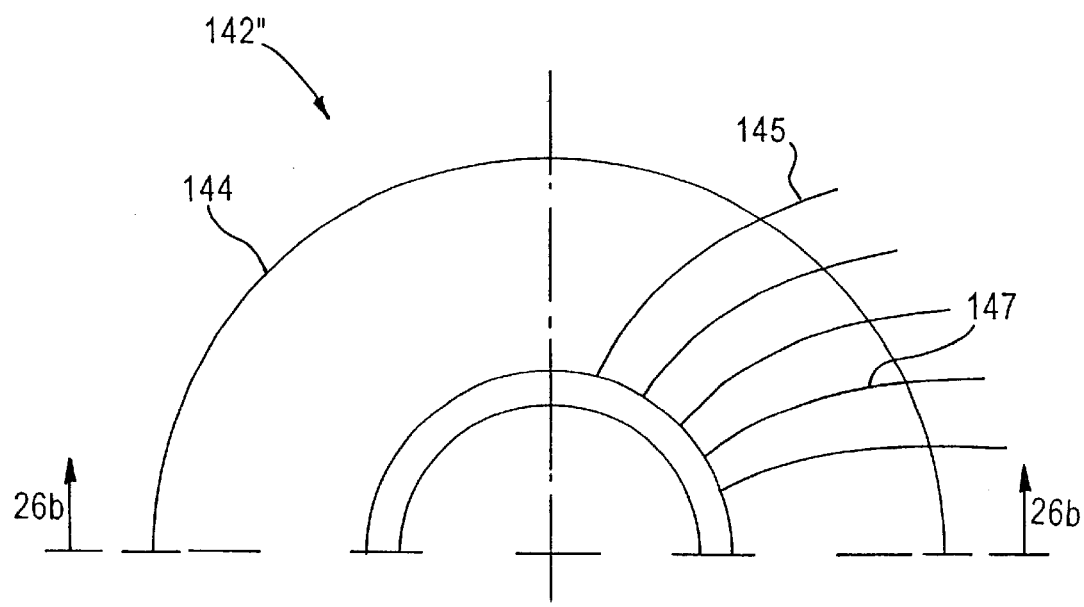
FIG. 26E depicts a partial top view of a rotary atomizer having whiskers attached to vertical walls.
Figure 27:
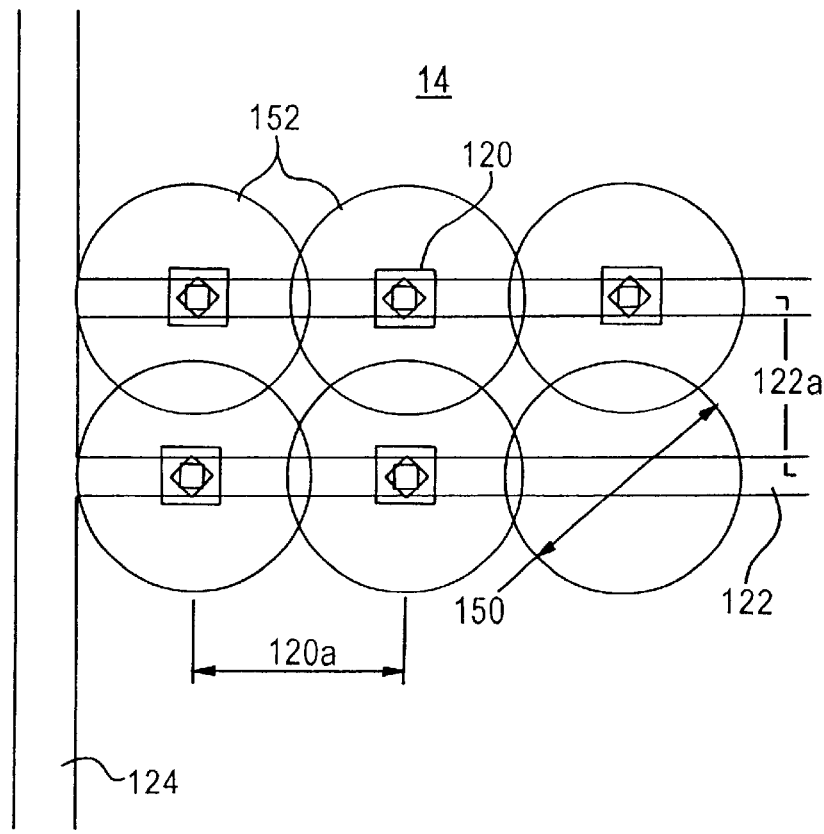
FIG. 27 is a bottom view depicting a partial section of the spray system with the circles representing the overlapping spray pattern of each spray station.
Figure 28:
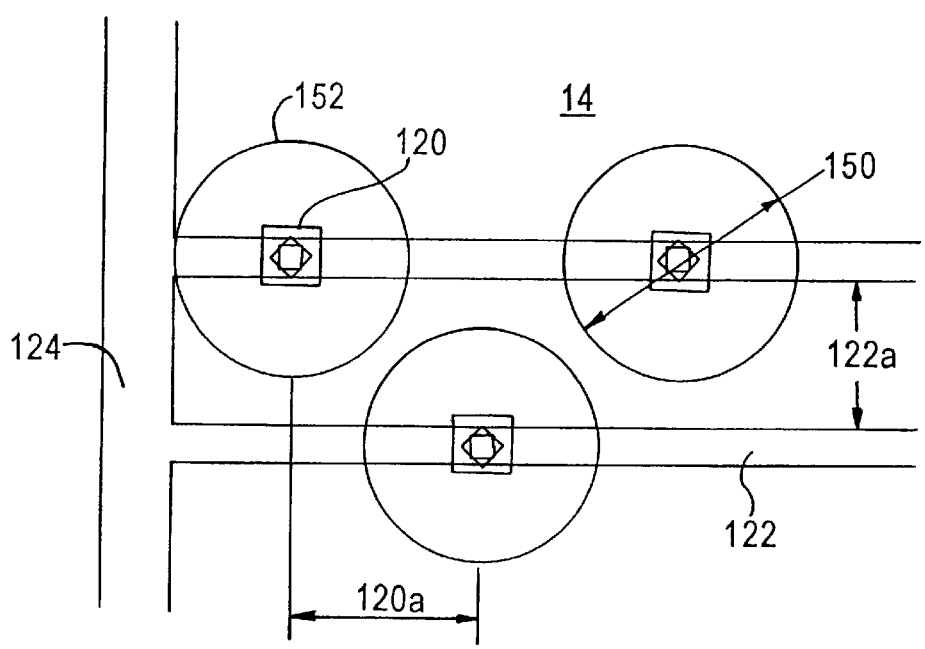
FIG. 28 is a bottom view similar to FIG. 27, but depicting the spray stations further spread apart so that the spray patterns do not overlap.
Figure 29:
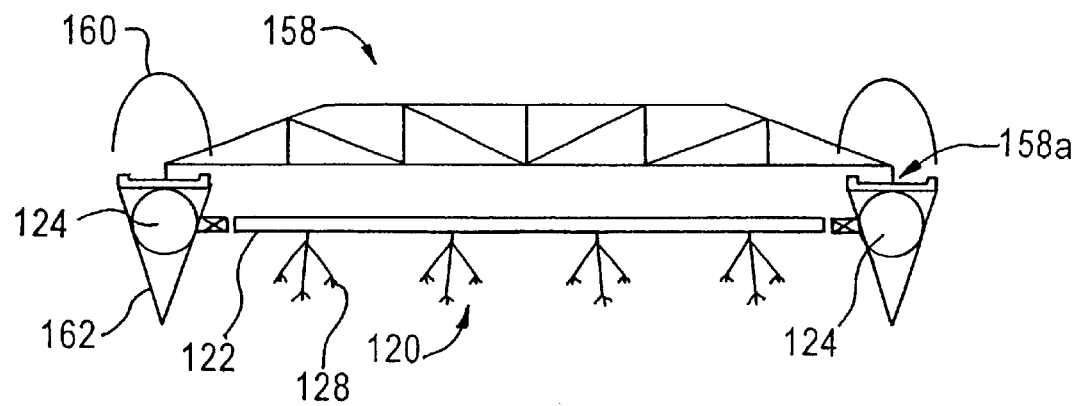
FIG. 29 depicts a service crane running along the main conduits of the spray system.
Figure 30:
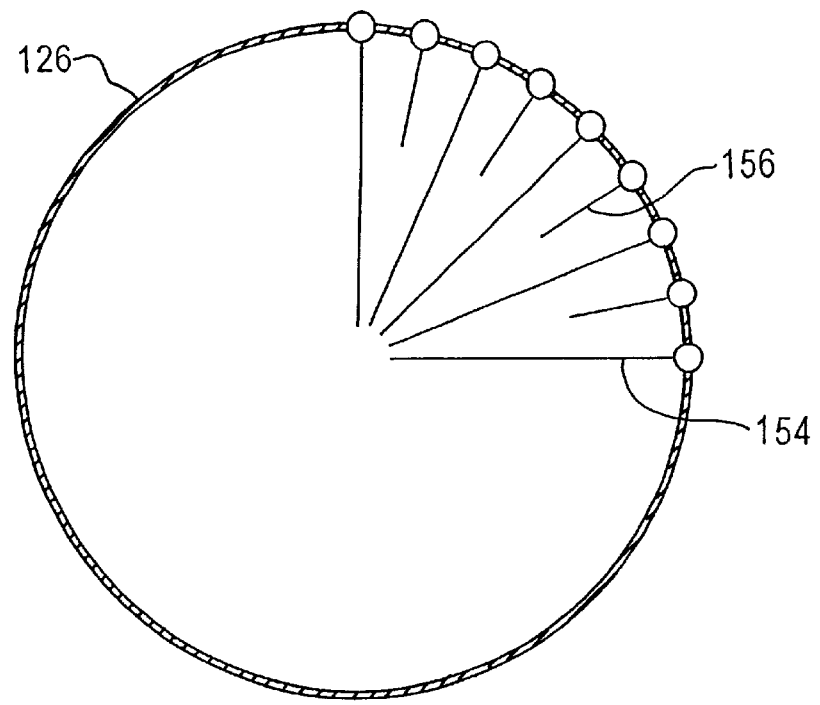
FIG. 30 depicts an alternate embodiment of the spray system structure that utilizes radial conduits.
Figure 31:
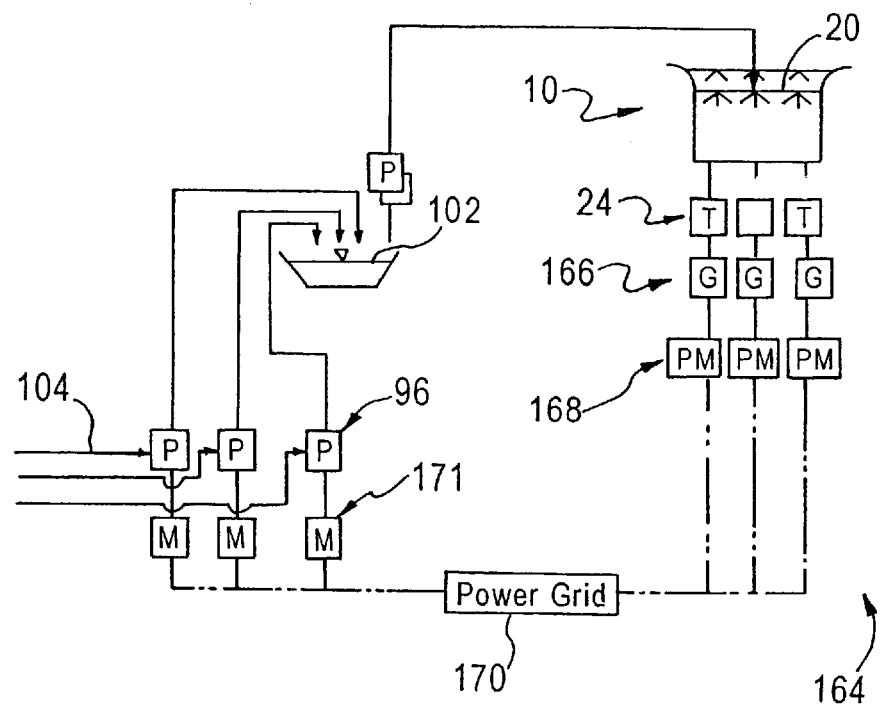
FIG. 31 is a schematic representation of the association between the power system and the water supply system.
Figure 32:
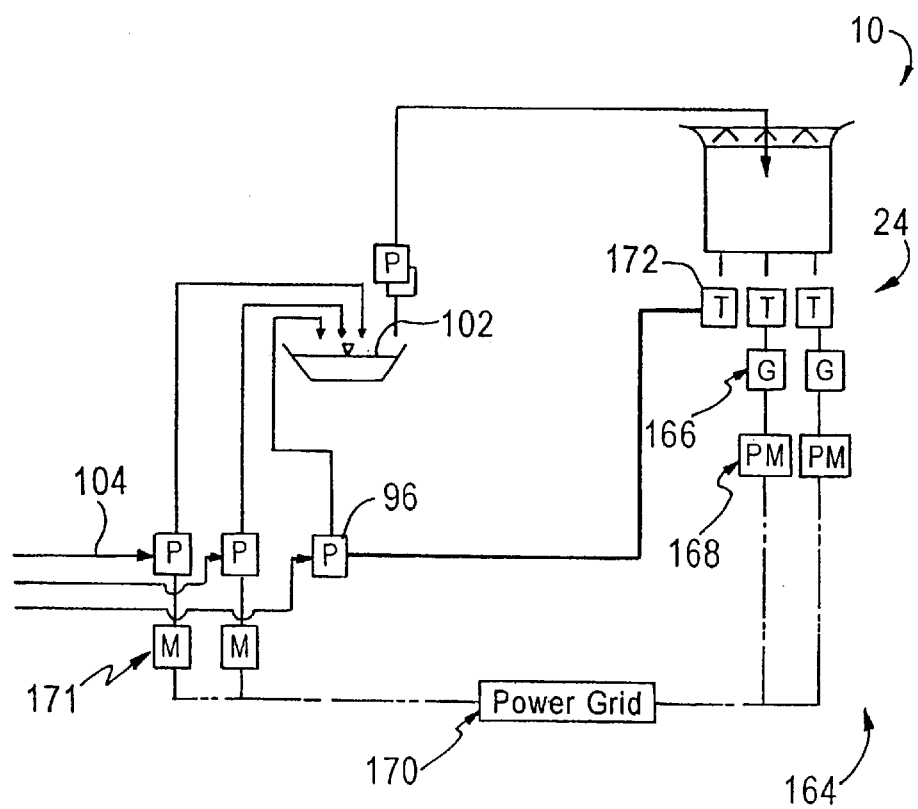
FIG. 32 is a schematic representation similar to FIG. 31, but illustrating an embodiment providing a direct connection between a turbine at the bottom of the tower and one of the pumps in the water supply system.
Figure 33:
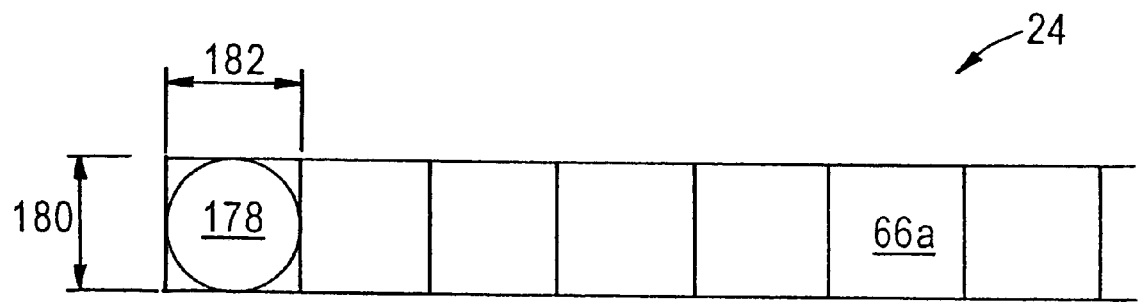
FIG. 33 depicts a rolled-out side view of the turbine array.
Figure 34:
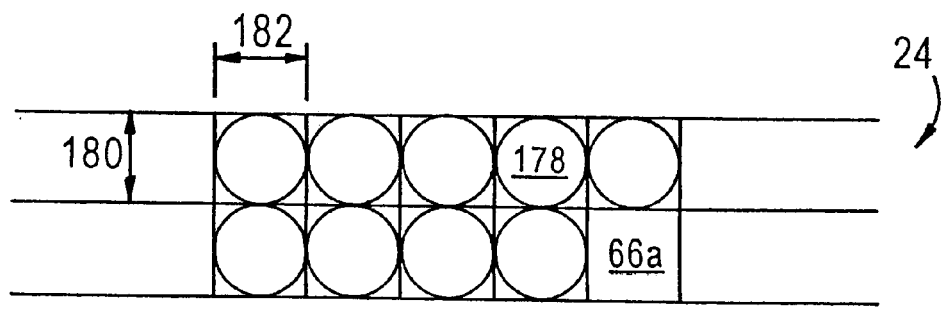
FIG. 34 is similar to FIG. 33, but illustrates two levels of turbines.
Figure 35:
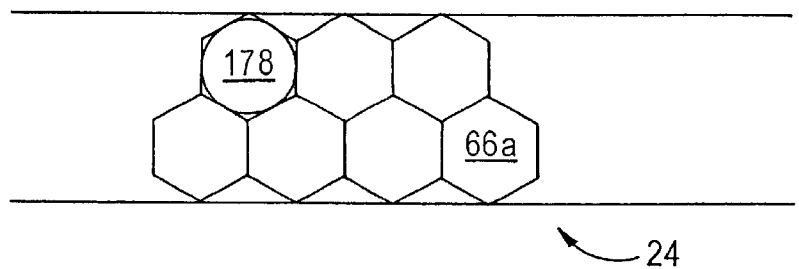
FIG. 35 is similar to FIGS. 33 and 34, but depicts a hexagonal arrangement of turbines at the outlet.

The flow rate can be improved even further by providing rotary atomizer 142" having vertical walls 147 extending perpendicular to the surface of perimeter 144, as depicted in FIGS. 26D and 26E. The water 143 spreads radially and then climbs up the radial walls 147, which may be curved. This arrangement lengthens the edge along which whiskers 145 can be installed and increases the rate of flow before the water 143 starts spilling off the whiskers. The flow rate can be increased about 5 to 10 times, compared with an atomizer having a flat perimeter, without compromising the droplets size distribution. Rotary atomizers may be used for main spray system 20, as well as for secondary spray system 140. FIG. 27 is an illustration of one way to reduce the number of spraying stations 120 by having some areas uncovered by conical spray patterns 152 of spraying stations 120. Water from main conduit 124 and lateral conduits 122 feeds the spraying stations 120. The diameter 150 of spray pattern 152 is less than spraying station spacing 120a and lateral conduit spacing 122a, thereby creating uncovered areas not reached by the spray pattern. Due to the combined effect of the spray from the atomizers, however, water droplets are distributed throughout the volume of spray pattern 152, but not uniformly across the cross-sectional area of duct 14. As the air and droplets fly down inside the duct the turbulence will tend to close the gaps which were not directly sprayed with water. This of course reduces the cooling efficiency initially and will not be used unless it is proven that there are large enough savings in reducing the number of spraying stations 120. As will be shown in the following, there is a means, in accordance with the present invention, to improve the space distribution of droplets and enhance evaporation rate.

Similarly, as depicted in FIG. 28, spraying station spacing 120*a* and lateral conduit spacing 122*a* are much greater than the diameter 150, leading to a non-uniform distribution of spray across inlet 16. The increased spacing and non-uniformity may be produced on purpose in order to delay coalescence of water droplets under some schemes of electrical charging, as explained below.

Generally, there is clustering of sprayed droplets within spraying station conical spray pattern 152 due to the distribution of droplets in the individual atomizer conical spray patterns 146 (FIG. 26A) and due to positioning of neighboring atomizers 128 in one spraying station 120 (e.g., FIG. 19–20). This clustering effect significantly reduces the rate of evaporation. This problem can be solved by electrically charging the droplets of water in one spray station 120, making the droplets reject each other and spread very effectively and uniformly through the air space. It is, therefore, very effective to charge the spray which is intended for both the aero-cooling and the hydro-drag effect. This charging can also become very useful later when there is need to collect the water droplets in the air at outlet 18, as will be explained later.

Also, FIG. 29 depicts service crane 158 running along two parallel main conduits 124 for servicing lateral conduits 122 or spraying stations 120 and atomizers 128. To provide the least disruption to air flow and to allow work on main conduits 124, the support ends 158*a* of crane 158 are provided with hydrodynamic streamlined cover 160 and tail 162. Service crane 158 may have a lifting device, a robot or a cell for people to work in, all of which may be movable along the length of the crane. If the distance between main conduits 124 changes, then crane 158 can easily be designed to allow variable distance between support ends 158*a*. Support ends 158*a* may comprise wheels, ball bearings or other equivalent systems.

An alternative structure for the spray system 20 is illustrated in FIG. 30, where the water is distributed to spraying stations 120 through radial mains 154 and partial radial mains 156 connected to perimeter conduit 126.

Power System

FIG. 31 is a schematic illustration of the preferred power system 164, comprising turbine array 24 connected to generators 166 for converting the mechanical energy of the downdraft of air and water within duct 14 into electrical energy that is supplied to power grid 170. Power modification devices 168 may also be required to convert the generated electricity into a useable form. Part of the generated energy may be diverted back to the water supply system, for example, to power high head pumping stations 96 and motors 171 to aid in the operation of tower 10.

Referring to FIG. 32, individual turbines 172 are preferably directly connected to pumping stations 96 to increase the efficiency and reduce the cost of tower 10. In this case, a turbine 172 is mechanically connected to a pump 96. This connection can also be made between a number of turbines and a number of pumps. Some pumps may need to be connected in series and in parallel in order to adjust the heads and rates of water supply under varying levels of power (not shown). In the base line design, it was found that 330 MW out of the 435 MW, about 75% of the installed pumping power could be provided through direct mechanical connections between some turbines and pumps. The pumps not directly connected to turbines should be hooked up to motors 171 and the general power grid 170 to provide for starting-up and regulating tower 10.

By providing this direct connection between some turbines and pumps, a 6% reduction in overall energy losses was attained. Further, this resulted in nearly a 20% reduction in the investment cost for the whole project. This 20% reduction results from eliminating the need for generators, motors and transmissions, which account for about half of the investment normally needed for the power and pumping aggregates.

The above, of course, is only an example. The principle, in general, is to directly connect some of the high head pumps 96 to some turbines 172 by mechanical axis and transmission, to have some of the pumps powered by motors 171 connected to power grid 170, and to make it possible to connect some pumps in parallel and in series, or to disconnect them, to maximize the performance of this preferred embodiment under conditions of variable output.

FIG. 1 is an illustration of preferred turbine array 24, comprising a plurality of preferably shrouded axial-flow turbines 66 aligned horizontally, located proximate diffuser region 64 at the lowest point of air flow within duct 14 in order to maximize the energy generated by the hydro-drag effect. Since the energy of the hydro-drag effect is a function of effective height 90, turbine array 24 should be located below the elevation of the top of diffuser region 64 so as to not reduce the effective height of tower 10.

FIG. 2 depicts, with broken lines, a number of turbine frames 66*a* within turbine array 24. One example of the rolled out turbine array 24 is depicted in FIG. 33, where each turbine aperture 178 is contained within the height 180 and width 182 of each turbine frame 66*a*. As illustrated in FIGS.

34 and 35, turbine array 24 may comprise two or more levels of turbines. FIG. 34 depicts a stacked two level embodiment of turbine array 24, while FIG. 35 shows a hexagonal two level embodiment of the turbine array.

Figure 36:
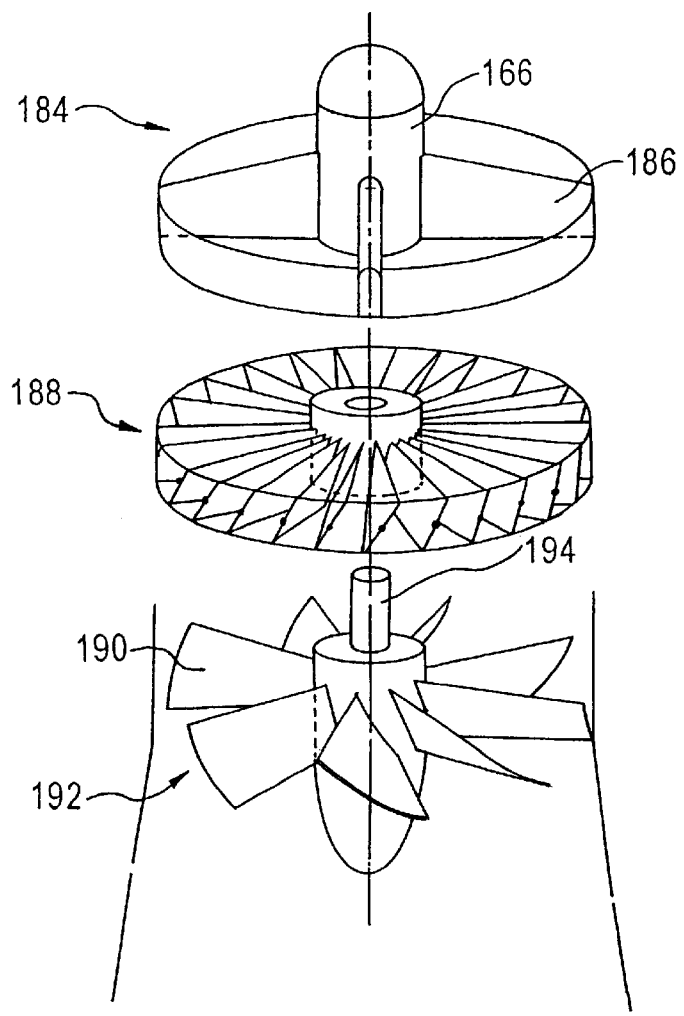
FIG. 36 is an illustration of an exploded perspective view of an axial flow turbine in the vertical orientation.

The preferred shrouded axial-flow turbine 172a is depicted in FIG. 36, comprising an upstream hydrodynamic cover 184, with attached radial stators 186, that houses generator 166 and transmission gear. The downdraft of the air/water mixture is given a tangential component or whirl by guide vanes 188. This whirl is taken out by blades 190 of runner 192, causing the runner to rotate which turns turbine shaft 194 and powers generator 166. To increase the efficiency of axial-flow turbine 66, blades 190 and/or guide vanes 188 preferably have adjustable pitch to accommodate a variety of flow rates.

Another advantageous use of adjustable guide vanes 188 is that they can be rotated to shroud axial-flow turbines 66 for closure and for maintenance. It was unexpectedly found that closure of a selected number of turbines 66 resulted in no reduction of total power, as the turbines that remained open were able to compensate by generating more power. In order for this to work, however, side partitions 70 of diffusion chamber 68 may not extend too far into the interior of duct 14, preventing the downdraft from circulating to an open turbine 66. This discovery is especially useful in a situation of an outside wind 36 with a high velocity, where the vertical velocity components within duct 14 on the side of tower 10 upstream of the wind are minimal compared to the downstream velocities, and the inefficient use of the turbines 66 upstream can be minimized. Thus, it is possible to run the turbine array 24 closer to a fixed set of operating conditions.

Also, adjustable guide vanes 188 may be helpful in starting up the power plant. In the preferred embodiment, it may be necessary to change the angle of vanes 188 to completely block outlet 18 (FIG. 1) to ensure a downdraft of fluid when starting the plant. As the downdraft of fluid approaches the bottom of tower 10, then vanes 188 can be opened to allow the fluid to power turbine array 24 and exit the tower.

Further, to improve efficiency over a wide range of operating conditions at a low velocity, turbines 66 having two speed axial-flow were found to give the best overall results. Three speed turbines may further improve the overall efficiency, but may not warrant the extra investment. Similarly, two speed turbines allow optimal efficiency over a wider range of operational parameters compared to one speed turbines. Also, variable speed turbines are not as economical because they produce variable frequency electrical signals, requiring conditioning of the produced power before being utilized by power grid 170. This extra conditioning is an added installation cost and further involves an energy loss. Thus, turbines 66 having two speed axial-flow are the most cost effective alternative.

A preferred feature of the present invention is to connect selected individual turbines 66 to a motor so that the selected turbines can be activated to start the downdraft of air within duct 14, rather than relying on the spraying of water to start the downdraft. This feature is important in situations where outside wind 36 has a high velocity, which may cause the water spray at inlet 16 to drift, thus delaying the start of the downdraft.

By computational analysis, it has been discovered that the optimum power can be obtained when the total apertured area of all the turbines is between 60–80% of the cross sectional duct area.

Droplet Collection

The downdraft of fluid within duct 14 contains solutes, primarily brine, in the unevaporated water droplets. In order to reduce pollution of the environment, these droplets need to be collected, preferably before the fluid exits duct 14. Some of the unevaporated droplets will naturally fall to the bottom of duct 14, where the droplets can be directed into collection reservoir 220. Other unevaporated droplets, however, will remain in the fluid that flows radially away from tower 10 out diffuser region 64. These unevaporated droplets eventually fall to the ground outside duct 14 in an area downstream from diffuser region 64.

The length of flight of a droplet depends on the velocity and height of the droplet as it exits diffuser region 64, as well as the droplet diameter. Smaller diameter droplets will tend to drift further from tower 10. Moreover, turbulence will tend to disperse the smaller droplets to higher elevations. Thus, under certain average wind conditions there is a predetermined or installed precipitation area 196 (FIGS. 1 and 2), typically centered about tower 10 where the unevaporated water droplets will naturally fall, increasing the solute concentration within the soil and ground water. Taking into account a prevailing wind 36, the precipitation area 196 may turn into an ellipsoid shape with the tower 10 standing not at the center.

The precipitation area 196 can be computed if the following are known: (a) the amount of droplets in the fluid flowing from outlet 18 and the droplets size distribution; (b) the outermost diffusion chamber height 78 (FIG. 12); and (c) the permissible rate of salt precipitation outside the border of the precipitation area. As a result of turbulence, there is also an element of probability involved in computing the precipitation patterns. It is more significant for finer droplets, as fine enough droplets will not precipitate at all within short distances.

For example, a tower 10 having a 1000 meter effective height 90 and a 500 meter diameter duct 14 will produce, under the climatic conditions of the Arava Valley, north of the Gulf of Aqaba, more than 4 billion kWh per year. The quantity of water required is around 600 million cubic meters per year. Given the limitation that salt precipitation outside precipitation area 196 must be less than salt precipitation 10 to 15 km away from the Mediterranean Sea and using a certain atomizer with a certain droplet diameter distribution and a rate of spray, the precipitation area 196 was estimated to be 3.2 km in diameter. This estimate, of course, assumes an average air speed and diffuser height. If the solutes in the outflowing fluid are allowed to crystallize, literally mountains of salt will be formed in precipitation area 196. Using the above example and remembering that the initial salt concentration in the Gulf of Aqaba is about 4%, the total salt transferred through the tower is in the order of 24 million tons/year.

This invention, however, is fundamentally embodied to prevent the possibility of the solutes crystallizing through the combination of the aero-cooling and hydro-drag effects. The proper spray distribution, as described above, and the methods described below ensure that substantially all or most of the salt load is disposed of in a liquid brine form, and within a predesigned precipitation area 196.

There are several possible rules about limiting the precipitation area 196. One is that beyond this area, the intensity of the precipitation per unit area per unit time will not exceed a certain environmental demand. A self-imposed example of this type of limit, as mentioned above, is to ensure less salt precipitation than exists in Israel ten kilometers east of the Mediterranean Sea, which constitutes less than $10^{-9}$ kg salt per square meter per second. This amounts to less than 300 Kg salt per hectare per year, which is an order of magnitude less than the amount of solutes delivered to a field by common irrigation water. A second possible limit, where the environmental demand is less stringent, is to sufficiently recover large parts of the unevaporated water droplets in order to recover the brine for some useful purpose.

In order to increase the efficiency of tower 10, reduce precipitation area 196 and reduce environmental concerns about salinity, it is important to collect the unevaporated water droplets from the outgoing fluid as soon as possible after the maximum energy is gained from the downdraft. The efficiency can be increased by utilizing the head of the collected water droplets created by the difference in elevation between them and the disposal area, as discussed above. The precipitation area 196 can be decreased by reducing the amount of water droplets in the fluid expelled from diffuser region 64, with special attention to eliminating the smaller diameter droplets because they fly the farthest and are the hardest to precipitate.

Also, collecting the water droplets insures that the solutes remain in solution, allowing easier collection and transfer of the solutes which eases environmental concerns and improves the overall economy of tower 10. Further, the net energy may be increased slightly by removing the water droplets from the fluid before they exit diffuser region 64 because this will increase the pressure differential between the air inside and outside of duct 14.

Figure 23:
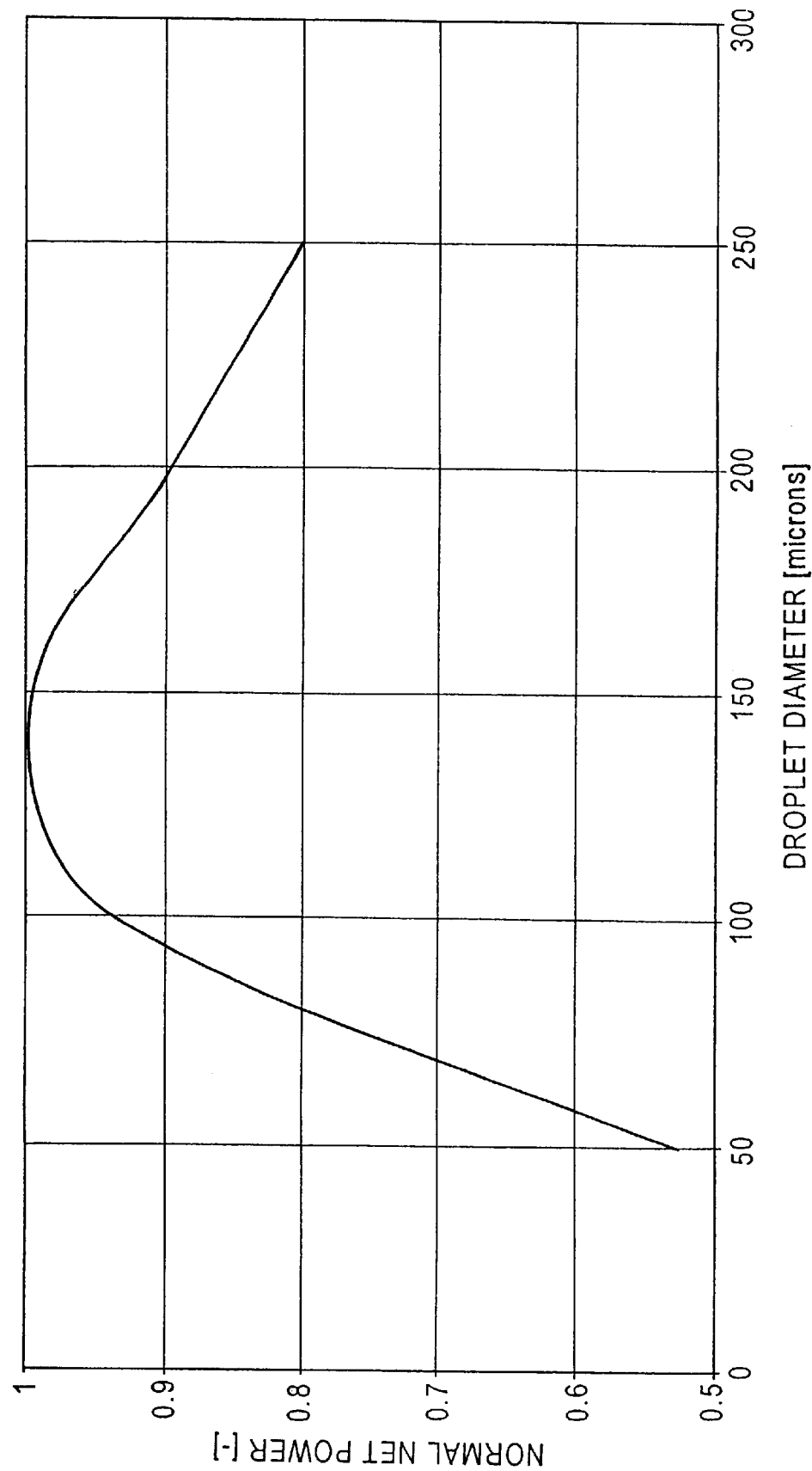
FIG. 23 is a graph of net power for a spray of various droplet diameters.
Figure 24:
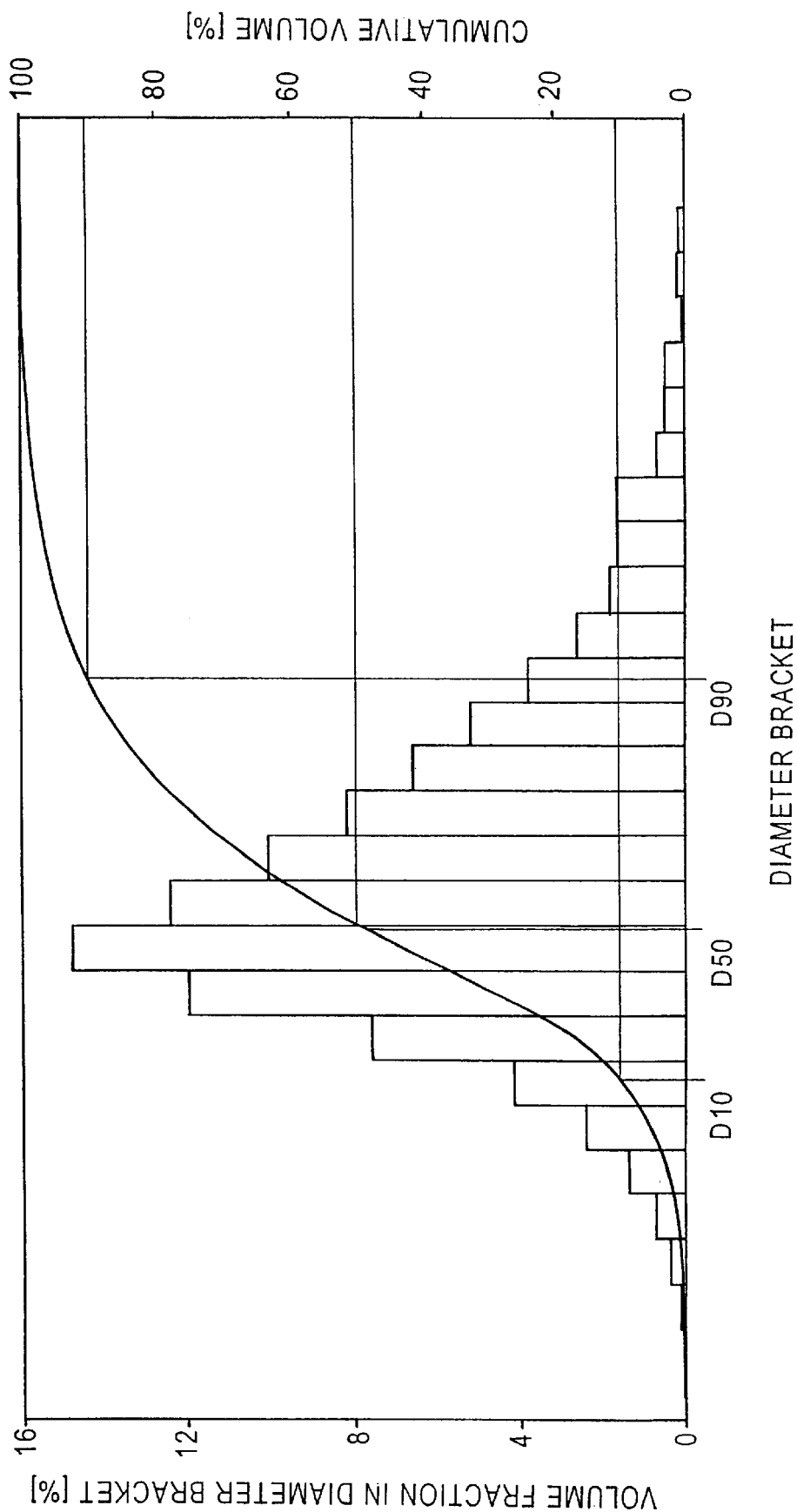
FIG. 24 is a graph of the volume distribution of sprayed droplet diameters.
Figure 25:
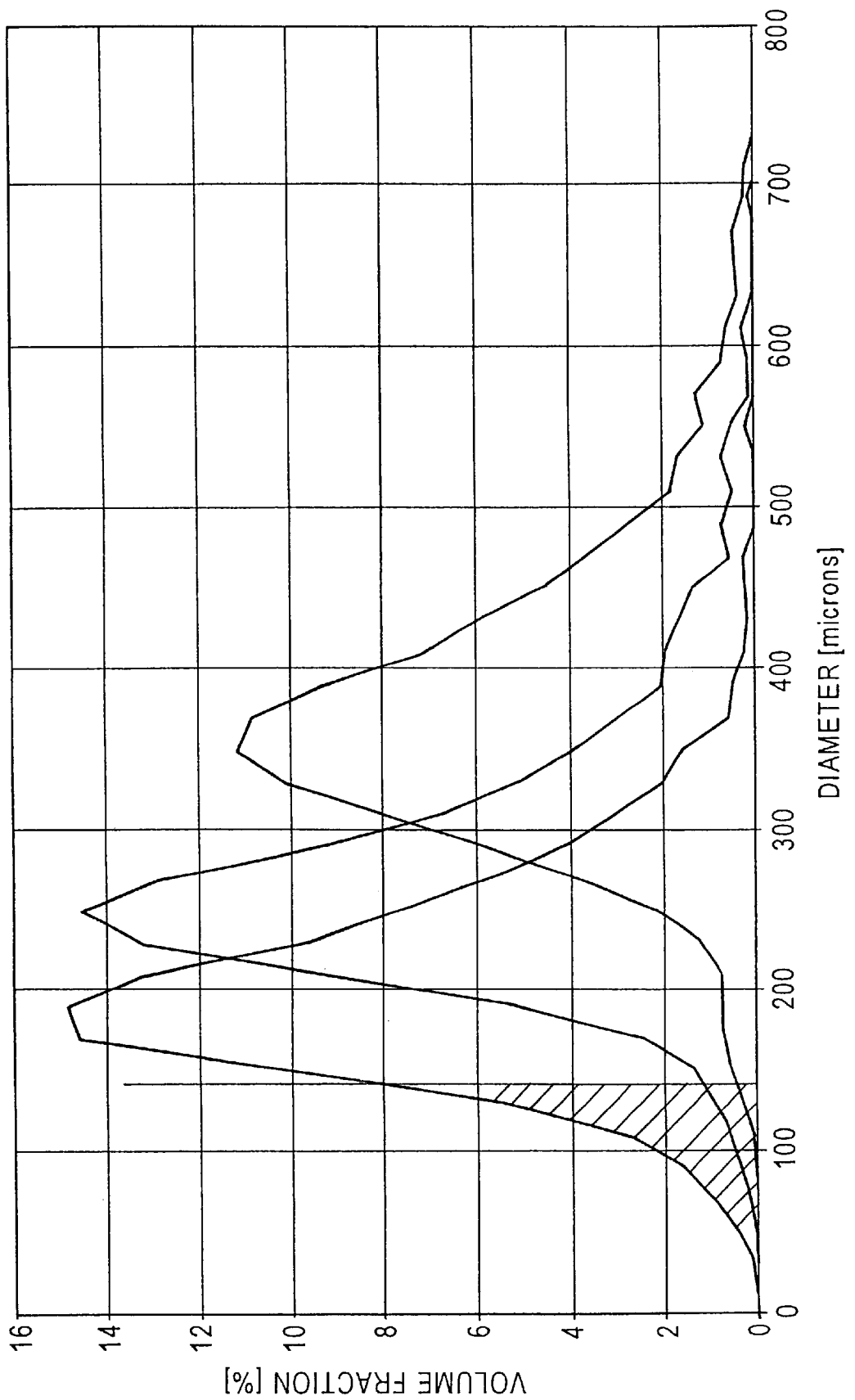
FIG. 25 is a graph of the bell-shaped distribution water spray for 3 different average diameters.

The precipitation area 196 can be reduced by reducing the amount of droplets having small diameters. One way to accomplish this is by increasing the average diameter of the sprayed droplets to above 250 microns, as explained above. Increasing the average droplet diameter shifts the bell-shaped distribution of droplet diameters (see FIG. 25) so as to reduce the amount of droplets having small diameters. One drawback, however, is that increasing the average droplet diameter reduces the net deliverable power as illustrated in FIG. 23.

An alternative or complementary approach is to reduce the spread of the distribution, or relative span as discussed above, of the sprayed droplet diameters. An advantage of this approach is that the evaporation rate and net power will not change since the average droplet diameter can be maintained while reducing the smaller diameter droplets that require a larger precipitation area 196. Preferably, rotary atomizers having a relative span (RS) of droplet diameters less than 1 are used.

Rather than increasing the diameter of the droplets initially by spraying large droplets, the average droplet diameter can be increased sometime after the water has been sprayed. For example, a collection system, proximate spraying system 20, can be utilized whereby wind currents (e.g., vertical wind) within the tower blow the smaller diameter droplets into gutters 139 (e.g., schematically depicted in FIG. 26A) that accumulate these droplets and release them through openings 139a as larger droplets. The initially sprayed larger diameter droplets fly over the gutter because their larger mass is not affected by these currents.

Another preferred embodiment increases droplet diameter after spraying by colliding two droplets and forming one larger droplet. If, as required by the present invention, the air flow is mostly vertical and there is a sufficient abundance of larger droplets in the spray, then there is a series of successful droplet collisions in the flight down. The larger diameter droplets fly down duct 14 faster than the smaller droplets, colliding and coalescing along the way. In the downward flight, the larger droplet sweeps an increasingly larger diameter cylindrical volume with each successive collision. The effective sweeping diameter of the droplet equals the sum of the diameters of the larger droplet and the coalesced smaller droplets. Thus, a fundamental feature of this invention, with care taken to prevent the collection of droplets on duct inside surface 58, leads to enhanced collisions and coalescence of droplets into larger diameter droplets resulting in a smaller precipitation area 196.

The success rate of two droplets colliding and coalescing is dependent mainly on the size of the two droplets. Even when a smaller droplet is in the collision track of a larger droplet, the smaller droplet may be swept aside because of the air flow around the droplets. Also, there may possibly be some surface tension effects and electrical effects preventing the two droplets from colliding and coalescing. The characteristic efficiency figure is around 0.5.

A preferred feature to increase the average droplet diameter after spraying is by electrically charging the sprayed water droplets. The droplets may be charged in a field of up to about 3000 volts, preferably from about 500 to 3000 volts. Charging the droplets can increase the uniformity of the spray, due to the fact that the droplets repel each other, enhancing the rate of evaporation and hence the aero-cooling effect. Further, charging droplets can promote the interaction of unevaporated water droplets joining together to form larger droplets by attracting uncharged droplets or droplets with an opposite charge, thus allowing easier collection.

Figure 37:
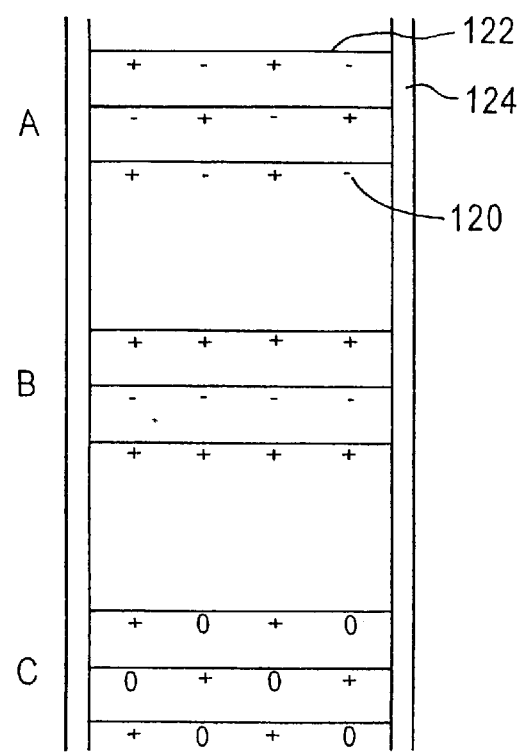
FIG. 37 is an illustration of a partial bottom view of the spray system showing various configurations for charging the spraying stations to enhance the interaction between water droplets.

Generally, the object is to create areas of water droplets having differing electrical charges. For example, FIG. 37 depicts three alternatives in charging the sprayed droplets at each spraying station 120 along lateral conduits 122 connected to main conduits 124. In configuration A, each spraying station 120 is given either a positive or negative charge, with adjacent stations having opposite charges. The resulting area of alternatingly charged droplets has a number of unique advantages. The spray from one spray station spreads laterally due to turbulence and due to the uniform electrical charge. The smaller diameter droplets spread laterally faster and further than the larger diameter droplets, which begin to fall more quickly. The initial effect is an enhanced rate of evaporation and cooling. Further, as the droplets fall down the duct, the smaller diameter droplets of opposite charges coalesce into larger droplets.

To regulate these effects, the voltage can be changed to increase or decrease the charge and thus increase or decrease the attraction between oppositely charged droplets. By changing the charge, the time needed for two droplets to collide and coalesce as well as the effective maximum distance between droplets can be controlled. Thus, it is possible to slow down the rate of collision between oppositely charged droplets so that the main cooling process can effectively take place before the elimination of the small droplets which are the most effective in cooling.

The relationship between droplet diameter and charge makes it most effective to collect small diameter droplets of one charge with larger diameter droplets of the opposite charge. Large diameter droplets also have large charges, proportional to the voltage and the droplet diameter. Thus, one large diameter droplet of one sign can collect many small diameter droplets of the opposite sign.

Another way to regulate the rate of droplet collision and coalescence is to vary the area governed by droplets of a like charge. For example, this can be accomplished by moving the spraying stations further apart, or by giving groups of spraying stations the same charge. Increasing the distance between oppositely charged areas increases the time that it takes two oppositely charged droplets to reach one another. Thus, the balance between an efficient cooling rate and a coalescence rate can be obtained.

FIG. 37, configuration B is an illustration of each spraying station 120 along each lateral conduit 122 having the same charge, while the stations along adjacent lateral conduits are given the opposite charge. Similar to the effect of charging a single spraying station 120, charging the group of stations helps to prevent droplet clustering by initially spreading out the droplets evenly. As the droplets fall, the small diameter droplets of one charge will be attracted to the larger diameter droplets of the opposite charge. Eventually, the larger diameter droplets of opposite charges will be attracted to each other.

Variable charging can further optimize the effect of applying different voltage rates on different parts of the sprayed water. As depicted in FIG. 37, configuration C, the extreme is to have a charge on one group of droplets and no charge on the other group. An attraction is formed between the two groups of droplets due to the dielectric effect and the formation of a dipole in a variable field induced by the charged droplets. The force of attraction is $$F = \frac{q_1^2 K}{b^2} \frac{a^3(a^2 - 2b^2)}{b(b^2 - a^2)^2} \quad (46)$$

where $q_1$=electrical charge in the charged droplet;

K=dielectric coefficient, with a value of $9 \times 10^9$ in the S.I. unit system for a vacuum and approximately the same for air;

a=radius of the uncharged droplets; and b=distance between the center of the charged and uncharged droplets.

The approximate value of F, for cases when b is much greater than a, is roughly $$F = \frac{q_1^2 K}{b^2} M^3 \quad (47)$$

where M=a/b. The charge $q_1$ of the charged droplets is $$q_1 = \frac{rV}{K} \quad (48)$$

where r is the radius of the charged droplet and V is the charging voltage. So, the force of attraction increases when the distance between the charged and uncharged droplets decreases. Also, the attractive force of the larger droplets will be greater than that of the smaller droplets since the charge is proportional to the radius of the droplet and the force is proportional to the square of the charge.

It may also be proven that the energy invested per unit volume of water is inversely proportional to the radius. It can therefore be useful to have spraying system 20 provide droplets with no charge at all, referred to as the main spray, and a small volume of spray of charged larger diameter droplets, referred to as the collecting spray, used to collect the main spray droplets. The efficiency of collecting the uncharged droplets by the charged droplets is not very high, except when they are within a very close proximity, where M becomes not very small. This collection efficiency, however, is much higher than situations where no charge is used or when all of the droplets have the same charge sign. Further, a considerable improvement is obtained by using charges of the opposite sign.

A slight charge of the opposite sign $q_2$ on the main spray further extends the collection radius of the collecting spray. The attractive force between the droplets changes to $$F = \frac{q_1^2 K}{b^2} \left( M^3 + \frac{q_2}{q_1} \right) \quad (49)$$

The second ratio in the parenthesis can be measured in tenths or hundredths if the main spray droplets have ⅒th the size of the larger diameter droplets and the voltage to produce the charge in the main spray droplets is also ⅒th of that used in the larger droplets (by introducing Equation 48 into Equation 49). In comparison, the first ratio $M^3$ in the parenthesis is much smaller as long as the distance between the main spray droplets and the larger droplets is large. Thus, the collection efficiency is increased when oppositely charged droplets are used, since $q_2/q_1$ can be tens and hundreds of times larger than $M^3$, (comparing F in Equation 49 with F in Equation 47).

Figure 22:
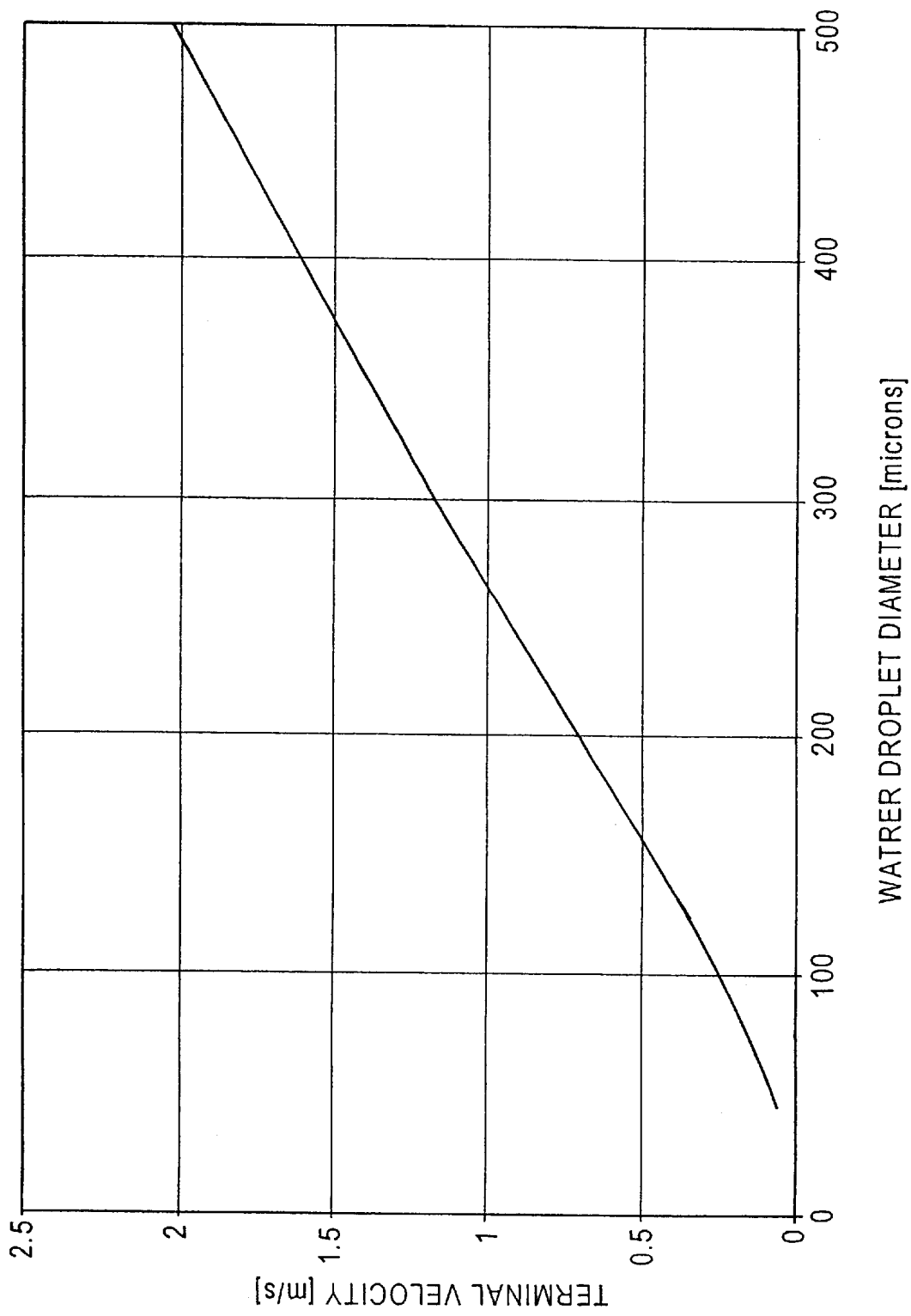
FIG. 22 is a graph of terminal velocity for water droplets of differing diameter.

Based on the above analysis, the charged larger droplets used to collect the other droplets should preferably be in excess of 300 microns in diameter to have a reasonable terminal velocity (FIG. 22) more than 1 m/sec relative to the air and the capability to obtain a large enough charge and a low enough energy investment per unit water volume.

Through testing, it was found that the distance over which a large droplet can attract and coalesce with an oppositely charged small droplet roughly increases with the square of the voltage used to induce the charge in the droplets. It was also found that the largest distance over which droplets can attract and coalesce occurs when the droplets have exactly the same diameter. This is true because droplets of the same diameter fall at the same speed and thus have a longer time to close the distance. In the tests, the droplet collection efficiency was found to increase by two orders of magnitude, from less than one to several tens, when oppositely charged droplets were used. There was a considerably increased efficiency by using negatively charged collecting droplets to collect unchanged smaller droplets. However, the efficiency was larger when the collecting droplets were charged positively. This was expected because atomized water droplets tend to be naturally charged negatively.

The larger diameter droplets can be provided by spraying system 20, or by secondary spray system 140 (FIG. 1). Using spraying system 20 for the hydro-drag effect will also contribute to the collection of small diameter droplets and a respective reduction in precipitation area 196. A preferred arrangement for the collecting spray of larger droplets is at the perimeter of duct 14, adjacent inside surface 58, where the larger droplets will cross all of the fluid flow layers.

Figure 38:
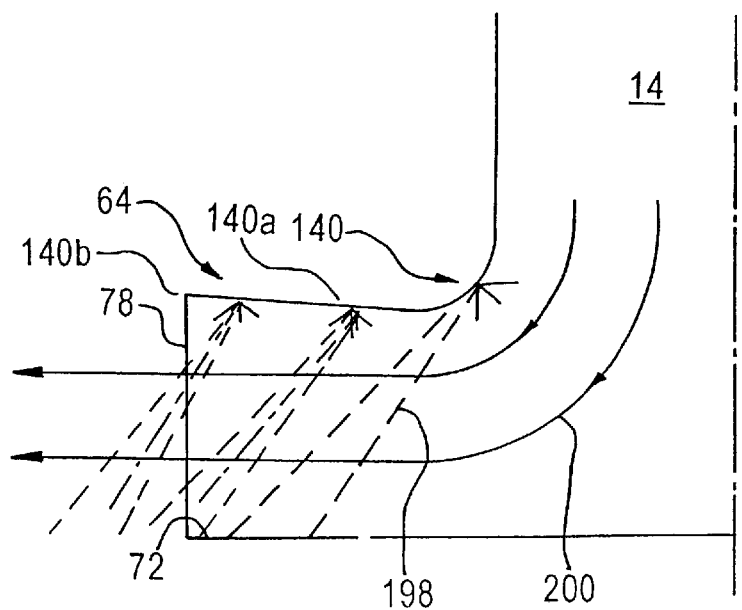
FIG. 38 is a partial sectional side view of the bottom portion of the tower depicting the use of a secondary spray system to collect unevaporated water droplets.

FIG. 38 depicts the preferred secondary spray system 140a located at the perimeter near the bottom of duct 14, adjacent diffuser region 64, where the spray of larger droplets 198 crosses all of the streamlines 200 of the fluid flow. This arrangement advantageously allows the spray of larger droplets to intercept and collide with the entire volume of unevaporated droplets in the fluid, thus enhancing the elimination of smaller diameter droplets. With a horizontal diffuser region 64, the secondary shower may be located also radially outward anywhere along the diffuser.

In the above example, the relation between the flow rate of collecting secondary spray system 140a, $q_c$, for example in cubic meters per unit perimeter per unit time, and the flow rate of the main spraying system 20, $Q_S$, is $$Q_{sf} = Q_{so} \exp{-(aq_c)} \quad (50)$$

where
- $Q_{sf}$=final main spray f low rate, after the collecting secondary spray, in cubic meters per unit perimeter per unit time;
- $Q_{so}$=initial main spray flow rate (same dimensions as $Q_{sf}$); and
- a=a proportionality coefficient that can be estimated by calculation or determined experimentally, having the inverse dimension of $q_c$.

The advantage of this relationship, which is unique to the present invention, is that it takes a certain rate $q_c$ to reduce the main spray rate by an order of magnitude. If that $q_c$ is doubled, then the main spray flow rate is reduced by another order of magnitude. This means that by arithmetically increasing the secondary spray $q_c$, one can exponentially increase the droplets elimination efficiency. This means that the secondary spray $q_c$ of this configuration has a chance to be extremely efficient at a very small cost.

Typical examples show that 20 liters/sec of charged secondary spray with large droplets may effectively flow through the downdraft with 1,000 times the volume of the small droplets, i.e., 20 m³/sec with the opposite sign charge, thereby reducing the number of small droplets by an order of magnitude. A charged secondary spray of 100 liter/sec, 5 times the above spray rate, is expected to reduce the concentration of small droplets of the opposite sign by 5 orders of magnitude. To be on the safe side, it is very easy to increase the secondary spray 4–5 times and reduce the fine droplets of the opposite sign by 4–5 orders of magnitude more.

There is an additional requirement for the charged secondary spray—it needs sufficient charge to affect the collected droplets of the opposite charge. It is possible to choose the most efficient overall system by judiciously choosing the droplets diameters and the charging voltages of the droplets in the main and secondary sprays.

The secondary spray total rate will typically be smaller than the main spray by at least an order of magnitude and possibly two. Thus, in order to reduce the amount of the secondary spray that needs to be collected outside the tower, the secondary spray may comprise fresh or desalinated water or may be provided by atomizers with extremely narrow relative diameter spans.

Further improvement of the collection efficiency may be obtained by having two consecutive secondary sprays, such as 140a and 140b in FIG. 38. To improve collection efficiency, secondary sprays 140a,140b could be charged oppositely.

The horizontal diffuser region 64, depicted in FIG. 38, also enhances the collection of the unevaporated water droplets as some of the heavier droplets will fall to the floors 72 before exiting the tower. Arrangements are then made to effectively gather these droplets into collection reservoir 220. In order to facilitate the collection of these droplets, the horizontal length 74a (FIG. 12) of diffuser region 64 can be several times the height of the flowing layer of fluid (equivalent to diffusion chamber height 78). Measured in terms of duct diameter 38, the preferred horizontal length 74a of diffuser region 64 is greater than half the duct diameter 38 (FIG. 1).

Reducing the height 78 (FIG. 12) will also lead to a reduction in precipitation area 196. The horizontal flight of an unevaporated water droplet is proportional to the height of the droplet as it exits diffuser region 64. Thus, by reducing height 78, precipitation area 196 will be reduced. By having a two tier turbine array 24, as in FIG. 34, the innermost diffusion chamber height 78 is divided in two. Thus, the droplets precipitation within the diffusion chambers 68 is greatly enhanced.

Another feature for collection of unevaporated droplets is the preparation of precipitation area 196 to facilitate drainage and accumulation of the briny droplets. The ground in precipitation area 196 (FIG. 39) should be properly sloped to drain the precipitated droplets toward collection canals and from there into collection operational reservoir 220 for accumulating the brine. The surface 204 of the ground and the parts of diffuser region 64 that drain the brine must be reasonably water tight to prevent loss of brine and pollution of the ground water. Further, the ground surface 204 should enhance the horizontal component of the brine flow by being smooth and impermeable or strongly layered.

FIG. 39 depicts one embodiment of a preferred precipitation area 196 surface preparation, which combines layering soils and impermeable membranes. Parallel impermeable membrane strips 202, made of polyethylene film or an equivalent material, are placed under the ground parallel to the surface 204 and sealed at adjacent edges 202a forming seam 206. The sealing may be accomplished by any conventional method, such as welding, gluing or overlapping. Thus, the individual strips 202 join into a continuous first membrane layer 208.

A first soil layer 210, preferably comprising a substantially impermeable soil, is then placed above first membrane layer 208 and compacted. Then a continuous second membrane layer 212, similar to first membrane layer 208, is placed on top of first soil layer 210. The strips 202 of second membrane layer 212 should be parallel, but translated by half of width 216, to the strips of first membrane layer 208. Thus, seams 206 of second membrane layer 212 will run midway between two seams of first membrane layer 208.

Second soil layer 214, preferably comprising a substantially impermeable soil, is then placed above second membrane layer 212 and compacted. Finally, surface 204 may be treated to reduce the absorption of water droplets. However, this is not essential.

This double membrane/soil layering method reduces the cumulative affect of any possible leak by orders of magnitude compared with a single membrane/soil layering method. Further, even if seams 206 are open, i.e., only overlapping or placed adjacently, the permeability of ground prepared in this manner is inversely proportional to the squared width 216 of membrane strips 202. Thus, preparation of precipitation area 196 in this manner provides high reliability against permeation and facilitates the collection of unevaporated droplets.

Using the above ground preparation, the rate of leakage is approximately proportional to the water head of standing water above the second membrane layer 212 and is at most 2 or 3 decimeters. The rate of leakage is also proportional to the vertical spacing between the two membrane layers 212 and 208, also about a maximum of 2 decimeters. Additionally, leakage is proportional to the hydraulic conductivity K of the interlayer material (m/sec) and inversely proportional to half the width squared $(B/2)^2$ where B is width 216 (FIG. 39). If B is 10 m, for example, then the average leakage of the liquid will be of the following order of magnitude:

$$\frac{0.2 \times 0.2 \times 4}{100} K = (16 \times 10^{-4}) K \qquad (51)$$

If, for example, K is $10^{-6}$ m/sec or about 0.1 m/day, then the average rate of leakage would be in the order of $1.6 \times 10^{-4}$ m/day or 0.16 mm/day, assuming overlapping, unsealed seams. This average leakage rate equals 160 m$^3$/day/km$^2$. Without the suggested arrangement the leakage would be in the order of K, or almost 3 orders of magnitude higher. With closed or sealed seams, such as from welding or gluing, the leakage theoretically vanishes. Further, the double-layered lining provides a very high reliability against accidental punctures.

It will be appreciated by one skilled in the art that this is just one embodiment of a preferred precipitation area 196 surface preparation, and that other configurations involving a plurality of combinations of membrane/soil layers may be utilized and are intended to be within the scope of the present invention.

Precipitation area 196 may also comprise a spraying system for washing off any solutes that may have crystallized after falling to the ground. The runoff from this spray is directed into collection reservoir 220. Thus, accumulations of solutes, especially salt, can be avoided.

A further feature that will reduce precipitation area 196 and aid in unevaporated droplet collection is providing a surface on runner blades 190, stator and/or guide vanes that attracts and accumulates the droplets. For example, blades 190 can be provided with a conductive surface, such as by plating or coating with a metal like titanium or aluminum. Blades 190 are then either grounded electrically or charged, depending on the type of spray, so as to attract and collect the unevaporated water droplets.

Alternately, blades 190 may be provided with a insulating surface, preferably of a high dielectric constant and high resistance to electrical discharge.

Similarly, the surface of guide vanes 188 may also be treated as described above to aid in the collection of unevaporated water droplets.

Brine Disposal

A unique feature of the present invention is to utilize sea water or brackish water to produce energy and desalinated water (described more fully below) until a very concentrated solution, or brine, is produced. This feature reduces the disposal costs associated with the brine because the high concentration of the brine reduces the volume. One technique to dispose of the brine is to add it to a large source of water where the addition of the brine will have a low environmental impact. Such water sources would be large, deep bodies of water or water that has a similar brine concentration.

The brine concentration in a large body of sea water that is very deep will gradually increase with depth until it often becomes a heavy brine. The brine from the present invention can be introduced into the water source where it will sink to the bottom, or to a depth of similar concentration, with very little mixing. The mixing can be reduced by introducing a low velocity flow of the brine from the invention into the water through a closed conduit to a depth having a similar brine concentration.

One example of a preferred disposal site is the Gulf of Aqaba. In this semi-enclosed sea, there is a very high inflow near the surface of fresh sea water from the Red Sea. The inflow is estimated to be 40,000 m$^3$/sec. To compensate for this inflow, there is some kind of underwater spillway about 200 meters below the surface where an equivalent amount of water flows out. There are two such daily marine tides. This flow recycles the sea water from the surface to a depth of about 200–300 meters.

Below the recycled layer of sea water is a large body of water down to a depth of about 1200 meters. The sea water at the lower depths becomes a heavy brine. The brine from the present invention, having a density of about 1.08–1.12 tons m$^3$, can be directed into the Gulf where the density at the surface is close to 1.04 tons/m$^3$. The brine from the tower 10 will sink below the recycled layer of 300 meters. Under normal operating conditions, it will annually add a 0.15 meter thick layer of brine spread evenly from coast to coast of the Gulf. This equates to about 300 million cubic meters of brine from tower 10 spread out over an area of approximately 2000 square kilometers.

If the brine sinks all the way to the bottom of the Gulf, it will take more than 3000 years for it to be built up enough to reach the depth of the recycling sea water. Every year, however, a layer of sea water from below the recycled layer will be pushed up 0.15 meters into the recycled layer. The calculated average flow rate of the 0.15 meter layer of higher density sea water returning to the Red Sea is 10 m$^3$/sec. This higher density water will be mixed with the 40,000 m$^3$/sec lower density water that flows periodically in and out. The dilution ratio is $\frac{1}{4000}$ and the added concentration of any pollutant is hardly measurable and well below changes in the concentration of salts, nutrients and other pollutants otherwise found in the sea due to natural processes. Thus, the concentrated brine from the present invention can be disposed by adding it to a water source having a similar density with a low environmental impact.

A further unique advantage of the present invention is that the concentrated brine can be used as a carrier for different solutions, existing desalination plants, fish ponds, etc., that are otherwise harmful when poured directly into the sea and mixed in the surface water. For example, intensive fish ponds in aquaculture produce nutrients, mainly nitrogen and phosphor, that would directly affect the flora and fauna in the Gulf of Aqaba. In the case of combining the present invention with aquaculture, the nutrients from intensive fish ponds can be carried by the concentrated brine from tower 10 to a depth that will allow the nutrients to be eventually diluted with a very low environmental impact. Thus, the present invention reduces the disposal costs associated with aquaculture.

Another example of this disposal technique would be when sewage which has gone through a primary treatment, is used as a water source for tower 10. In this case, the sewage would be sprayed in tower 10 and recycled until the density of the solution is greater than that of the body of water where the solution will be disposed. The concentrated sewage would then be introduced into the body of water, sinking to the bottom of the water or a depth of similar density. Then, the concentrated sewage would over time gradually mix with the water and dilute to an environmentally safe level.

Desalination System

Referring to FIG. 4 of the preferred embodiment, the present invention provides for the unusual opportunity to desalinate water at a highly reduced cost by integrating desalinizing plant 30 into the reservoirs 100, 102, the pumping stations 94, 96 and the conduits 104 of the water supply system and the brine return conduit 224 that comes off the operational reservoir 220. The present invention requires a fraction of the investment of a typical desalination plant. Further, it is possible to desalinate one cubic meter of water from sea water using 3 kWh or less, which is a fraction of the energy used by a typical desalination plant. Compare this with common reverse osmosis desalination, which requires 4.5 kWh to obtain one cubic meter of water.

It takes about 600 million m$^3$ of sprayed water to produce $4 \times 10^9$ kWh in a 500 m diameter×1,000 m high tower, or about 6.7 kWh/m$^3$ sprayed. Using a discharge coefficient (R) of about 1.5 (FIG. 41), as in the present invention, then about 6.7×1.5=10.05 kWh/m$^3$ of net energy is produced per m$^3$ of water evaporated. If according to the present invention 3 kWh is needed for producing 1 m$^3$ desalinated water from sea water, then in theory the tower can produce 6.7÷4.5=1.5 m$^3$ or more of desalinated water for each cubic meter of sea water sprayed, as will be explained below.

If a source of desalinated water is available, then it can be used in the present invention by spraying it and recycling it until it is all evaporated. In this situation, with 10 kWh or more produced per spent cubic meter of desalinated water, about 2.5 or more cubic meters of extra desalinated water can be processed from sea water. Thus, using desalinated water as a source produces a net excess gain of 4.5 cubic meters of desalinated water for every 1 cubic meter sprayed, all without having a salt problem. Economically, however, it may be preferred to operate tower 10 using sea water or brackish water and to use the desalinated water elsewhere. Desalinizing plant 30 may utilize any desalinizing method, but preferably comprises a reverse osmosis desalinizing plant.

Two of the major costs of any method of desalination are importing to the plant the raw water to be desalinated and disposing of the end brine after desalination. The present invention advantageously reduces or eliminates these expenses because a large supply of raw water is required to drive the hydro/aero effects. Also, the end brine coming out of the desalinizing plant 30 can be further used by tower 10, as explained below, thereby reducing the required amount of water to be supplied and also reducing or eliminating the volume of the end brine contributed by desalinizing plant 30.

There are a number of alternatives that can be used independently or in combination for integrating desalinizing plant 30 into the system and further reducing the investment as well as the energy outlay. As generally depicted in FIG. 4, desalinizing plant 30 can branch off of the water supply system directly from water source 92, before or after low level operational reservoir 100, or from high level operational reservoir 102. Thus, integrating desalinizing plant 30 into tower 10 is very cost effective since a very large part of the required desalinating equipment is already in place for the water supply system.

For example, one of the parallel water supply conduits 104 (as discussed above) from water source 92 may bypass low level operational reservoir 100 and pass through pretreatment plant 218 and high head pumping station 96d to boost the water pressure to enable the reverse osmosis process in desalinizing plant 30. The function of pretreatment plant 218 is to filter the raw water to a very high cleanliness level, often using flocculants, precipitation containers and sand filters followed by micro-filtering. Also, at least part of this filtering is needed for spray system 20 in tower 10. There is often also an adjustment of pH and addition of some bacteriostatic materials. The pretreatment should probably be done at low head and also involve free surface water containers. Therefore, pretreatment plants 218 are preferably before the high head pumps 96 or at high topographic elevations at about the same level as a high elevation operational reservoir 102, if it exists (i.e., 218h in FIG. 4).

Alternatively, the head of the water in high level operational reservoir 102 can be advantageously used to drive the reverse osmosis process by supply desalinizing plant 30 with water from this elevated reservoir. Referring again to FIG. 4, pretreatment plant 218h is installed below high level operational reservoir 102 and fed by gravity. The required pressure to drive the reverse osmosis process can then also be obtained by gravity by locating desalinizing plant 30 at an elevation near the base of tower 10. Thus, the built-in feature of a high level operational reservoir 102 further improves the utility and economy of tower 10 by driving the reverse osmosis process of desalinizing plant 30 continuously while the high head pumping can be performed intermittently at times when the power is cheap. This lower cost energy for pumping is also true for low level operational reservoir 100.

The desalinating process of reverse osmosis is preferred because, compared to other known desalination processes, it can be effectively and efficiently used in combination with the present invention. Desalination by reverse osmosis is obtained by pressurizing the water to be desalinated into special canisters that contain a large area of semi-permeable membranes. Desalinated water diffuses out through the membranes from the high pressure side to the low pressure side, while a concentrated brine solution remains behind at a high pressure. Typically, in regular reverse osmosis plants, the energy of the highly pressurized end brine is recovered through a turbine or some similar device and then fed directly back to the pumps that pressurize the water to be desalinated. This type of energy recovery, however, is only partial and the losses constitute a significant part of the energy consumed by the reverse osmosis process.

Alternatively, in combination with the present invention, the end brine can be fed to spraying system 20 at the top of duct 14 primarily using the high pressure of the reverse osmosis process. It is possible, however, that a small booster pump 222 (FIG. 4) will be necessary in order to supplement the pressure due to the slight energy losses in the flow of the end brine through the reverse osmosis process. Compared to a typical reverse osmosis process, this combination with the present invention requires less equipment, saving both the need for high pressure pumps and energy recovery turbines. Further, by supplying the water system with the end brine, the volume of water required from the water supply system is also reduced. Thus, both the reverse osmosis process and the present invention are improved by this combination of technologies.

A further synergy between the present invention and desalinizing plant 30 is that the combination provides for the reduction in volume of end brine to be disposed. In the case of sea water desalination, reverse osmosis desalinizing plant 30 typically produces 60% end brine and 40% permeate or desalinated water. Using different membranes and combining the reverse osmosis and the hydro/aero power plant of this invention may lead to somewhat different proportions as an optimum. In a stand-along desalinizing plant, the 60% end brine is under a high pressure which should not be wasted. This not only calls for expensive energy recovery equipment, but requires eventual disposal to a proper disposal site. This constitutes a costly element and very often poses a problem which is difficult to solve because of conflict with other land uses and environmental problems.

By spraying the end brine into the top inlet 16 of duct 14 according to the present invention, the energy invested in the brine is fully recovered and the investment in energy recovery equipment is avoided. In addition to these advantages, the volume of the end brine is reduced because of the evaporation through spraying it in duct 14. As a first approximation, there is no brine to be disposed of because the end brine from the desalination is fully used. More accurately, there will be a very negligible addition to the brine to be disposed of from the tower because the cooling efficiency of the brine extracted from desalinizing plant 30 is slightly inferior to fresh sea water. In a specific example, a stand-along reverse osmosis desalinizing plant costs 85–90 U.S. cents per cubic meter in a combined desalinizing plant reverse osmosis incorporated into the power plant in accordance with the present invention, the cost reduces to 50 U.S. cents/m$^3$. The relative savings increase when the alterative is to build stand-alone desalinizing plants in small stages. A more general analysis, based on a plant near Eilat, Israel, indicates that the investment saved in the water supply, brine disposal, high pressure pumps, recovery turbines, filtering and operational reservoir exceeds 50% of a stand-alone reverse osmosis plant. Additionally, the energy savings is over 33%.

Another synergy between tower 10 and desalinizing plant 30 is in optimizing the design of the desalinizing plant. The optimal design of the preferred reverse osmosis method takes into consideration a compromise between the cost of equipment and the cost of energy. As mentioned above, a typical rate of producing desalinated water is 40% for sea water, and increasing this rate would mean, among other things, a higher pressure in order to overcome a higher osmotic pressure. This, in turn, would increase the cost of equipment but reduce the amount of end brine which constitutes a large part of the energy expenditure.

However, a reduction in the rate of desalinated water produced seems to be an energy savings because of the lower pressure required. But this requires a larger volume of water and produces more end brine, which increases the costs in total energy, pretreatment, and several other cost components.

On the other hand, a unique feature of combining reduced rates of desalination with the present invention is that the increase in end brine volume does not constitute a significant extra expense in investment or energy because the end brine is used in the normal operation of the tower 10. Further, a lower pressure in the reverse osmosis process considerably reduces the energy expenditure on the desalinated water and also extends the life of the semi-permeable membranes. There is a slight offset in the cost of pre-treating the larger volume of water, but there is an overall gain. Thus, the optimum design point of a desalinizing plant in combination with tower 10 is actually moving toward lower pressures and lower proportions of desalinated water production, which results in an overall savings compared to a typical reverse osmosis plant.

It is possible that there will be several water sources 92, each of a different solute concentration or quality, to be desalinized. The preferred embodiment in such a case is to have parallel water supply conduits 104 and desalinizing plants 30, one for each water source 92. One reason for this, for example, is that the desalinization of brackish water, which has about 5,000 PPM, requires a relatively low pressure compared to sea water, which has about 40,000 PPM. Also, these parallel desalinizing lines may lead to spraying system 20 being supplied with water of different qualities, depending on the supply source. Further, the parallel lines may supply spraying system 20 with different quality water for different regions of the cross-section of duct 14. This may also lead to the collection of the unevaporated droplets in parallel sectors in an effort to obtain water of different qualities at different parts of the system.

A mixture of water sources 92, where each source has different qualities, fed into desalinizing plant 30 is possible. With the given technology, however, it is less costly to desalinate each water source separately. Further, supplying a mixture of water sources 92 to spraying system 20 typically results in an inferior aero-cooling effect compared to spraying separate water sources in parallel. The cost of the installation, however, may call for a mixture of water sources 92.

Another advantageous feature of providing desalinizing plant 30 in combination with tower 10 is that the desalinizing plant does not need to be installed initially. Since desalinizing plant 30 uses much of the same equipment as the water supply system, the desalinizing plant can easily be added on at a later date. This possibility is economically attractive because there is little or no need to have a large initial investment in equipment that will not be utilized until later.

In order to be able to start integrating desalinizing plant 30 gradually in the years following the erection of the power plant, parallel pumping stations 96, 98 may be provided that feed the water to inlet 16 and the pumps will be of at least two sizes that will make it possible to adjust the rates of pumping in small increments, depending on the need. If desalinizing plant 30 is fed from high level operational reservoir 102, then the parallel pumping stations 96, 98 will not be necessary for desalination. By designing the water supply system in this manner, a new parallel desalinizing plant 30 of any size can be added at any time.

There is one important penalty for combining the reverse osmosis desalinizing plant 30 with the present invention. This penalty is the reduced vapor pressure of the sprayed water and the slight reduction in the cooling rate. A detailed analytical computation shows that the salinity increases with the extend of desalinization volume. The energy penalty per cubic meter of desalinated water, however, remains constant regardless of the total desalination. In a base line design, it has been proven that the total energy needed per cubic meter desalinates in the combined plane does depend slightly on the product ratio of desalinated water to raw water. It does not depend, however, on the total amount of water desalinated in association with one combined plant. This penalty was shown to be about 0.3 kWh per cubic meter of sea water.

Elimination of Salinity from Irrigation Sources

In accordance with the present invention, a further advantageous feature is that tower 10 can be used to eliminate or considerably reduce one of the worst processes of salinization of water sources which eventually turns irrigation land into desert or waste land. This process usually involves a rising ground water table and salinization and alkalization of the soil. This results in reduced crop yields and even eventually causes the land to be completely unfit for agricultural activities.

A large part of the water used for irrigation evaporates, typically ⅔ to ¾ of the total volume. The remaining water drains through the soil and eventually returns to the water source, such as a river or underground aquifer. Thus, the soil continually recycles the remaining water, which has an ever-increasing concentration of solutes.

Further, the water source, such as a river, is left with the same amount of solutes, but with a water flow which is progressively reduced by the irrigation. The solute concentration of the water source may even be increased after irrigation, due to the return of drainage water through sites of high solute concentration back to the source.

To reiterate, in the case of a river, the farther the water is downstream the more saline it turns. This is because the rate of water flow is reduced by evaporation, but the total amount of salts is conserved or even increased. At a certain point, the water flow in the river is so low and the total amount of salt becomes so high that the remaining water becomes useless. Long before the water is useless or the land becomes destroyed, a reduction in crop yield occurs with rising damages to the soil by the irrigation activity and the return of the drainage water with salts back to the water source.

The solution to this problem is to export the salt from the system to a site of disposal. This can be done by intercepting the water that drains from the irrigated fields and other sources of brackish and saline water and to conduct them to a disposal place, rather than let them return to the original water source. In a characteristic case using this method, the addition to the consumptive water use, or increased irrigation, can reach around 50%. A further benefit also results from the reduction of damage by soil salinization, avoidance of crop yield reductions, etc.

An increase in the water salinity requires higher irrigation rates for leaching and more costly irrigation and drainage installation. By intercepting the saline sources, this problem is also eliminated.

This solution, however, is not easily implemented for a number of reasons. First, and most importantly, the volumes of brackish and saline water to be disposed are very large and the distances over which the brackish water has to be carried are often considerable. A typical volume of brackish water can be in the order of ¼ to ⅓ of the total irrigation project. Second, there is no immediate direct and well-defined profit for someone to want to take on the job of disposing of the brackish water. Authorities tend to postpone it, hoping the disaster will not come on their term.

An advantageous feature of the present invention solves these problems because large parts of the volume of brackish water can be evaporated and for every cubic meter thus eliminated energy in the order of 10 or more kWh is produced. Brackish water can be recycled in the present invention until the concentration of the solutes turns the water useless. As an example, one cubic meter of water that has about 2000 PPM of solutes, or about 2 kilograms of solutes per ton of water, is useless for irrigation and is typical of drainage water in arid or semi-arid lands. This water can be sprayed and recycled in the present invention until the concentration is in excess of 40,000 PPM. In other words, the remaining brine volume will be reduced at least 20 times. If the final concentration is 100,000 PPM, then the disposable volume is reduced 50 times. The cost of salt disposal will then be reduced to a very small fraction of the typical expense. In the hydro/aero power plant, the benefit will be over 10 kWh per cubic meter dissipated by evaporation, with the value varying depending on the difference between the production cost and the opportunity price for electricity. This net gain may be assumed to be as low as 2 cents per kWh, which multiplied by 10 kWh gives a 20 cent economical gain associated with disposing one ton of water.

The environmental benefit here is twofold. First, there is avoidance of $NO_x$ and $SO_2$ pollution, damage due to $CO_2$ emission to the air, as well as avoidance of other known damages caused by using fuel. The second benefit is the profit in producing electricity for 20 cents or more per cubic meter of eliminated brackish water volume that otherwise has to be disposed of over large distances at a high cost. The benefit is in the reduced volume of brine to be disposed, the net addition of useful water in the water source, as well as other savings discussed herein.

Another synergy between the present invention and the reduction of salinity problems in water resources is by desalinating the brackish water before spraying it in the duct 14. The desalination also reduces the volume of the brackish water and, in view of the fact that it can be performed very cheaply in combination with the present invention, more fresh water is provided at the same time.

Other concentration methods may be added, but they are not intrinsic to the present invention. One such example is simply a line spray utilizing the incoming dry air of the prevailing wind. Several very important details of embodiments of this invention can be adapted to the line spray. Among them there are the methods of spray and the methods of collection of the unevaporated droplets.

Aquaculture

Another unique feature of the present invention is the advantageous combination with aquaculture. Aquaculture uses large volumes of water in ponds for the farming of fish, oysters, algae and other sea fruit. Further, the water in these ponds needs to be refreshed and circulated for numerous reasons, such as washing away ammonia compounds, aeration, maintenance of sufficiently low salinity and temperature control.

Commonly, there are two problems in developing aquaculture in large volumes in ponds. The first problem is avoiding pollution from excretions and wasting of feed by the marine culture in the ponds. Fish excrete about two-thirds of the food and pollute the water. The second problem is finding large enough areas where the ponds can be built. Often the area near the sea shore is limited or has a high demand by other land uses which makes the land very expensive. Further, pumping and delivery of sea water to far away areas is generally not economical.

The combination of aquaculture with the present invention is unique in solving these two problems. Referring to FIG. 4, the marine culture growth ponds 228 can be installed along water conduit 104 to the hydro/aero power plant or near the low level operational reservoir 100, which will most often be away from the sea where the land is more available. Further, the cost of pumping water over a large distance and to a relatively high elevation will be avoided.

After the water is used in the ponds, it is fed into the spray system 20. The brine which is formed after the spraying and the evaporation has to be disposed. This brine then contains the whole quantity of excess organic and inorganic waste materials which are potentially damaging to the environment. This brine could change the biological balance in the sea if all these materials are returned there. This problem may be avoided, however, as the same solution found for the disposal of brine from the hydro/aero power plant is also useful for these feeding leftovers.

Additionally, aquaculture can benefit from the use of sea water as a water source 92. The activity of aeration of intensive fish ponds involves cooling the water in the ponds. This cooling reduces the rate of growth in the ponds. Being fed with sea water, however, would offset this cooling and warm the ponds, thus enhancing productivity.

Another benefit of marine culture growth ponds 228, as well as operational reservoirs 100 and 102, is that they can be used as cooling ponds. Thus, the water stored in these ponds 228 and reservoirs 100 and 102 can be cooled before it is sprayed, enhancing the overall system efficiency.

Inland Water Cooling

As would occur to one skilled in the art after reading this specification, the water and brine used in the present invention may have numerous other uses. One such use, for example, is using the water and/or brine in route to the spraying system and the concentrated brine in route to disposal as cooling water for thermal power stations.

Other Tower Geometry

Figure 42:
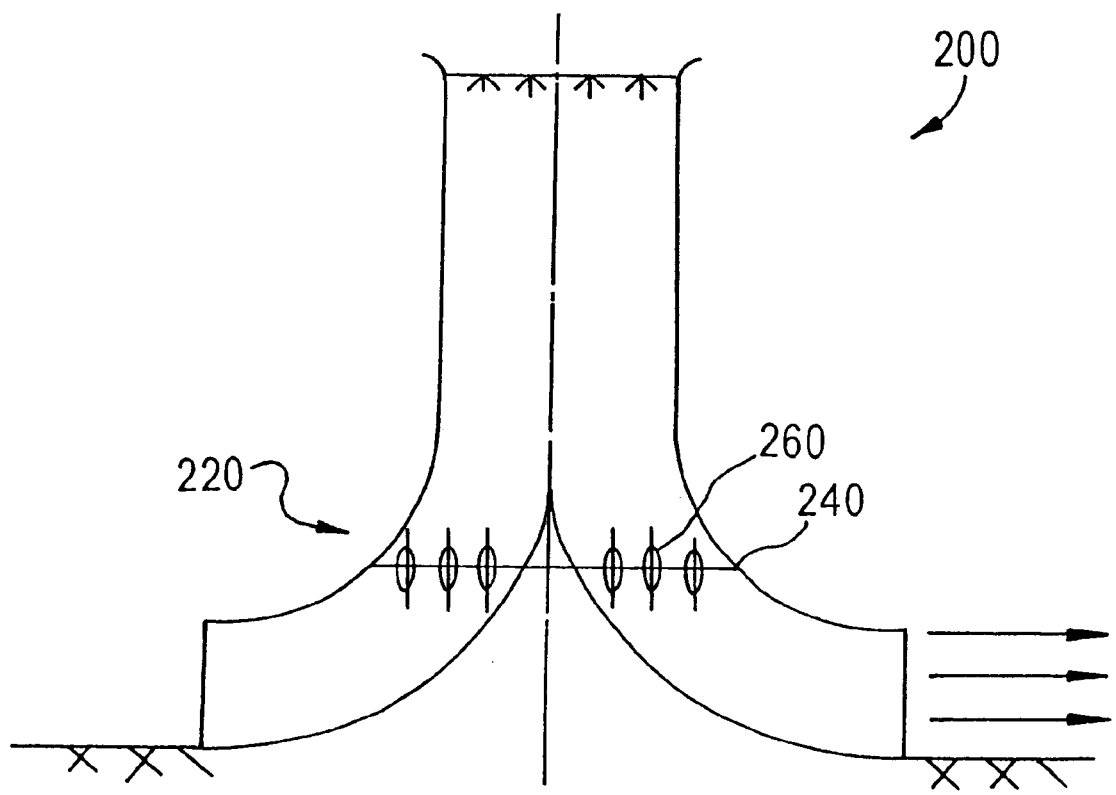
FIG. 42 is a schematic cross-sectional representation of another embodiment of the present invention wherein the axis of the turbines is vertical.

An alternate embodiment of the present invention is depicted in FIG. 42, wherein tower 200 is essentially the same as tower 10 in FIG. 1 except for the location of turbine array 220. Turbine array 220 is arranged on a horizontal structure 240 at a relatively low elevation, but the axes of the individual turbines 260 is vertical. It may be advantageous to place turbine array 220 in the downdraft of air before the air slows down due to the widening of the cross-sectional area in turning from a vertical flow to a horizontal flow.

Figure 43:
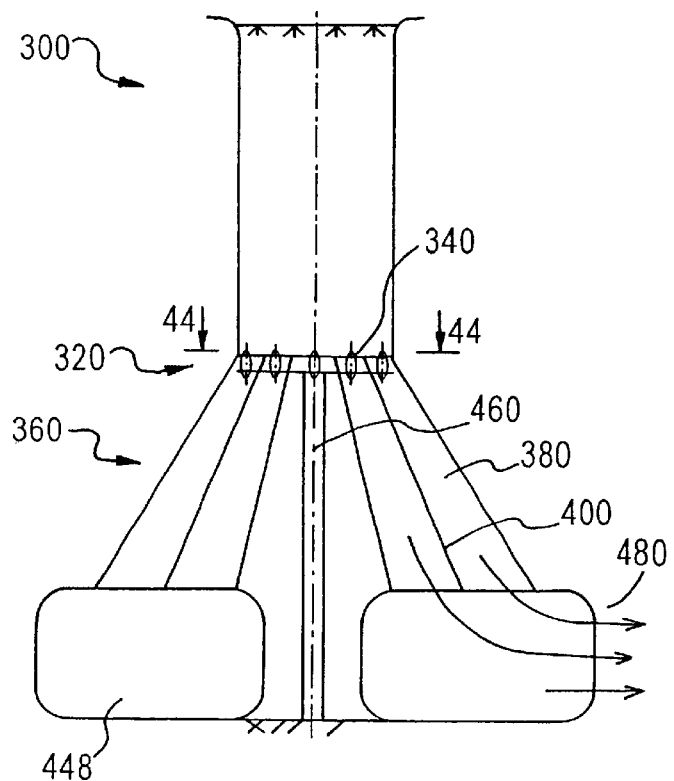
FIG. 43 is a schematic cross-sectional representation of a further embodiment of the present invention wherein the turbines have vertical axes and the diffusers are primarily vertical.
Figure 44:
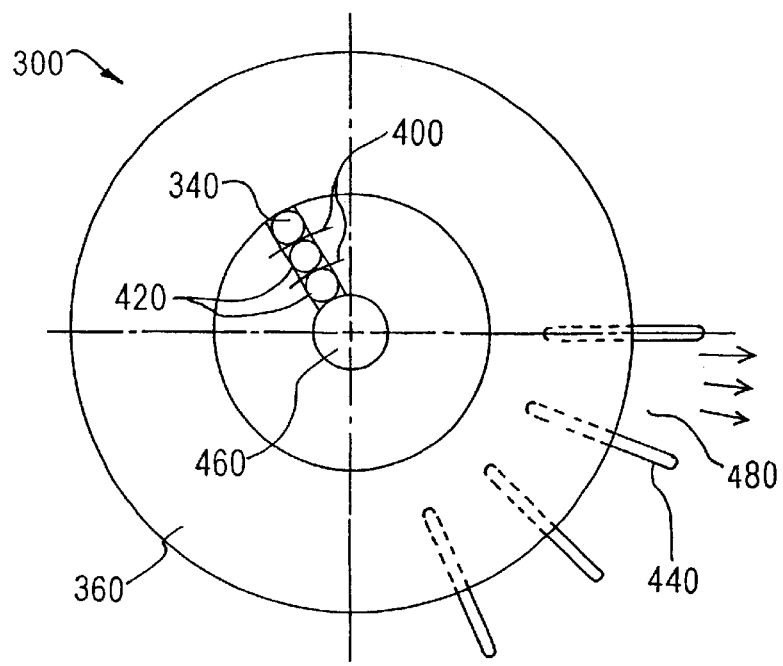
FIG. 44 is a partial cross-sectional view from line 44—44 in FIG. 43.

Similarly, another alternate embodiment of the present invention is illustrated in FIGS. 43 and 44. In this configuration, tower 300 includes turbine array 320 comprising axial flow turbines 340 oriented vertically. Turbine array 320 is at a considerable elevation above the bottom of tower 300, and consequently diffuser region 360 is more vertically oriented than diffuser region 64 in FIG. 1. Diffuser region 360 comprises a diffusion chamber 380 for each turbine 340, with the various chambers separated by diffuser walls 400 and radial diffuser partitions 420. Radial support structure 440 helps to support tower 300 and diffuser region 360 and further provides horizontal separation of the air flow at outlet 480. Further, vertical shaft 460 from the bottom of duct 300 to turbine array 320 may be provided with elevators or other services.

Figure 45:
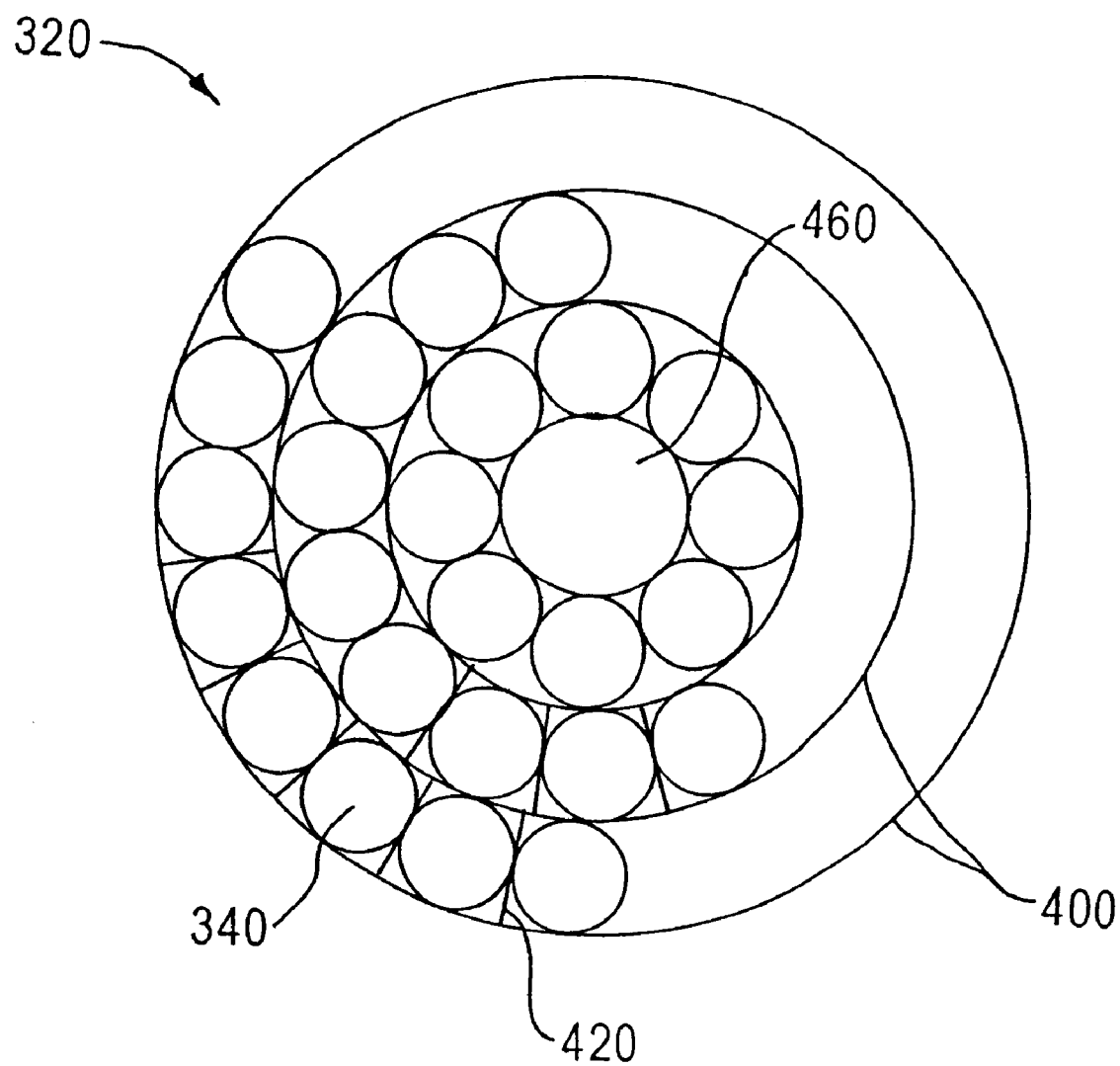
FIG. 45 is a partial cross-sectional view similar to FIG. 44, but showing a different embodiment of the turbine array.

Referring to FIG. 45, one embodiment of turbine array 320 of tower 300 is depicted. In this embodiment there are 3 concentric rings of turbines 340, each successive ring of turbines further away radially from vertical shaft 460. It would be apparent to one skilled in the art that there are numerous other possible arrangements of vertical axis turbines 340 within tower 300.

It will be readily seen by one skilled in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the claims and equivalents thereof.

What is claimed is:

1. A renewable resource power generation plant, having a) a generally vertically extending duct having an inlet, an outlet at an elevation lower than said inlet, and a side wall of a predetermined diameter and an inner surface of said sidewall being substantially smooth, and b) a power system adjacent said outlet for recovering energy from a downdraft of fluid, said power generation plant comprising:

an adjustable spray system mounted adjacent said inlet for spraying a predetermined amount of water in droplet form into the air responsive to air flow at said inlet, thereby forming a mixture of air and water droplets which defines a fluid, wherein said duct and said spray system are structured to cooperate such that a spray of predetermined amount of water greater than a calculable maximum amount of water that would theoretically evaporate in the air throughout substantially the entire height of said predetermined duct saturates the air with vapor at the lowest point in the duct, and where by evaporation of said droplets causes said air to become cooler and denser than air outside said duct, creating an aero-cooling effect and causing the downdraft of said fluid within said duct.

2. A renewable resource power generation plant as recited in claim 1, wherein said predetermined height is greater than about 500 meters.

3. A renewable resource power generation plant as recited in claim 1, wherein said predetermined height is in the range of about 3 to 5.5 times greater than said predetermined diameter for a power generation plant designed to have a fixed output.

4. A renewable resource power generation plant as recited in claim 1, wherein said predetermined height is in the range of about 2 to 2.5 times greater than said predetermined diameter for a power generation plant designed to have a fixed height.

5. A renewable resource power generation plant as recited in claim 1, wherein said inlet comprises a substantially horizontal flared portion curving radially out from the top of said side wall.

6. A renewable resource power generation plant as recited in claim 5, wherein the radius of curvature of said flared portion is in the range of about 0 to 0.2 times said predetermined diameter.

7. A renewable resource power generation plant as recited in claim 5, wherein the shape of a curved section of said flared portion is a smooth curve having an approximately continuous second derivative.

8. A renewable resource power generation plant as recited in claim 1, wherein said inlet comprises a flared portion positioned within about ±15° to the horizontal plane and curving radially out from the top of said side wall.

9. A renewable resource power generation plant as recited in claim 8, wherein the radius of curvature of said flared portion is greater than 0.2 times said predetermined diameter.

10. A renewable resource power generation plant as recited in claim 1, wherein said side wall includes an inner cylinder concentric with and structurally linked to an outer cylinder for enhancing the structural stability of said plant.

11. A renewable resource power generation plant as recited in claim 10, wherein said inner cylinder includes an inner surface having a roughness less than about a few units in a million in relation to said predetermined diameter.

12. A renewable resource power generation plant as recited in claim 10, wherein said inner cylinder includes an inner surface forming a cross-section from the group consisting of a circle, a polygon, a circle having circular sections bulging out and the intersection of two circular sections forming a sharp internal edge, a circle having circular sections alternating from bulging in to bulging out forming an undulating surface, and a circle having vertical radial ribs, and said outer cylinder optionally has a different cross-section than said inner cylinder.

13. A renewable resource power generation plant as recited in claim 1, wherein said water is supplied from an elevated water source.

14. A renewable resource power generation plant as recited in claim 13, wherein said water is supplied from a plurality of elevated operational reservoirs capable of supplying a predetermined volume of water when said plant is operating continuously at full capacity.

15. A renewable resource power generation plant as recited in claim 14, wherein said predetermined volume of water is in the range of about a fraction of an hour to about a week's supply.

16. A renewable resource power generation plant as recited in claim 14, wherein said water is pumped up to said operational reservoirs from a lower source.

17. A renewable resource power generation plant as recited in claim 1, wherein said droplets have an average diameter greater than about 100 microns.

18. A renewable resource power generation plant as recited in claim 1, wherein said droplets have an average diameter greater than about 150 microns.

19. A renewable resource power generation plant as recited in claim 1, wherein said droplets have an average diameter in the range of about 150 to 500 microns.

20. A renewable resource power generation plant as recited in claim 1, wherein said droplets have an average diameter greater than 300 microns for collection of finer droplets.

21. A renewable resource power generation plant as recited in claim 1, wherein said droplets have an average diameter greater than 500 microns when said plant is operated mainly to achieve the hydro-drag effect.

22. A renewable resource power generation plant as recited in claim 1, wherein said spray system provides a substantially uniform ratio of said droplets to said air across the entire cross-section of said duct.

23. A renewable resource power generation plant as recited in claim 22, wherein local deviations in said droplet to air ratio are less than about 10% compared to the average droplet to air ratio.

24. A renewable resource power generation plant as recited in claim 1, wherein the spray system creates droplet flight vector s such that their weighted average with respective to a particular spray station will be within 30° to the local velocity vector of the flowing air.

25. A renewable resource power generation plant as recited in claim 1, wherein said spray system can spray a volume of water ranging from about zero to said predetermined maximum amount of water with an accuracy of 1:30 of said predetermined amount of water at each spray station.

26. A renewable resource power generation plant as recited in claim 1, wherein said spray system has a substantially redundant capability.

27. A renewable resource power generation plant as recited in claim 26, wherein said redundant capability is greater than about 50%.

28. A renewable resource power generation plant as recited in claim 1, further comprising means for actuating selected ones of atomizers in said spray system to position same in ON and OFF modes of operation.

29. A renewable resource power generation plant as recited in claim 1, wherein said spray system is formed with a plurality of spray stations, each station including a plurality of individual atomizers.

30. A renewable resource power generation plant as recited in claim 29, further comprising a water meter at each station.

31. A renewable resource power generation plant as recited in claim 29, wherein said spray stations have overlapping spray coverage with adjacent ones of said stations.

32. A renewable resource power generation plant as recited in claim 1, wherein said power system further comprises a plurality of turbines for recovering said energy from said downdraft of air; and
wherein each turbine is individually shrouded.

33. A renewable resource power generation plant as recited in claim 1, wherein said power system further comprises a plurality of turbines for recovering said energy from said downdraft of air; and
wherein the amount of said recovered energy is substantially maintained at high efficiency when a predetermined number of said plurality of turbines are closed to prevent airflow therethrough.

34. A renewable resource power generation plant as recited in claim 32, wherein said power system further comprises a plurality of turbines for recovering said energy from said downdraft of air; and
wherein a select number of said plurality of turbines directly power the supply of said water to said spray system.

35. A renewable resource power generation plant as recited in claim 34, wherein said select number of said plurality of turbines are mechanically coupled to water pumps.

36. A renewable resource power generation plant as recited in claim 35, wherein said water pumps are provided in series and in parallel to adjust for the maximum efficiency at every power output level of said plant; and
wherein said select number of said plurality of turbines have blades and guide vanes of adjustable pitch.

37. A renewable resource power generation plant as recited in claim 34, wherein said collection reservoirs are further connected to supply said water to a disposal site.

38. A renewable resource power generation plant as recited in claim 37, wherein a predetermined proportion of the collection reservoir water is resprayed within the duct.

39. A renewable resource power generation plant as recited in claim 37, wherein said collection reservoirs supply said water to an energy recovery system.

40. A renewable resource power generation plant as recited in claim 39, wherein said energy recovery system comprises a hydroelectric turbine.

41. A renewable resource power generation plant as recited in claim 1, wherein said power system further comprises a plurality of turbines for recovering said energy from said downdraft of air; and
wherein said plurality of turbines have blades and guide vanes of adjustable pitch to maximize the efficiency of said plurality of turbines.

42. A renewable resource power generation plant as recited in claim 1, wherein said power system further comprises a plurality of turbines for recovering said energy from said downdraft of air; and
wherein said plurality of turbines have guide vanes upstream from the turbine.

43. A renewable resource power generation plant as recited in claim 42, wherein said guide vanes have an adjustable pitch.

44. A renewable resource power generation plant as recited claim 1, wherein said power system further comprises a plurality of turbines for recovering said energy from said downdraft of air; and
wherein said turbine are axial flow reaction turbines.

45. A renewable resource power generation plant as recited in claim 1, wherein said spray system, a fluid supply to said spray system, and the power system have a reduced installed capacity which is less than the theoretical capacity of the duct at the peak of a hot and dry season and at or above the lowest capacity of the duct at the lowest cold and humid season.

46. A renewable resource power generation plant as recited in claim 1, further comprising collection reservoirs supplying said water to said spray system.

47. A renewable resource power generation plant as recited in claim 1, wherein net energy is potential mechanical energy minus pumping energy, wherein about 1/3 of said net energy is utilized as energy losses involved with said downdraft of fluid in said plant, and wherein deliverable energy is said net energy minus the total energy losses in the operation of said plant that is about 2/3 of said net energy times an efficiency factor of the power system.

48. A renewable resource power generation plant as recited in claim 47, wherein the evaporation of said droplets is negligible and wherein less than 1/3 of said net energy is utilized as energy losses involved with said downdraft of said fluid and said deliverable energy is greater than about 2/3 of said net energy times an efficiency factor of the power system.

49. A renewable resource power generation plant as recited in claim 1, wherein fluid is supplied to the spray system from an operational reservoir and a pumping of fluid into the operational reservoir occurs in accordance with a pumping time distribution which is different from a spray time distribution.

50. A renewable resource power generation plant as recited in claim 49, wherein the pumping rate of fluid into the operational reservoir occurs with a pumping time distribution that is different from a production rate of fluid from an associated desalination plant supplying fluid to the spray system.

51. A renewable resource power generation plant as recited in claim 1, further comprising a water supply for the spray system, said water supply being a source of brackish water which is diverted from otherwise polluting a fresh water source.

52. A renewable resource power generation plant as recited in claim 1, wherein said power system includes a plurality of turbines arranged in two vertically spaced tiers.

53. A renewable resource power generation plant as recited in claim 1, wherein said power system includes a plurality of turbines arranged proximate the duct outlet, wherein the total apertured area of substantially entirely all said turbines is between 60–80% of the cross-sectional duct area.

54. A renewable resource power generation plant as recited in claim 1, wherein, to utilize full installed capacity of said plant, there is further provided a second spray system configured to spray additional fluid to attain an amount of sprayed fluid into the duct equal to about four to five times a spray flow rate necessary for achieving a maximum aero-cooling effect.

55. A renewable resource power generation plant as claimed in claim 1, wherein said adjustable spray system comprises atomizers installed such that the weighted average of the flight vector of said water droplet is substantially parallel to the local velocity vector of the air flow.

56. A renewable resource power generation plant as claimed in claim 1, wherein said adjustable spray system comprises atomizers installed such that the weighted average of the flight vector of said water droplet is within 30 degrees of being parallel to the local velocity vector of the air flow.

57. A renewable resource power generation plant as claimed in claim 1, wherein the spray volume of said adjustable spray system adjusts for changes in the difference between a dry bulb temperature and a wet bulb temperature.

58. A renewable resource power generation plant as claimed in claim 1, wherein said adjustable spray system spraying rate is adjusted to maintain a uniform water to air ratio per cubic meter across said duct.

59. A renewable resource power generation plant as claimed in claim 1, wherein the water spray distribution rate of said adjustable spray system is adjustable to match the air entry rate distribution across said inlet.

60. A renewable resource power generation plant, comprising:
   a generally vertically extending duct having a side wall of a predetermined diameter, an inlet at a predetermined height, an outlet at an elevation lower than said predetermined height;
   a spray system mounted adjacent said inlet for spraying droplets of water into the air, wherein evaporation of said droplets causes the aero-cooling effect and the droplets momentum plus the gravitational energy of excess water falling within said duct causes the hydro-drag effect, creating a downdraft of air within said duct; and
   a power system adjacent said outlet for recovering energy from said downdraft of air.

61. A method for generating power, comprising the steps of:
   (a) isolating a column of air from the surrounding air wherein one end of the column of air is at a greater elevation than the other end;
   (b) adding a predetermined amount of water to the air column to optimize the cooling and density of the mixture at every elevation throughout the air column thereby causing a flow of fluid down the column;
   (c) recovering energy from the fluid flow at the lower end of the air column.

62. A method of generating power as recited in claim 61, wherein the ratio of a calculable maximum amount of water that would theoretically evaporate at every elevation throughout the air column to the predetermined amount of water is in the range of about 0 to about 0.9.

* * * * *